(12) United States Patent
Bonifas et al.

(10) Patent No.: US 9,707,502 B1
(45) Date of Patent: Jul. 18, 2017

(54) CONDUCTIVE LOOP DETECTION MEMBER

(71) Applicant: 3M Innovative Properties Company, St. Paul, MN (US)

(72) Inventors: Andrew P. Bonifas, Woodbury, MN (US); Brock A. Hable, St. Paul, MN (US); Ronald D. Jesme, Plymouth, MN (US); Nicholas G. Amell, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/276,164

(22) Filed: Sep. 26, 2016

(51) Int. Cl.

| | | |
|---|---|---|
| *B01D 27/10* | (2006.01) | |
| *B01D 35/14* | (2006.01) | |
| *B01D 46/00* | (2006.01) | |
| *G01D 5/14* | (2006.01) | |
| *G08B 21/18* | (2006.01) | |
| *G06K 19/06* | (2006.01) | |

(52) U.S. Cl.
CPC ......... *B01D 46/009* (2013.01); *B01D 27/10* (2013.01); *B01D 35/14* (2013.01); *G01D 5/142* (2013.01); *G06K 19/06196* (2013.01); *B01D 2201/52* (2013.01)

(58) Field of Classification Search
CPC .... B01D 46/009; B01D 35/14; B01D 35/143; B01D 27/10; B01D 17/12; B01D 46/00; B01D 46/42; B01D 46/429; B01D 2201/52; B01D 2201/56; G06K 19/06; G06K 19/06187; G06K 19/06196; G06K 19/06206; G06K 19/06253; H01K 7/00; H01K 23/00; G08B 21/00; G08B 21/18; C02F 2209/00; G01D 5/12; G01D 5/14; G01D 5/142; G01D 5/145; G01D 5/147; G01D 15/12
USPC ....... 210/85, 91, 96.1; 96/417, 423; 340/607
See application file for complete search history.

(56) References Cited

U.S. PATENT DOCUMENTS

| | | | |
|---|---|---|---|
| 3,564,214 A | | 2/1971 | Cooper, Jr. |
| 3,752,960 A | * | 8/1973 | Walton ...................... B07C 3/12 235/439 |
| 5,466,896 A | * | 11/1995 | Murakami ............... G06F 3/046 178/18.07 |
| 5,674,381 A | | 10/1997 | Den Dekker |
| 5,914,692 A | * | 6/1999 | Bowers .................... H01Q 7/00 340/572.7 |
| 6,040,777 A | | 3/2000 | Ammann et al. |

(Continued)

FOREIGN PATENT DOCUMENTS

| | | |
|---|---|---|
| CN | 102486823 | 6/2012 |
| KR | 10-2009-0082723 | 7/2009 |

*Primary Examiner* — Joseph Drodge

(57) ABSTRACT

A fluid treatment cartridge includes a housing having a fluid inlet and a fluid outlet with a treatment media contained within the housing. The fluid treatment cartridge includes a detection member comprising at least one closed electrically conductive loop having at least two spatially separate sections. Each of the sections generates a magnetic response when at least one section is electromagnetically excited. The magnetic response of each section is predetermined by the physical shape of the section and comprises at least one of a predetermined magnetic phase response and a predetermined magnetic amplitude response. The predetermined magnetic response of at least one other section of the closed electrically conductive loop corresponds to at least a one digit code.

30 Claims, 44 Drawing Sheets

(56) References Cited

U.S. PATENT DOCUMENTS

| | | | |
|---|---|---|---|
| 6,073,302 | A | 6/2000 | Buscher |
| 6,491,811 | B2 | 12/2002 | Conrad et al. |
| 6,533,926 | B2 | 3/2003 | Hawkins et al. |
| 6,537,444 | B2 | 3/2003 | Wilberscheid et al. |
| 6,551,503 | B2 | 4/2003 | Niers et al. |
| 6,558,444 | B1 | 5/2003 | Hunter |
| 7,370,491 | B2 | 5/2008 | Venkatakrishnan et al. |
| 7,638,042 | B2 | 12/2009 | Astle et al. |
| 7,836,708 | B2 | 11/2010 | Krause et al. |
| 7,864,054 | B2 * | 1/2011 | Ohashi .................. G06K 17/00 235/487 |
| 8,393,167 | B2 | 3/2013 | Krause et al. |
| 2003/0168389 | A1 | 9/2003 | Astle et al. |
| 2007/0200708 | A1 | 8/2007 | Hayama et al. |
| 2007/0268144 | A1 * | 11/2007 | Dobosz ................ G06K 7/0008 340/572.8 |
| 2007/0290846 | A1 * | 12/2007 | Schilling ................ G01B 7/003 340/572.1 |
| 2010/0096302 | A1 | 4/2010 | Astle et al. |
| 2011/0024337 | A1 * | 2/2011 | Kreibig ................ B01D 35/143 210/85 |
| 2013/0328552 | A1 * | 12/2013 | Chen .................. G01F 23/0007 324/207.15 |
| 2014/0262983 | A1 * | 9/2014 | Tuckwell ............... G01N 33/49 210/85 |
| 2016/0169717 | A1 * | 6/2016 | Zhitomirsky ............ G01D 5/20 702/94 |

\* cited by examiner

CONDUCTIVE LOOP DETECTION MEMBER

TECHNICAL FIELD

This disclosure relates generally to authentication of fluid treatment cartridges and to associated device, systems, and methods.

BACKGROUND

Many systems use removable components that can be installed, removed, and/or reinstalled or replaced from time to time. Examples of such systems include fluid treatment systems that use treatment cartridges, air circulating systems that use filters, printing systems that use ink cartridges, vacuum systems that use filter bags, and many others.

BRIEF SUMMARY

According to some embodiments a fluid treatment cartridge includes a housing having a fluid inlet and a fluid outlet with a treatment media contained within the housing. The fluid treatment cartridge includes a detection member comprising at least one closed electrically conductive loop having at least two spatially separate sections. Each of the sections generates a magnetic response when at least one section is electromagnetically excited. The magnetic response of each section is predetermined by the physical shape of the section and comprises at least one of a predetermined magnetic phase response and a predetermined magnetic amplitude response. The predetermined magnetic response of at least one other section corresponds to at least a one digit code.

Some embodiments involve a system that comprises a fluid treatment cartridge and a reader. The fluid treatment cartridge includes a housing having a fluid inlet and a fluid outlet with a treatment media contained within the housing. The fluid treatment cartridge includes a detection member comprising at least one closed electrically conductive loop having at least two spatially separate sections. Each of the sections generates a magnetic response when at least one section is electromagnetically excited. The magnetic response of each section is predetermined by the physical shape of the section and comprises at least one of a predetermined magnetic phase response and a predetermined magnetic amplitude response. The predetermined magnetic response of at least one other section corresponds to at least a one digit code. The reader includes at least one transmit element and at least one receive element. The transmit element is configured to transmit an electromagnetic signal that electromagnetically excites the at least one section of the closed conductive loop. The predetermined magnetic response of the at least one other section of the closed conductive loop generates a signal on the at least one receive element that represents the code.

Some embodiments are directed to a method of operating a system that includes fluidic treatment cartridge comprising a housing having a fluidic inlet, a fluidic outlet and a treatment media disposed within the housing. The housing includes a closed electrically conductive loop. At least one section of the closed electrically conductive loop is electromagnetically excited. A predetermined magnetic response is generated in at least another section of the closed conductive loop in response to electromagnetic excitement of the at least one section of the closed conductive loop. The predetermined magnetic response comprises at least one of a magnetic phase response and a magnetic amplitude response. The predetermined magnetic response corresponds to at least a one digit code.

Some embodiments involve a device that includes a housing having a fluid inlet and a fluid outlet with a treatment media contained within the housing. The device includes a detection member comprising at least one closed electrically conductive loop. The closed electrically conductive loop has multiple spatially separate loop sections including at least one excitation section and one or more response loop sections disposed respectively in multiple spatially separate sections of a detection area. Each of the response loop sections generates a predetermined magnetic response when the excitation loop section is electromagnetically excited. The magnetic response comprises at least one of a predetermined magnetic phase response and a predetermined magnetic amplitude response. A spatial arrangement of the predetermined magnetic responses of the one or more response sections within the multiple detection area sections corresponds to a multi-digit code.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Some embodiments disclosed herein involve non-contact detection, authentication, and/or identification of treatment cartridges and/or other removable components. The disclosed approaches involve a detection member that, when electromagnetically excited, induces a magnetic response corresponding to a code that can be used to detect, authenticate and/or identify the cartridge.

Figure 1A:
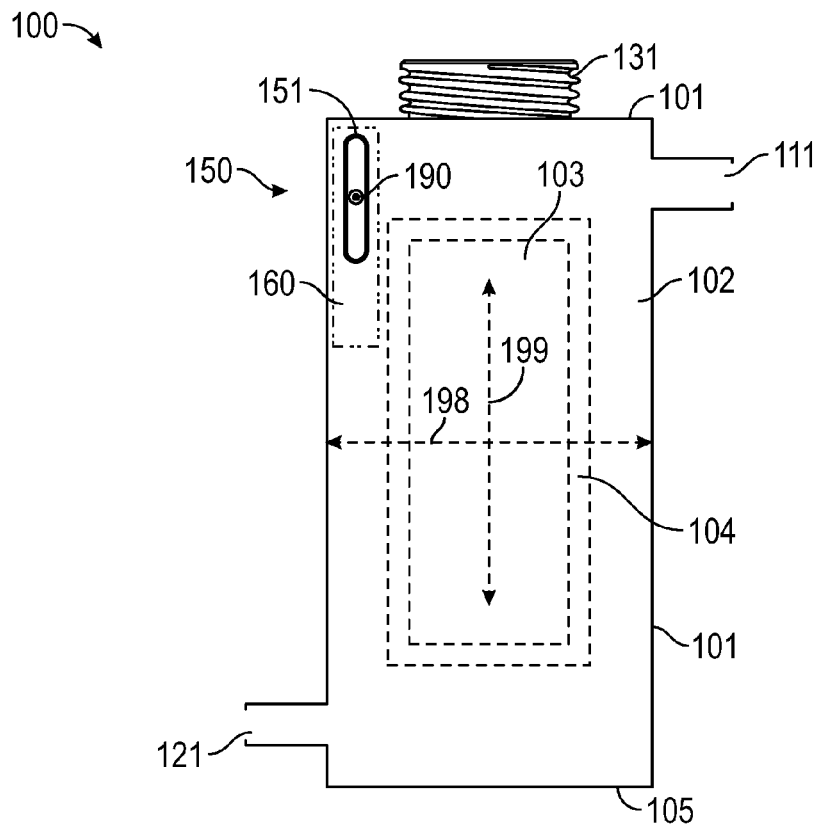
FIG. 1A is a conceptual diagram illustrating a treatment cartridge that includes a detection member in accordance with some embodiments.

FIG. 1A is a conceptual diagram illustrating a treatment cartridge 100 that includes a detection member 150 in accordance with some embodiments. The cartridge 100 can be inserted into and/or fluidically coupled with a host device 200, shown in FIG. 2A, such as a refrigerator or other such appliance. Fluid flow features of the cartridge 100 can be configured to control fluid flow through treatment media 103 disposed within the interior volume 104 of the cartridge 100. The cartridge 100 may have a fluid inlet 111 to receive fluid to be treated from the host device 200 and a fluid outlet 121 to provide treated fluid to the host device 200. The cartridge 100 includes a housing 101 comprising one or more walls 102 that enclose an interior volume 104 in which a treatment media 103 and/or fluid can be contained. In some embodiments, the cartridge 100 has a closed end 105. The material of the cartridge 100 is typically non-conductive, at least in the vicinity of the detection member 150. The cartridge 100 may comprise a non-conducting material such as a polymer, ceramic, rubber, or glass. Examples of suitable polymers include polypropylene, polyethylene, and polycarbonate. In some embodiments, the resistivity of the cartridge 100 is higher than about 1 ohm-m. In other embodiments, the resistivity of the cartridge 100 is higher than $10^3$ ohm-m. In still other embodiments, the resistivity of the cartridge 100 is higher than $10^8$ ohm-m.

A detection member 150 is shown in a detection area 160 of the cartridge 100. The detection member 150 may be formed on or within the cartridge 100 and/or may be attached to a surface of the cartridge 100, e.g., on an exterior or interior surface of the cartridge 100, or within the surfaces of the cartridge 100. The detection member includes at least one closed electrically conductive loop 151 that includes at least two spatially separated sections. When at least one loop section is electromagnetically excited, each loop section generates a magnetic response comprising a magnetic amplitude and/or a magnetic phase response. The magnetic responses of at least two spatially separate loop sections are predetermined by the physical shape and/or surrounding environment of the sections. The magnetic responses of the at least two loop sections correspond to at least a one digit code.

The closed electrically conductive loop 151 may be positioned at any suitable location of the cartridge 100, such as on the outer surface of the housing 101, within the interior volume 104, within a wall 102 of the housing 101, or within electromagnetic contact with the treatment media 103.

Figure 2A:
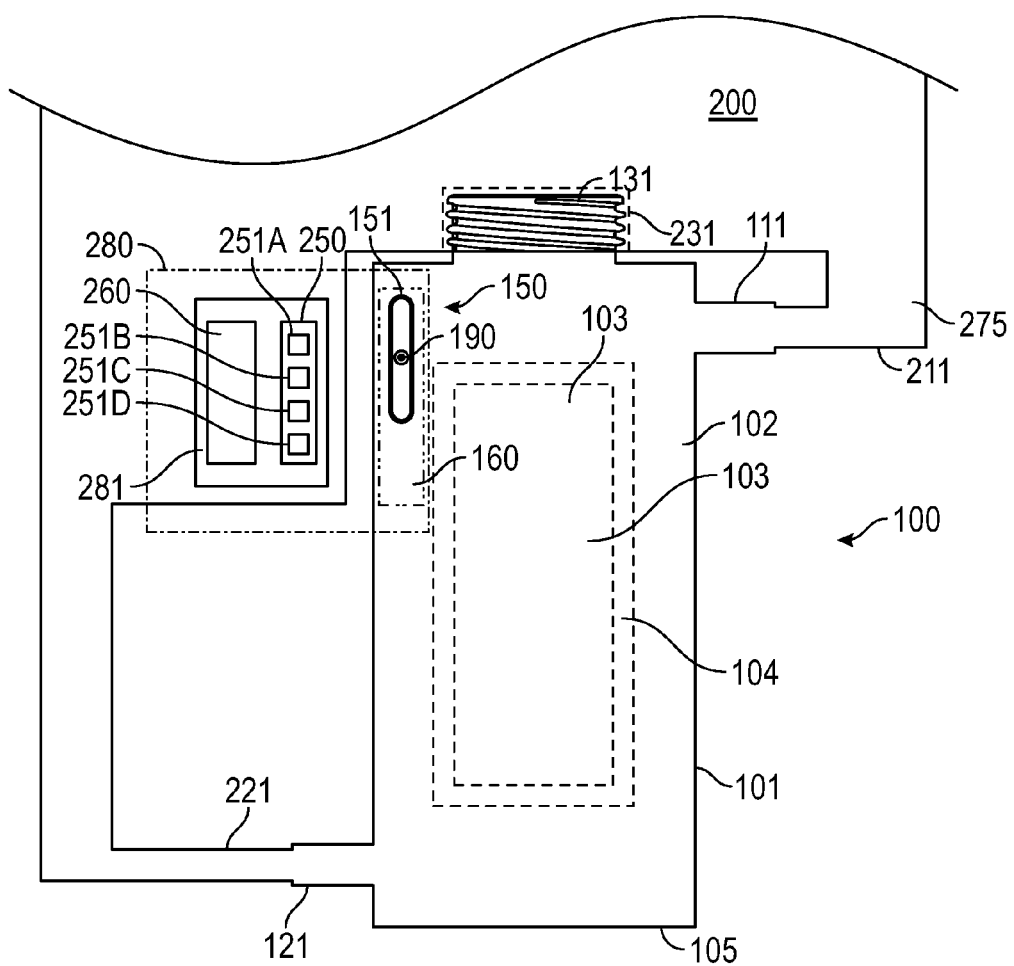
FIG. 2A is a conceptual diagram that shows the cartridge of FIG. 1A fluidically, mechanically, and inductively coupled to the host device in accordance with some embodiments.

The cartridge 100 may include engagement features 131 configured to engage with compatible engagement features 231 of a host device 200 (see FIG. 2A). When present, the engagement features may serve to align the detection member 150 with a detection sensor 281 of the host device 200 that detects the code generated by the loop sections. The engagement features can be selected from mechanical elements used to couple a removable treatment cartridge to a manifold. Such engagement features can include: threaded connections, a bayonet connection; a radially extending lug such as a ramped lug, a helical lug, or a Z-thread lug; a longitudinally extending fluid cartridge inlet prong and a longitudinally extending fluid cartridge outlet prong; a stem extending from the exterior housing with the fluid cartridge inlet and the fluid cartridge outlet, the stem can be either circular, oval, or other shape; a quarter-turn connection; or a lug with an arcuate bottom surface that acts as an engaging cam to lock the treatment cartridge onto the manifold. The connection between the cartridge 100 and the host device 200 may include a spool valve connection, for example.

Alternatively, a replaceable treatment cartridge having a detection member can be placed into a suitable reusable enclosure. In this embodiment, the cartridge housing is typically replaced with a porous exterior member and one or more endcaps are used to direct the fluid within the reusable enclosure through the treatment media.

Suitable treatment media include activated carbon; filtering media such as paper, nonwovens, woven fabric, porous membranes; ion exchange resins; ultra violet light; reverse osmosis membranes. The treatment media is configured to remove one or more of chemical agents such as chlorine, chloramine, ozone, and chlorine dioxide, lead, particulates, VOCs. In general, filtration media may be used in a broad range of applications involving filtration, separation, and purification of fluids (liquid and gas). Example media includes, although is not limited to, water filtration media, activated carbon, modified activated carbon, catalytic carbon, carbon, charcoal, titanium dioxide, silica, clays, polymers, non-wovens, electrets, air filtration media, water disinfectant removal media, particulate removal media, organic content removal, ion-exchange media, reverse osmosis media, iron removal media, semipermeable membranes, molecular sieves, sand, magnets, screens, and barrier media. Example filtration techniques with which sensors described herein may be used include, as examples: absorption, chemisorption, physisorption, adsorption, precipitation, sublimation, ion-exchange, exclusion, extraction, electrophoresis, electrolysis, reverse osmosis, barrier membranes, sedimentation, distillation, and gas exchange.

The cartridge 100 may take the three dimensional (3D) form of a polyhedron (cuboids, prisms, pyramids) or a non-polyhedron (spheres, cylinders, cones). In some embodiments, the detection member 150 is aligned to a specific feature of the cartridge 100 defined by its 3D shape. In some embodiments, the detection member 150 may be aligned to an alignment feature 190 on the cartridge 100. The cartridge 100 may contain alignment features that enable proper alignment between the cartridge 100 and a filtration manifold 275 (see FIG. 2A) on the host device 200 that provides fluid to be treated to the cartridge 100 via the device outlet 211 of the manifold 275 and receives treated fluid from the cartridge 100 via the device inlet 221 of the manifold 275.

Figure 1B:
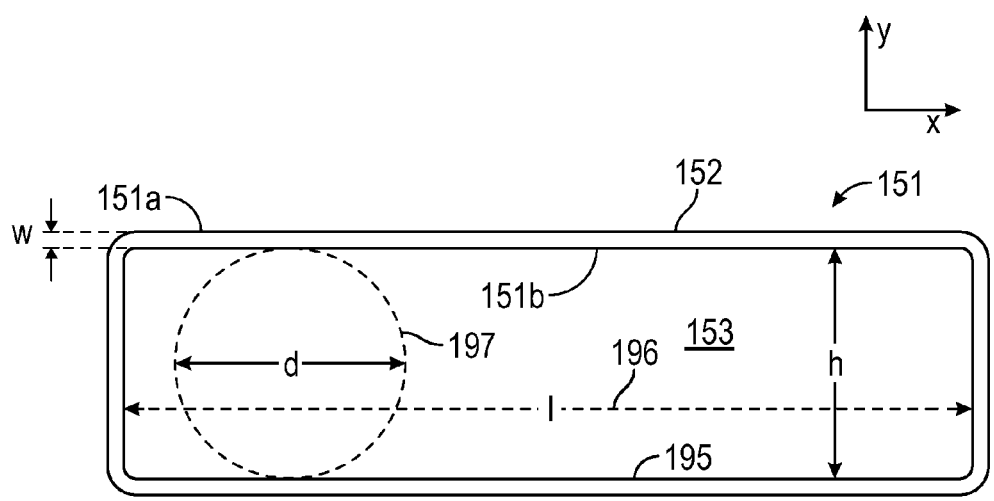
FIG. 1B depicts a detection member comprising an electrically conductive material arranged as a continuous electrically conductive loop in accordance with some embodiments.

As illustrated in FIG. 1B, the conductive loop 151 comprises an electrically conductive material 152 arranged as a continuous electrically conductive loop. The loop 151 has an outer edge 151*a* and an inner edge 151*b* with electrically conductive material disposed between the outer and inner edges 151*a*, 151*b*. A non-electrically conductive material 153 is disposed between the inner edge 151*b* of the loop 151 and beyond the outer edge 151*a* of the loop 151. For example, the non-electrically conductive material 153 may be the material of the cartridge.

The width, w, of the conductive material 152 between the outer 151*a* and inner 151*b* edges may be substantially uniform or may be non-uniform. The direct current series resistance of the closed conductive loop 151 can be less than 10 kohm, 1 kohm, 100 ohm, 50 ohm, or 10 ohm. The shortest conductive path through the loop 151 may be less than 40 cm, 20 cm, 15 cm, or 10 cm and greater than 0 cm. For example, the conductive loop 151 may comprise an electrically conductive material in the form of a continuous loop such that if a single conductivity break is introduced anywhere along the conductive path of the loop 151, the real part of the impedance measured through the remaining conductive path is less than 10000 ohms. In some embodiments, the real part of the impedance through the conductive path of the broken loop is less than 1000 ohms, 100 ohms, or 50 ohms, or 10 ohms and greater than 0 ohms.

As discussed in more detail below, in some embodiments the conductive loop a 151 may be arranged in a single layer and may have a single inductive turn. In some embodiments, the closed conductive loop 151 may be arranged in multiple layers and may have multiple inductive turns. The loop 151 is configured to inductively couple to the reader 281 of the host device 200 (shown in FIG. 2A). The conductive loop 151, based on its physical nature, behaves as an inductor with an inductance value. To provide a specified amount of coupling and be contained within the physical size of a treatment cartridge, the maximum inductance of loop 151 may be less than about 500 µH, or less than about 200 µH, or less than about 100 µH, or less than about 50 µH, or less than about 5 µH, or less than about 1 µH, or less than about 200 nH, or less than about 150 nH, or less than about 100 nH, or less than about 50 nH, and greater than about 0 nH. To provide a specified amount of coupling, the minimum inductance of loop may be greater than about 1 nH, or greater than about 10 nH, or greater than about 20 nH, or greater than about 50 nH, and less than about 500 nH.

The non-conductive area enclosed within the shortest electrical path of the closed conductive loop 151 may be greater than about 1 mm$^2$, or greater than about 10 mm$^2$, for example. The non-conductive area enclosed within the shortest conductive path of the closed conductive loop 151 may be less than about 100 cm$^2$, or less than about 50 cm$^2$, or less than about 25 cm$^2$, for example. The shortest conductive path of the closed conductive loom may be greater than about 1 cm, or greater than about 2 cm. The length of the shortest conductive path of the closed conductive loop may be less than about 100 cm, less than about 50 cm, less than about 34 cm, or less than about 24 cm, or less than about 10 cm.

The electrically conductive loop 151 may be resonant at particular frequency and may be non-resonant within the transmitting frequency range of the transmitting elements of the reader 281 (see FIG. 2A). As referred to herein, a non-resonant loop refers to a loop with a self-resonant frequency higher than the transmitting frequency of the transmitting elements of the reader 281. For example, in some embodiments, the self-resonance of the closed conductive loop 151 is greater than 30 MHz, 100 MHz, 1 GHz, or 10 GHz and less than about 100 GHz.

In some embodiments, the area contained within the inner edge 151*b* of the loop 151 may be less than about 20 cm$^2$, or less than about 10 cm$^2$ or less than about 5 cm$^2$, and greater than about 100 cm$^2$. In some embodiments, all the area of the loop 151 contained within the inner edges 151*b* may be contained within a four sided polygon having a first dimension, l, along a first axis parallel to one of the sides of the polygon 195 (x-axis in FIG. 1B) and a second dimension, h, along a second axis perpendicular to the first axis (y-axis in FIG. 1B). For the smallest such four sided polygon that contains all the area within the inner edge 151*b* of the loop, a ratio of the longest of the first and second dimensions to the shortest of the first and second dimensions is greater than about 1.2, or greater than 1.5, or greater than 2.0, or greater than 3.0, and less than about 10.0.

A hypothetical circle 197 can be inscribed within the inner edge 151*b* of the loop 151, wherein in some embodiments a maximum diameter, d, of the circle 197 may be larger than 1 mm, 2 mm, or 3 mm. In some embodiments, a diameter, d, of a largest circle 197 that can be inscribed within the inner edge 151*b* may be smaller than 20 cm, 10 cm, 4 cm, or 2 cm.

A hypothetical straight line segment 196 can be inscribed within the inner edge 151*b* of the loop 151. In some embodiments, the longest length, l, of a straight line segment 196 that can be contained within the inner edge 151*b* of the loop 151 may be less than 20 cm, 10 cm, 4 cm or 2 cm. In some embodiments, the longest length, l, of a straight line segment 196 that can be contained within the inner edge 151*b* of the loop 151 may be greater than 3 mm, 5 mm, or 1 cm. Ranges of any of the forgoing lengths, l, are possible, such as greater 5 mm and less than 2 cm.

The loop 151 may be manufactured via any one or more of several methods including screen printing conductive inks, etching of conductive films, and/or other additive and subtractive methods. Attachment of the loop 151 to the cartridge 100 may be achieved through any one or more of several methods including pressure sensitive adhesive, thermally activated adhesive, direct printing onto the cartridge, epoxies, and/or incorporating the loop during and/or injection molding of the cartridge. In some embodiments, the conductive loop 151 is attached to the cartridge 100 in such a way that removal of the conductive loop from the cartridge may result in one or more electrical breaks in the loop.

The cartridge 100 may have any suitable shape, for example, the cartridge 100 may have a substantially polyhedral shape, a substantially non-polyhedral shape, e.g., a cylindrical shape, depending on the application in which the cartridge is used. As illustrated in FIG. 1A, cartridge 100 extends along a longitudinal axis indicated by dashed line 199 in FIG. 1A and has a circumference in a plane, represented by dashed line 198, that is perpendicular to the longitudinal axis 199.

In various embodiments, the closed conductive loop 151 may traverse less than about 20%, 30%, 50%, 70% of the circumference of the cartridge 100 and/or may traverse more than about 2%, 10%, 20%, 30%, 40% of the circumference of the cartridge 100. In various embodiments the closed conductive loop 151 may traverse less than about 20%, 30%, or 50% of the length of the cartridge 100 and/or may traverse more than about 2%, 10%, 20%, 30%, or 40% of the length of the cartridge 100.

In some embodiments, the length of the detection area 160 may be greater than or equal to the length of the conductive loop 151. The length of the detection area 160 can be correlated to the length of the sensor array of a reader as discussed in more detail below. For example, the length of the conductive loop 151 may be about equal to the length of the detection area or may be less than about 75%, or less than about 50%, or less than about 25%, or less than about 10%, or less than about 5%, or less than about 1% of the length of the detection area.

FIG. 2A is a conceptual diagram that shows the cartridge 100 of FIG. 1A fluidically, mechanically, and inductively coupled to the host device 200. The host device 200 includes a host device fluid outlet 211 configured to be fluidically coupled with the cartridge inlet 111 and a host device fluid inlet 221 configured to be fluidically coupled to the cartridge outlet 121. The host device fluid outlet 211 supplies fluid to be treated to the cartridge 100 through the cartridge fluid inlet 111 and the host device fluid inlet 221 receives treated fluid from the cartridge fluid outlet 121. The engagement features of the cartridge and the appliance 131, 231 align the detection area 160 of the cartridge 100 with the reader 281 of the host device 200.

Figure 2B:
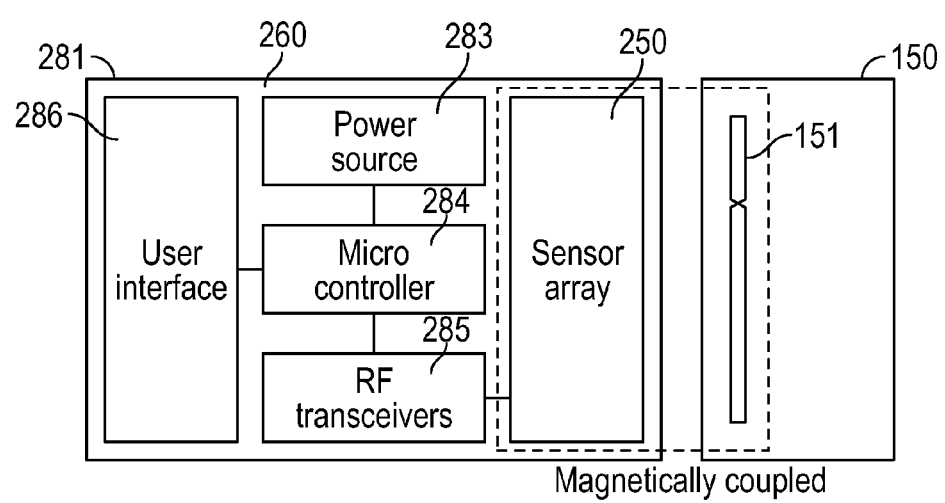
FIG. 2B is a block diagram of a detection system in accordance with some embodiments.

The detection member 150 and the reader 281 form a detection system 280, as illustrated in FIGS. 2A and 2B. The detection member 150 is a passive device that can operate without a power source. In some embodiments, the reader 281 includes a power source 283 that provides power for operation of the reader 281. The reader 281 includes an array 250 of at least two sensor elements 251a-d and associated detection circuitry 260.

The sensor elements may comprise a coil or loop that senses the magnetic response signal of the conductive loop 151. For example, each sensor element may be or comprise one or more of a single turn inductor, a multi-turn inductor, a two-dimensional conductive loop, a conductive loop with three dimensional features, and a capacitive element. The sensor elements may be resonant or non-resonant. The detection member 150 and/or conductive loop 151 are positioned relative to the array of sensor elements 251a-d of the reader 281. The sensor elements 215a-d may be positioned at any location where at least one sensor element can electromagnetically excite the loop 151 and the magnetic response of at least another section of the loop can be detected by at least one of the sensor elements. In some embodiments, one or more of the sensor elements 251a-d may be located adjacent to the loop 151, e.g., above or below the loop and/or to one side of the loop. For example, some of the sensor elements may be located at a first side of the loop and other sensor elements located adjacent to a second side of the loop. In some embodiments, one or more of the sensor elements 251a-d may comprise a coil or loop that surrounds the loop 151.

The length and/or arrangement of the detection area 160 and/or the conductive loop 151 may be correlated with the number and/or arrangement of the sensor elements of the reader. In some embodiments, the detection area 160 includes sections that do not include loop sections. Detection area sections that do not include loop sections result in a relatively low amplitude signal sensed by the corresponding sensor elements of the reader as discussed in more detail below.

A transceiver 285 drives at least one sensor element to operate as an electromagnetic signal transmitter and receives a sensed signal from at least one sensor element. In some embodiments, the transceiver 285 may include separate drive and sense circuitry for each of the sensor elements such that any of the sensor elements can function as a transmitter element and any of the sensor elements can function as a receiver element. In some embodiments, two or more drive circuits and/or two or more sense circuits may be multiplexed to various transmitter and/or receiver elements.

The transceiver 285 drives at least one element of the sensor array to transmit an electromagnetic signal, e.g., a radio frequency (RF) signal. When the detection member 150 is in communication range of the reader 281 and is electromagnetically excited by the transmitted signal from the reader, the detection member 150 magnetically couples to at least some of the sensor elements of the array. The signal transmitted from the reader 281 electromagnetically excites at least one section of the loop. The electromagnetic excitement generates a magnetic phase and/or amplitude response in each of the spatially separate loop sections. The magnetic phase and/or amplitude response of the loop sections generates signals from the loop sections onto sensor elements of array 250. The magnetic phase and/or amplitude responses of the loop sections correspond to a code which is represented in the signals of the sensor elements.

The physical nature of the sensor elements causes coupling between the transmitter element and the receiver elements in the absence of the closed loop 151 of the detection member 150. This coupling will cause a signal baseline to be measured on one or more sensor elements. The magnetic amplitude response of the conductive loop causes a signal represented by an increase or decrease to this baseline signal. Thus, the magnetic amplitude response of a loop section generates a signal or a change in signal on a corresponding sensor element of the reader that encodes a code digit in the amplitude of the signal. In some embodiments, a decreased or increased magnetic amplitude response corresponds to a decreased or increased coupled signal between the loop section with its corresponding sensor element.

A magnetic phase response of a loop section generates a signal on a corresponding sensor element of the reader that encodes a code digit in the phase of the signal. In some embodiments, a magnetic phase response corresponds to phase shift between a magnetic response of a loop section with respect to the phase of the magnetic response of the loop section that is electromagnetically excited. The transceiver 285 receives the signals from the outputs of the sensor elements. The signals received from the sensor elements are processed by signal processing circuitry, such as a microcontroller 284 implementing stored instructions, to extract the one or more code digits.

In various embodiments, the code may be represented by the amplitude or phase of an analog signal, the amplitude or phase of an RF signal, or the amplitude or phase of a digital signal. The code may be expressed in a numeral system having any radix or base, e.g., binary, ternary, octal, decimal, hexadecimal, etc.

The code is at least a one digit code that can be used by the microcontroller to verify that a compatible cartridge has been inserted into the host device. The code can be used to verify that the cartridge has been positioned correctly and/or is otherwise properly installed in the host device. If not, the detection system circuitry may generate or withhold a signal that prevents start-up of the host device, prevents fluid flow through the cartridge, and/or warns a user via a user interface 286 that no cartridge is installed, an unauthenticated cartridge has been installed and/or that the cartridge is not properly installed. In some embodiments, the code may identify the cartridge and/or provide other information about the cartridge, e.g., model number, identification number, flow rate, type of cartridge, expiration date, etc.

In some embodiments, any one or more of the sensor elements may be operated as transmitter elements and any one or more sensor elements may be operated as receiver elements. In some embodiments, authentication of the cartridge may be verified by operating different sensor elements as transmitters and receivers during separate time periods. For example, a first sensor element may be operated as a receiver and a second sensor element operated as a transmitter during a first time period to authenticate the cartridge. In a second time period, the second sensor element is operated as a receiver and the first sensor element is operated as a transmitter. The signals received by the first and second sensor elements during the first and second time periods, respectively, are used, separately or in combination, to determine a ratio of signal amplitudes or relative phase.

Figure 3:
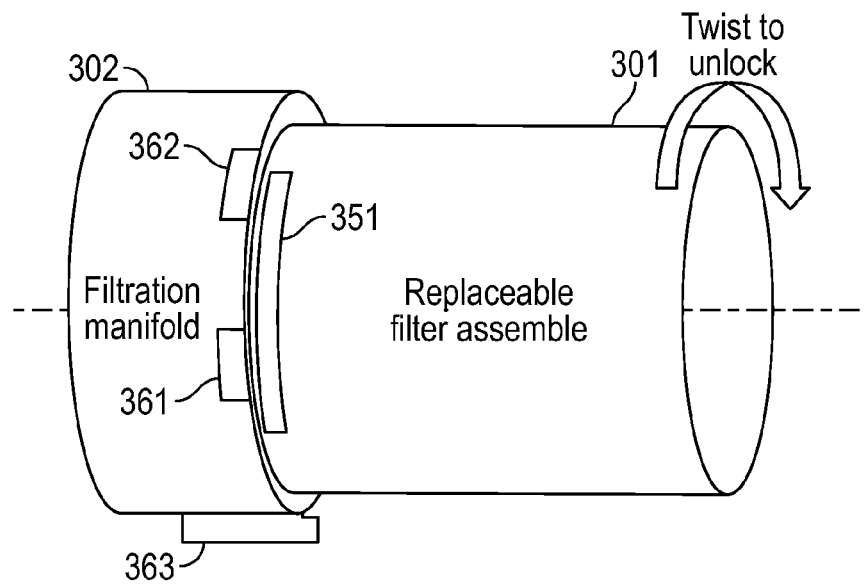
FIG. 3 illustrates a replaceable cartridge inserted in a manifold of a host device in accordance with some embodiments.

Embodiments disclosed herein enable low cost detection members, allowing low cost, non-contact electronic authentication of components installed in a host device. FIG. 3 illustrates a replaceable cartridge 301 inserted in a manifold 302 of a host device. The replaceable cartridge 301 comprises a non-conductive treatment housing, fluid flow control features, and treatment media contained within the cartridge and configured to treat the fluid passing through the cartridge 301.

The cartridge 301 includes a detection member comprising a single closed conductive loop 351 in this example. The manifold 302 includes a reader comprising a transmitter element 361 that transmits an electromagnetic signal, e.g., a radio frequency (RF) signal and a sensor element 362. When the cartridge 301 is inserted in the manifold, the loop 351 is positioned relative to the sensor elements 361, 362. The transmitted electromagnetic signal from the transmitter element 361 electromagnetically excites the loop 351. A current induced in the loop 351 by the electromagnetic signal generates a predetermined magnetic response in the loop. The magnetic response of the loop 351 generates a current (or voltage) signal on the sensor element 362. Reader circuitry 363 drives the transmitter element 361 to transmit the RF signal and receives and processes the signal generated on the sensor element 362.

The presence of the conductive loop 351 when the replaceable treatment cartridge 301 is inserted into filtration manifold 302 modifies the coupling between the transmitter element 361 and the sensor element 362 when compared to a situation where no loop is present. The modified coupling, and thus the presence of the loop 351, is discernible in the signal generated on the sensor element 362 from the loop 351. In the example illustrated in FIG. 3, the signal on sensor element 362 represents a one digit code that indicates the presence or absence of the loop.

Figure 4:
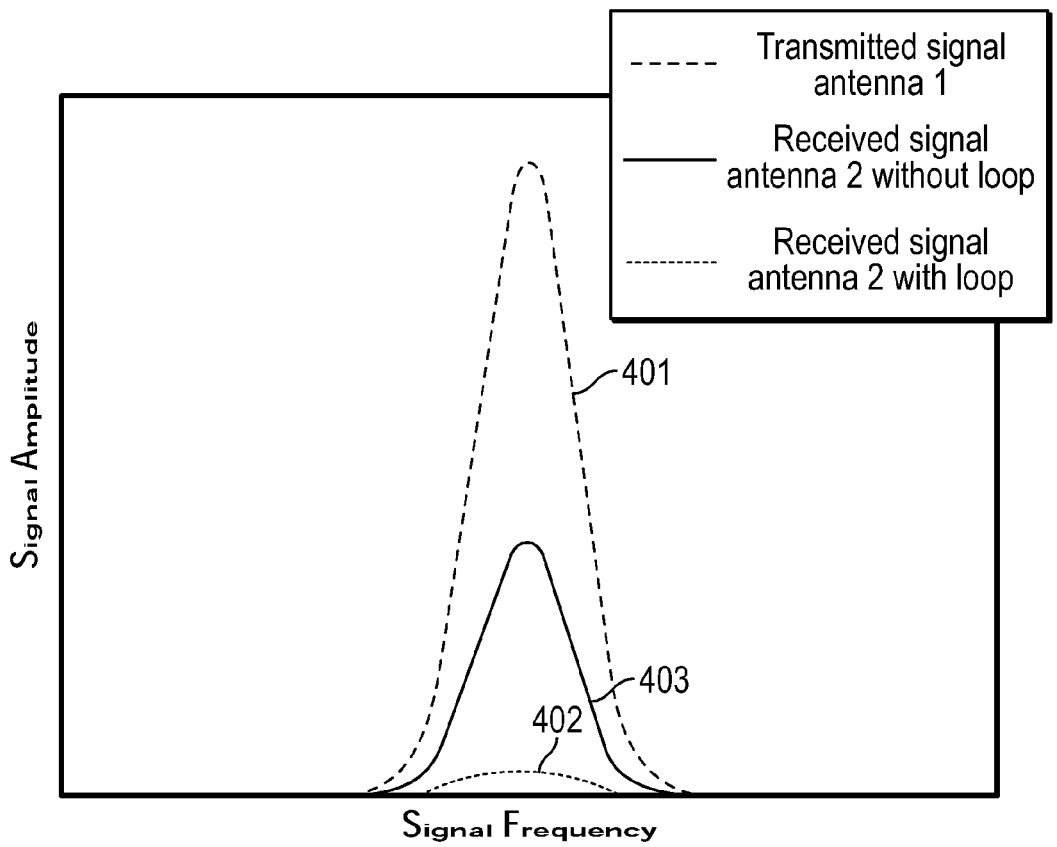
FIG. 4 shows a graph of a signal transmitted from a transmitter element, a graph of the signal on sensor element when the loop is not present, and a graph of the signal generated from the loop on sensor element 361 when the loop is present in accordance with some embodiments.

FIG. 4 shows a graph 401 of the amplitude of a signal transmitted from transmitter element 361, a graph 402 of the baseline signal on sensor element 362 when the loop 351 is not present, and a graph 403 of the signal generated from the loop on sensor element 362 when the loop 351 is present. The amplitude of the signal on the sensor element 362 increases with the presence of the loop 351. In some implementations, the single loop detection member illustrated by FIGS. 3 and 4 may be used to provide a 1 bit binary code indicating presence "1" or absence "0" of the cartridge.

A near-field coupled signal between the conductive loop 351 and the sensor elements 361, 362 are identifiable in the signal generated from the loop in the sensor element 362, allowing the reader circuitry 363 detect a presence of the cartridge 301 inserted into the filtration manifold 302 by analyzing the signal of the sensor element 362. Furthermore, misalignment and/or other improper insertion of the cartridge 301 into the filtration manifold 302 may change the coupling between the loop 351 and the sensor elements 351, 362 and thus change the signal generated from the loop 351. The reader circuitry 363 may analyze the signal on the sensor element 362 to determine if the cartridge 301 is present and/or is properly inserted into the filtration manifold 302. In some implementations, discussed in more detail herein, the geometrical configuration of the loop may allow for the magnetic response of spaced apart loop sections and signals generated by the loop sections to represent a code that includes additional information about the cartridge such as cartridge identification (model number, serial number) and/or cartridge classification (media type, maximum volume, flow rate).

As illustrated in FIGS. 3 and 4, in some embodiments the conductive loop may take the form of a single inductive turn loop. A single inductive turn loop provides the ability to fabricate the loop on a single layer without the need to have a crossover feature, resulting in a lower cost manufacturing process and increased reliability.

The physical shape, configuration, and/or orientation of the conductive loop may provide additional complexity and capability to the detection system. Although more complex and may result in the detection member and sensors to incur additional manufacturing cost, the difficulty to defeat the authentication and the ability to classify and/or identify components upon which the detection member is attached, may be significantly increased.

The spatial arrangement of sections of the loop within the detection area is a representation of a code that may be visually observed and/or can be electronically detected when the loop is electromagnetically excited to generate magnetic phase and/or amplitude responses in the loop sections and to generate signals from the loop sections.

Figure 5A:
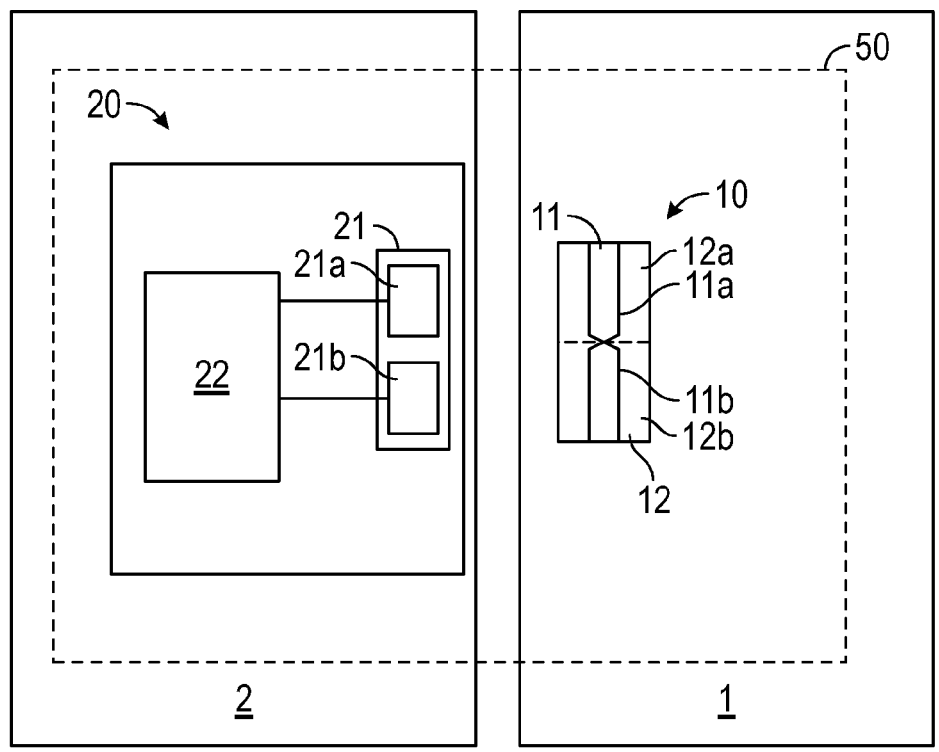
FIG. 5A illustrates a component having a detection member comprising at least one closed electrically conductive loop having at least spaced apart two loop sections in accordance with some embodiments.

FIG. 5A illustrates a component 1 having a detection member 10 comprising at least one closed electrically conductive loop having at least two spaced apart loop sections 11a, 11b. In the example of FIG. 5A, the spaced apart loop sections 11a, 11b are arranged respectively in spaced apart sections 12a, 12b of a detection area 12 of the component 1. FIG. 5A illustrates a host device 2 having a detection sensor 20 capable of detecting the code of the detection member 10. The detection sensor 20 includes a sensor array 21 comprising sensor elements 21a and 21b that correspond to the sections 11a, 11b of the closed conductive loop 10. The detection sensor 20 includes detection circuitry 22 configured to drive one or more of the sensor elements 21a, 21b to transmit an electromagnetic signal and to receive sensed signals from one or more of the sensor elements 21a, 21b. The detection sensor 20 and the detection member 10 together form a detection system 50 which is enclosed by the dashed line in FIG. 5A.

When the component 1 and the host device 2 are within communication range of the detection system 50, the transmitted signal from transmitter element 21a electromagnetically excites at least one section 11a, 11b of the closed conductive loop 11. When at least one section 11a, 11b of the loop 11 is electromagnetically excited, each loop section 11a, 11b generates a predetermined magnetic response which may be a magnetic amplitude response, a magnetic phase response, or both. The magnetic amplitude and/or phase responses of one or more of the loop sections 11a, 11b correspond to at least a one digit code. The magnetic amplitude and/or phase response of at least one loop section 11a, 11b generates a signal on a corresponding sensor element 21a, 21b. The signal on the corresponding sensor element 21a, 21b represents the code.

In any of the embodiments described herein, the detection member disclosed herein may be used to detect, authenticate, classify, and/or identify a component that is used with a host device. In some embodiments, the detection member may sense a state of the component, such as the capacity of the component, upon which it is attached. The detection member and detection sensor may be used in a variety of applications where a disposable replacement element or article is changed to restore or renew a system's operation. Applications are numerous and can include, a filter bag component of a host device vacuum, a water treatment cartridge in a water treatment facility, a filter for a furnace, an air filter for a personal protection device, ink cartridges in a printer, tinting cartridges in a paint mixing system; caulking cartridge in a gun, cartridge in a dispenser, adhesive film in a dispenser, disposable paint cups on a spray gun, liquid colorant container for an injection molding machine, abrasive member for a grinding or sanding machine, cartridges for mixing machines that contain substances such as epoxies, body fillers, dental moldings, adhesives, or sealants, an air filter component in an automobile, a card key component with a host lock, etc. The detection member has applicability to any disposable/replaceable article configured to be inserted into or placed near a reusable receptacle.

Figure 6A:
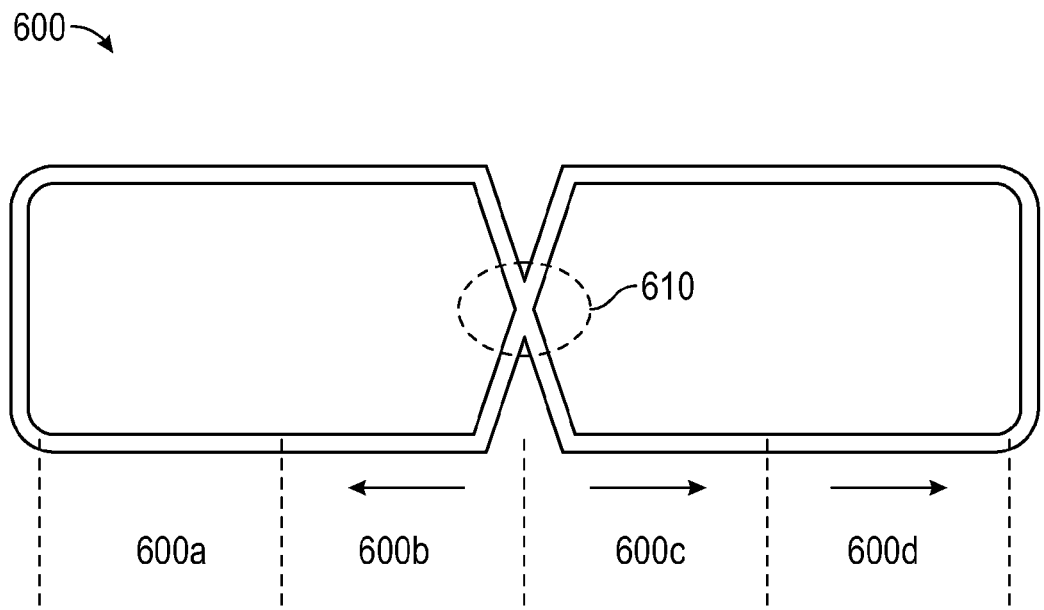
FIGS. 6A and 6B show a phase shifting feature of a loop section in accordance with some embodiments.
Figure 7A:
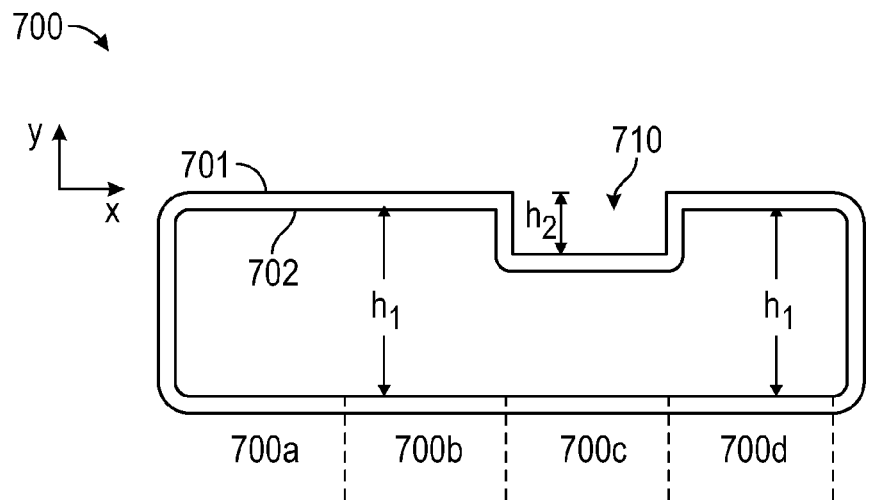
FIGS. 7A through 7C show a notch feature of a loop section in accordance with some embodiments.

Geometrical features of sections of the loop and/or the spatial arrangement of the loop sections can provide more complex codes that include multiple code digits. In some configurations, the extent of each loop section can be defined by one or more geometrical features of the loop. For example, some geometrical features may be disposed at the boundaries between loop sections, e.g., cross over features as depicted in FIG. 6A and/or some geometrical features may be disposed within the loop sections, e.g., notch features as depicted in FIG. 7A. The boundaries of the loop sections may be defined by the loop features. For example, a loop feature, such as a cross over feature or narrow notch may be disposed at a loop section boundary. Loop features such as a notch, branch, electrically conductive island and/or peninsula may be disposed within a loop section and correspond to a width of the loop section.

Embodiments discussed below present three digit code configurations as examples. It will be appreciated that the approaches discussed herein may be used to provide more or fewer digits of information. Furthermore, to simplify the illustrations, the detection area sections, loop sections, and sensor elements discussed herein are linearly arranged. However, the approaches are not constrained to linear arrangement of the detection area sections, loop sections and/or sensor elements, and two dimensional, three dimensional and/or non-linear arrangements are also possible and are encompassed by this disclosure.

As described in more detail below, in embodiments discussed herein at least one conductive loop is arranged in a detection area of the component, the detection area including one or more detection area sections. Each detection area section corresponds to a sensor element of the reader. In some implementations, the device may include indicator features that indicate the boundaries of the detection area and/or indicate the boundary of each detection area section. Such indicator features may include any type of indicator, e.g., indicators that are printed, molded, adhesively attached, or otherwise affixed to the device.

The closed conductive loop includes one or more loop sections respectively disposed in at least some of the detection area sections. The number of loop sections may be less than or equal to the number of detection area sections. A magnetic response generated by a first loop section disposed in a first detection area section may differ or be substantially the same as a magnetic response generated in a second loop section in a second section of the detection area. In some configurations, no loop section is included in some detection area sections, therefore there is no magnetic response generated in these detection area sections, resulting in a low or zero amplitude signal relative to the baseline signal on the sensor element corresponding to the detection area section with no loop section.

Figure 5B:
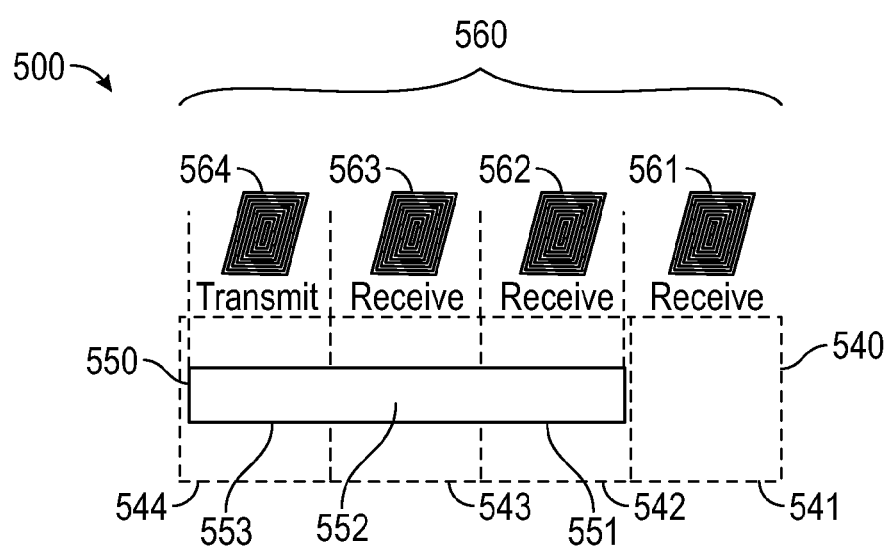
FIG. 5B shows a portion of a reader system including a sensor array with four sensor elements and a detection member comprising a closed electrically conductive loop disposed within a detection area in accordance with some embodiments.

FIG. 5B shows a portion of a detection system 500 including a sensor array 560 with four sensor elements 561, 562, 563, 564 and a detection member comprising a closed electrically conductive loop 550 disposed within a detection area 540. In this embodiment, the detection area 540 includes four detection area sections 541, 542, 543, 544. The loop 550 includes three loop sections 551, 552, 553. Loop section 553 is disposed in detection area section 544; loop section 552 is disposed in detection area section 543; loop section 551 is disposed in detection area section 542; and no loop section is disposed in detection area section 541. Each detection area section 541-544 corresponds to one sensor element 561-564, respectively, and is physically proximate to its corresponding sensor element 561-564. Detection area section 544, which contains loop section 553, is proximate to sensor element 564 which is the transmitting element in this embodiment. Detection area sections 541 through 543 correspond respectively to receiver elements 561 through 563.

When loop section 553 is electromagnetically excited by an electromagnetic signal transmitted by the transmitter element 564, a current is induced in the loop 550 causing each loop section 551-553 to generate a predetermined magnetic response. Current (or voltage) signals are generated by induction from the loop sections 552, 551 onto corresponding sensor elements 562, 563 due to the magnetic responses of the loop sections 552, 551. There is no loop section in detection area section 541, thus no signal is generated from a loop section on sensor element 561 from detection area section 541.

The predetermined magnetic responses generated by loop sections 551 and 552 in detection area sections 542 and 543 and the lack of a magnetic response in detection area section 541 with no loop section correspond to a code. The code is represented in relatively high amplitude signals generated by induction from detection area sections 542 and 543 onto sensor elements 562 and 563 and a relatively low amplitude signal generated from detection area section 541 onto sensor element 561.

The magnetic responses generated by loop sections 551 and 552 in detection area sections 542 and 543 increases the coupled signal between the transmit sensor element 564 and receive sensor elements 562 and 563 relative to the coupled signal of detection area section 541 with no loop section and thus no magnetic response. The increased coupled signal results in relatively high amplitude electromagnetic signals on sensor elements 562 and 563. The relatively high amplitude received signals are interpreted by the reader circuitry (not shown in FIG. 5B) as a logic level 1. The coupling between the transmitter element 564 and the sensor element 561 in detection area section 541 is relatively low and thus the signal generated on sensor element 561 is relatively low. The relatively low amplitude signal on sensor element 561 is interpreted by the reader circuitry as a logic level 0. Thus, when the magnetic response in detection area section 541 and the signal on sensor element 561 are designated as the least significant bit (LSB) of the code and the magnetic response in detection area 543 and the signal on sensor element 563 are designated as the most significant bit (MSB) of the code, the spatial arrangement of the loop sections and their magnetic responses in the detection area sections correspond to the binary code 110, or decimal 6, which is represented in the signals from sensor elements 561-563.

Geometrical features of the closed conductive loop can cause different predetermined magnetic phase and/or amplitude responses to be generated in different spaced apart sections of the loop when the loop is electromagnetically excited. The different phase and/or magnitude responses correspond to a code that is represented in signals generated on the sensor elements from the loop sections. In the presence of an electromagnetic field, current is induced in the loop in a direction that creates an opposing magnetic field. The induced current in the loop is dependent on the coupling of the loop with the transmitting element of the detection sensor. The size, shape and/or orientation features of the loop relative to the individual sensor elements modifies near-field coupling locally between the loop sections and the corresponding sensor elements. The loop sections may have varying coupling coefficients with corresponding sensor elements due to the geometrical features of the loop sections. The loop sections may be visibly identified by the presence of local size, shape, and orientation variations of the loop sections, although this may not always be possible.

In some scenarios, the loop may include at least one of a phase shifting feature such that when the loop is electromagnetically activated the loop generates a first magnetic phase response in one or more first sections of the loop and generates a second magnetic phase response in one or more second sections of the loop. For example, the first magnetic phase response and the second magnetic phase response may be separated in phase by 180°.

Figure 6B:
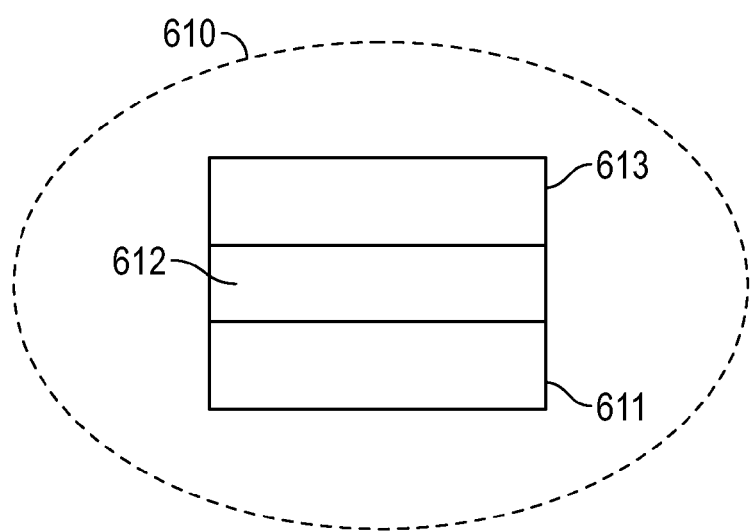

As an example, the phase shifting feature may comprise a crossover feature 610 of the loop 600 as illustrated in FIGS. 6A and 6B. As shown in the cross section of FIG. 6B, at the crossover 610, a first portion 613 of the loop 600 crosses over a second portion 611 of the loop 600 with an electrically insulating material 612 separating the crossover portions 611, 613. In some embodiments, the electrically insulating material 612 may be air.

The loop 600 of FIG. 6A includes four sections 600a-d, where, section 600a corresponds to the transmitter element of the reader (not shown in FIG. 6A) that electromagnetically excites the loop 600 at loop section 600a. When loop section 600a is electromagnetically excited, a current is induced the loop 600 that generates a magnetic field opposing the transmitted electromagnetic signal. The magnetic phase response of section 600b is in phase (0° phase shift) with respect to the magnetic field generated in section 600a. The signal generated from section 600b on its corresponding sensor element of the reader (not shown in FIG. 6A) has a 0° phase shift with respect to the transmitted electromagnetic signal representing the 0° phase shift of the magnetic response of loop section 600b. The angular direction of the current in the loop 600 changes, e.g., substantially reverses, at the cross over 610 causing the magnetic phase response of loop sections 600c and 600d to have a 180° phase shift with respect to loop section 600a. The signal generated from sections 600c and 600d on corresponding sensor elements of the reader (not shown in FIG. 6A) are shifted in phase from the transmitted electromagnetic signal by 180°, representing the 180° phase shift of the magnetic response of sections 600c and 600d relative to 600a. The phase of the magnetic response of the loop sections can correspond to a code, e.g., 180° phase shift may be interpreted as a logic 1 and 0° phase shift may be interpreted as a logic zero, for example. The code is represented in the phase shift of the signals generated on the sensor elements by the loop sections 600b-600d.

The current (or voltage) signals induced on the sensor elements from the loop sections depend on the local coupling between the loop sections and the corresponding sensor elements. Local coupling between loop sections and corresponding sensor elements depends on the separation distance between the loop section and the corresponding sensor element, the shape of the loop section relative to the shape of the sensor element, and/or the angular orientation of the loop section relative to the angular orientation of the sensor element.

For example, lower coupling may be achieved by designing a loop section coupling to a corresponding sensor element which results in a smaller signal generated on the corresponding sensor element from the loop section. Higher coupling may be achieved by designing a loop section coupling to a corresponding sensor element which results in a larger signal generated from the loop section on the corresponding sensor element. Higher coupling can be achieved by making the area of a loop section more similar to the area of a corresponding sensor element and lower coupling can be achieved by making the area of a loop section less similar to the area of a corresponding sensor element. Making the area of the loop section less similar to the area of the corresponding sensor element can be achieved by making the area of the loop section smaller or larger. The area of a loop section is bounded by inner edges of the conductive loop and/or by one or more borders of the adjacent loop sections.

In some scenarios, the loop may include at least one amplitude changing feature that increases or decreases the amplitude of the sensor signal generated by the magnetic amplitude response of at least one section of the loop relative to a similarly constructed loop section without the feature. The relative increase or decrease in the generated sensor signal is dependent on the on geometrical similarity between the loop section and its corresponding sensor element, wherein geometrical similarity or correspondence connotes that the shape and area of the perimeter of the loop section is similar to the shape and area of the perimeter of the sensor element and the loop section substantially overlaps the sensor element. Relatively larger or smaller amplitude signal on the sensor element may occur because the amplitude changing feature causes the size and/or shape of the loop section to correspond more or less closely with the size and/or shape of the sensor element as illustrated in FIGS. 7-9.

One or more notched sections of the loop can affect the coupling between the notched loop sections and their corresponding sensor elements and thus affects signals generated from the notched loop sections. The size and/or shape of the notches may cause the loop sections to correspond more or less closely with the corresponding sensor elements when compared to a similarly constructed loop section that is not notched. Thus, the size and/or shape of the notches may result in a magnetic amplitude response of the notched sections that generate signals on corresponding sensor elements that are larger or smaller than signals generated by similarly constructed un-notched loop sections.

The loop 700 shown in FIG. 7A includes four loop sections 700a-d of substantially equal width that extend linearly along the x direction in loop 700, where section 700a corresponds to the position of the transmitter element of the reader (not shown in FIG. 7) that electromagnetically excites the loop 700. The current induced in the loop by the electromagnetic signal transmitted by the transmitter element generates a predetermined magnetic amplitude response in each loop section. Signals are generated from the loop sections 700b-700d respectively onto three sensor elements (not shown in FIG. 7A). The signals represent the magnetic amplitude responses of the loop sections 700b-700d. FIG. 7A loop 700 has a notch 710 that extends for some distance along the x-axis across loop section 700c. For example, the notch 710 may extend along the x-axis across the loop by at least about 10%, 25%, 50%, or 75% of loop section 700c. The notch 710 may extend along the x-axis across substantially all, e.g., more than about 95%, of the loop section 700c as shown in FIG. 7A. The depth, h2, of the notch 710 along the y-axis may be more than about 10%, 25%, 50%, or 75% but less than 100% of the maximum height, h1, of the loop 700.

The non-electrically conductive area between the inner edge 702 of the loop in sections 700b and 700d is larger than the non-electrically conductive area between the inner edge 702 of loop section 700c. For example, the area of notched loop section 700c may be less than 95%, 75%, 50%, 25% or 10% but greater than 0% of the area of loop section 700b.

In further examples, the area of notched loop section 700c may be less than 4 cm², or less than 2 cm², or less than 1 cm², or less than 5 mm².

Figure 7B:
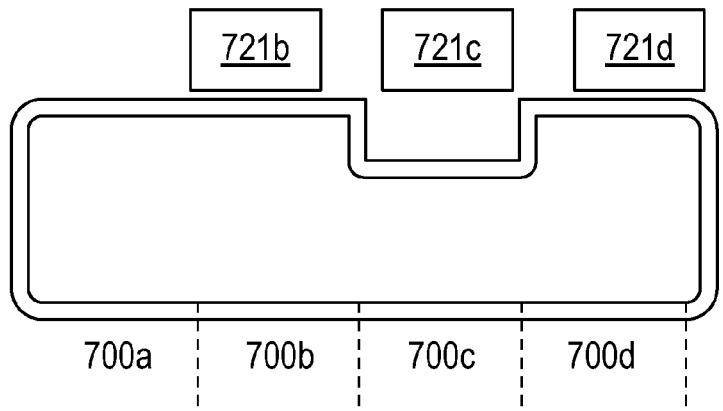

The notch 710 may cause the geometry of the loop section 700c to correspond more or less closely to the sensor element corresponding to loop section 700c. For example, FIG. 7B shows sensor elements 721b-721d above loop sections 700b-700d. As illustrated, the geometry of sensor elements 721b and 721d corresponds more closely with the geometry of loop sections 700b and 700d and the geometry of sensor element 721c corresponds less closely with the geometry of loop section 700c when compared to the geometrical correspondence of sensor elements 721b, 721d and loop sections 700b, 700d. Coupling between loop sections 700b and 700d and corresponding sensor elements 721b and 721d is higher than the coupling between loop section 700c and sensor element 721c due to the closer geometrical correspondence. Thus, the magnetic amplitude response of loop section 700c generates a relatively lower amplitude signal on sensor element 721c and the magnetic amplitude responses of loop sections 700b and 700d generate relatively higher amplitude signals on loop sections 731b and 731d, respectively. If a "0" value is assigned to a relatively lower amplitude signal and a "1" value assigned to a relatively higher amplitude signal, an n-bit identification number can be determined by the reader via binary decoding of the signals induced on the sensor elements where n is equal to the number of loop sections −1. The magnetic amplitude responses of the loop sections and thus the amplitude of the generated signals onto the sensor elements may be multi-level, providing a tertiary, quaternary, or higher order code.

Figure 7C:
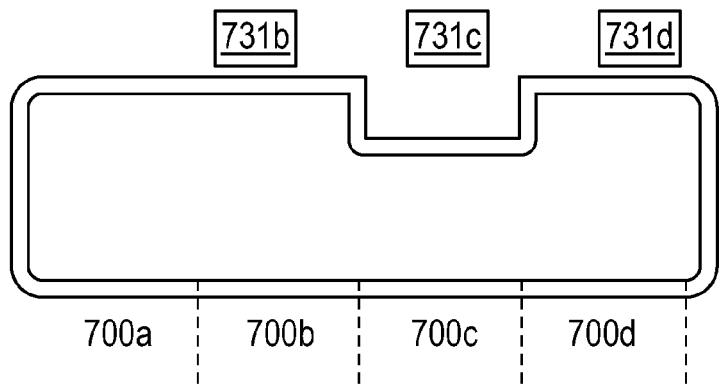

A different scenario is illustrated in FIG. 7C, wherein higher coupling is achieved between notched loop section 700c and corresponding sensor element 731c due to closer geometrical correspondence. The un-notched loop sections 700b and 700d have lower coupling with their corresponding sensor elements 731b and 731d. Thus, the magnetic amplitude response of loop section 700c generates a relatively larger amplitude signal on sensor element 731c and the magnetic amplitude responses of loop sections 700b and 700d generate relatively lower amplitude signals on sensor elements 731b and 731d, respectively.

A branch in a loop section may cause the coupling between the loop section and its corresponding sensor element to be increased or decreased relative to the coupling of similarly constructed but unbranched loop sections.

Figure 8A:
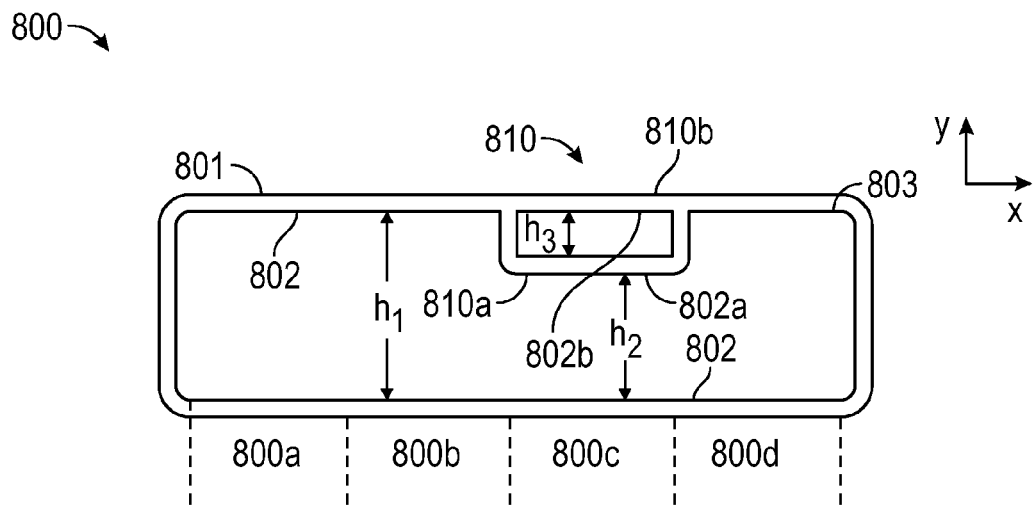
FIGS. 8A through 8C show a branch feature of a loop section in accordance with some embodiments.

The loop 800 shown in FIG. 8A includes four equal width loop sections 800a-d that extend linearly along the x direction in FIG. 800, where section 800a corresponds to the position of the transmitter element of the reader (not shown in FIG. 8) that electromagnetically excites the loop section 800a. For simplicity of explanation, equal width loop sections are represented in the diagrams, however, it will be appreciated that in some embodiments, loop sections of unequal widths may be used.

The transmitted electromagnetic signal induces a current through the conductive loop 800 that generates a predetermined magnetic amplitude response in each loop section 800b-800d. Signals are generated from the loop sections 800b-800d onto three sensor elements which are not shown in FIG. 8A. The signals represent the coupling of magnetic amplitude responses of the loop sections 800b-800d with their corresponding sensor elements.

Loop 800 has a branch feature 810 comprising two loop branches 810a, 810b that extend for some distance along the x-axis across loop section 800c. For example, the branch feature 810 may extend along the x-axis across more than 10%, 25%, 50%, or 75% of loop section 800c. The branch feature 810 may extend along the x-axis across substantially all, e.g., more than 95%, of the loop section 800b as shown in FIG. 8A. The depth, h3, of the lower branch 810a along the y-axis may be more than 10%, 25%, 50%, or 75% but less than 100% of the maximum height, h1, of the loop 800.

The two branches 810a, 810b are electrically connected in parallel and thus the current in the branch feature is divided between the two branches 810a, 810b. A first area of loop section 800c between furthest inner edge 802b of the branch feature 810 and inner edge 802 is equal to the areas of loop sections 800b and 800d. A second area of loop section 800c between closest inner edges 802a of the branch feature and inner edge 802 is smaller than the areas of loop sections 800b and 800d. For example, the second area of branched loop section 800c may be less than 95%, 75%, 50%, 25% or 10% but greater than 0% of the area of the loop sections 800b or 800d.

Figure 8B:
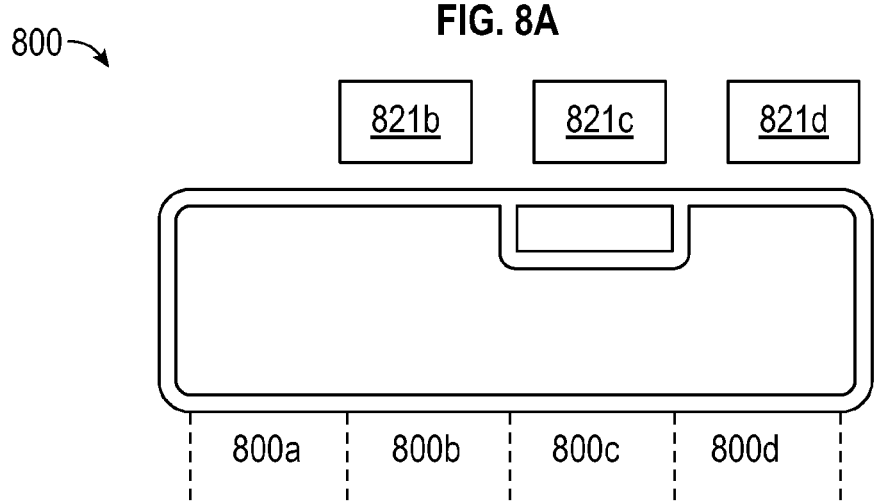

As illustrated in FIG. 8B, where the area of the sensor elements 821b, 821d is similar to the area of loop sections 800b, 800d, the division of current between the two branches 810a, 810b in loop section 800c causes the coupling of loop section 800c with its corresponding sensor element 821c to be relatively smaller when compared to the coupling of sections 800b and 800d with their respective sensor elements 821b and 821d. The relatively lower coupling of loop section 800c with its corresponding sensor element 821c causes the magnetic response of loop section 800c when electromagnetically excited to generate a relatively lower amplitude signal on sensor element 821c. The relatively higher coupling of loop sections 800b and 800d with sensor elements 821b and 821d, respectively, cause the magnetic response of loop sections 800b and 800d to generate relatively higher amplitude signals on their corresponding sensor elements 821b and 821d.

Figure 8C:
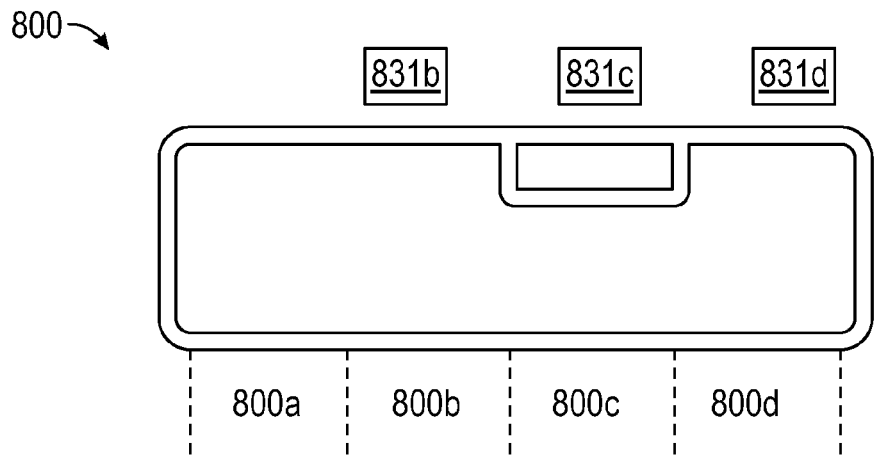

Alternatively, as shown in FIG. 8C, a relatively higher coupling may be achieved between branched loop section 800c and its corresponding sensor element when the geometry of inner edges 802a and 802 has greater similarity to the geometry of the corresponding sensor element when compared to the geometrical correspondence of un-branched loop sections 800b and 800d and their corresponding sensor elements. The relatively higher coupling of loop section 800c with its corresponding sensor element 831c causes the magnetic response of loop section 800c when electromagnetically excited to generate a relatively higher amplitude signal on sensor element 831c. The relatively lower coupling of loop sections 800b and 800d with sensor elements 831b and 831d, respectively, cause the magnetic response of loop sections 800b and 800d when electromagnetically excited to generate relatively lower amplitude signals on their corresponding sensor elements 831b and 831d.

Figure 9A:
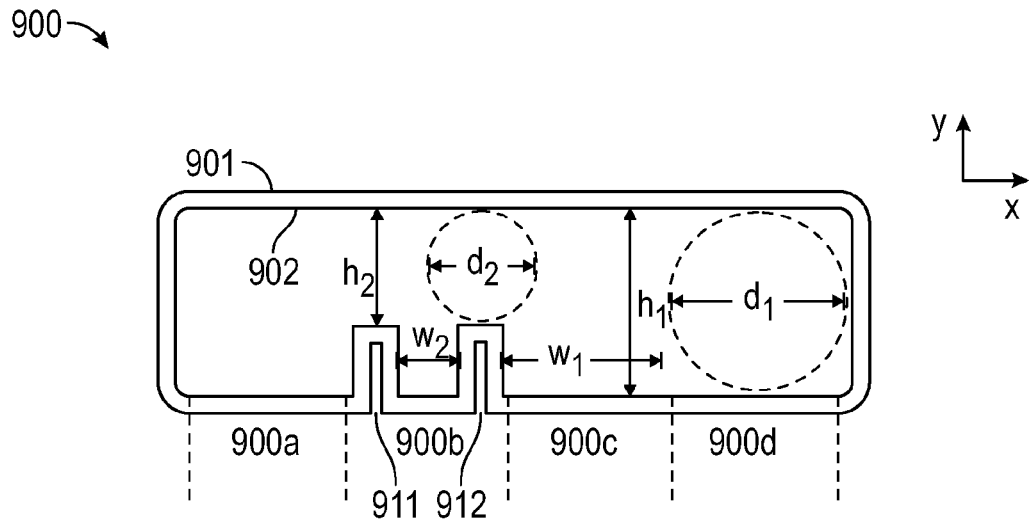
FIGS. 9A and 9B show a notch features of a loop section in accordance with some embodiments.
Figure 9B:
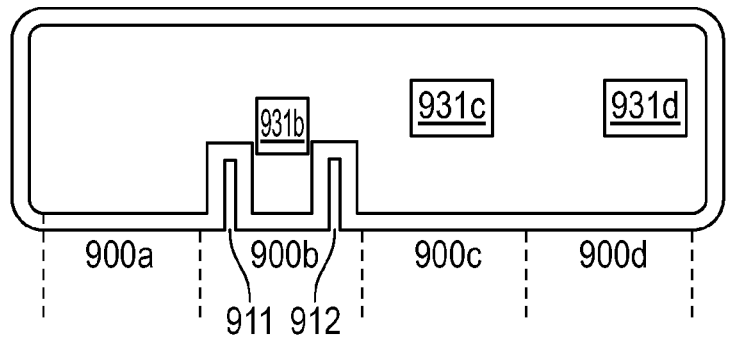

FIGS. 9A and 9B illustrate an embodiment in which notches in a loop section can cause inductive coupling between the notched loop section with its corresponding sensor element to be greater than the inductive coupling between other un-notched loop sections and their respective sensor elements. The greater inductive coupling is due to the notched loop section having greater geometrical correspondence with its corresponding sensor element when compared to a similarly constructed un-notched loop section.

The loop 900 shown in FIG. 9A includes four equal width loop sections 900a-d that extend linearly along the x direction in FIG. 9A, where section 900a corresponds to the position of the transmitter element of the reader (not shown in FIG. 9A) that electromagnetically excites the loop 900.

The induced current through the conductive loop results in a predetermined magnetic response in each loop section 900b-900d. Signals are generated from the loop sections 900b-900d respectively onto three sensor elements (not shown in FIG. 9A). The signals represent coupling of the magnetic responses of the loop sections 900b-900d with their respective elements 931b-931d.

In this example, loop 900 includes notches 911, 912 that each extend for some distance along the x-axis across loop section 900b. Although two notches are shown, fewer or more than two notches may be present in a loop section. The notches 911, 912 may be positioned at or near the borders of the loop section. As shown in FIG. 9A, notch 911 is positioned within loop section 900b at the border of loop section 900b and loop section 900a. Notch 912 is positioned within loop section 900b at the border of loop section 900b and loop section 900c. For example, a notch 911, 912 may extend along the x-axis across the loop section 900b less than about 50%, or less than about 25%, or less than about 10% of loop section 900b. For example, a notch 911, 912 may extend along the y-axis across the loop section 900b more than 10%, 25%, 50%, or 75% but less than 100% of loop section 900b.

As shown in FIG. 9A, a largest circle that will fit within inner edges of the shortest conductive path of the closed conductive loop 900 in an un-notched section, such as section 900d, has diameter d1. A largest circle that will fit within the inner edges of the shortest conductive path of the closed conductive loop 900 in a notched section, such as section 900b has diameter d2, where d1>d2. The largest circle that will fit within the inner edges of the closed conductive loop 900 in the notched section may have diameter d2 which is less than about 3 cm.

As shown in FIG. 9B, in this embodiment, the notches 911, 912 cause the perimeter of the loop section 900b to correspond more closely to the perimeter of the sensor element corresponding to loop section 900b when compared to un-notched sections 900c and 900d. Loop sections 900b-900d would have equal areas but for the notches in loop section 900b which reduces the area of loop section 900b. The area of loop section 900b is bounded by the inner edge 902 of the loop 900 and by loop section 900a to the left and loop section 900c to the right. The area of loop section 900c is bounded by the inner edge 902 of the loop 900 and by loop section 900b to the left and loop section 900d to the right. The area of loop section 900d is bounded by the inner edge 902 of the loop 900 and by loop section 900c to the left.

As illustrated in FIG. 9B, the perimeter of sensor element 931b corresponds more closely with the perimeter of loop section 900b and the perimeters of sensor elements 931c and 931d when compared to the perimeter correspondence of loop sections 900c and 900d. Coupling between loop sections 900b and 900d and corresponding sensor elements 931c and 931d may be lower than the coupling between loop section 900b and sensor element 931b due to the closer perimeter similarity of loop section 900b and sensor element 931b. The relatively lower coupling of loop sections 900c and 900d with their corresponding sensor elements 931c, 931d causes the magnetic responses of loop sections 900c and 900d to generate a relatively lower amplitude signal on corresponding sensor elements 931c and 931d when loop section 900a is electromagnetically excited. The relatively higher coupling of loop section 900b with corresponding sensor element 931b causes the magnetic response of loop section 900b to generate a relatively higher amplitude signal on corresponding sensor element 931b when loop section 900a is electromagnetically excited.

The magnetic amplitude response of the loop section can depend at least in part on the number of inductive turns within the loop section. Note that a loop section that includes more than one inductive turn will require a cross over. The inducted signal on the receiving sensor element relative to the transmitted signal depends on the turns ration between loop sections coupled to the transmitter element and to the sensor element.

Figure 10:
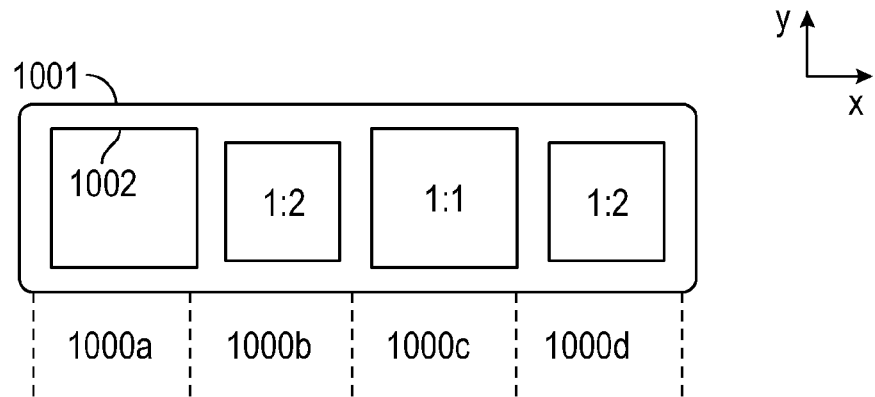
FIG. 10 illustrates a closed conductive loop with multiple turns in some loop sections in accordance with some embodiments.

FIG. 10 depicts a loop 1000 having four equal width loop sections 1000a-1000d that extend linearly along the x direction in FIG. 10, where section 1000a corresponds to the position of the transmitter element of the reader (not shown in FIG. 10) that electromagnetically excites the loop 1000, inducing a current through the conductive loop 1000. The induced current generates a predetermined magnetic amplitude response in each loop section 1000b-1000d. Signals are generated from the loop sections 1000b-1000d respectively onto three sensor elements (not shown in FIG. 10). The signals represent the predetermined magnetic amplitude responses of the loop sections 1000b-1000d.

In this example, loop sections 1000b and 1000d are two inductive turn loop sections having a turns ratio with respect to their corresponding sensor elements of 1:2. Loop section 1000c is a single inductive turn section, having a turns ratio with respect to its corresponding sensor element of 1:1. When electromagnetically excited, the magnetic amplitude response of the 1:2 turns ratio loop sections 1000b and 1000d generate a relatively higher signal on their corresponding sensor elements whereas the magnetic amplitude response of the 1:1 turns ratio loop section 1000c generates a relatively smaller signal on its corresponding sensor element. The signals generated from the loop sections 1000b-1000d represent a code that corresponds to the magnetic amplitude response of the loop sections 1000b-1000d.

A loop may include at least one masking feature that reduces the magnetic amplitude response inside the loop section relative to similarly constructed loop sections that do not include a masking feature, modify the inductance or capacitance of a coupled sensor element, or a combination of both. The masking feature may be an electrically conductive region within the loop section that supports eddy currents which can be induced by the transmitted electromagnetic signal. The eddy currents are disposed within the shortest conductive path of the closed conductive loop. The area of an electrically conductive area may be at least about 10%, or at least about 20% or at least about 30%, or at least about 50%, and less than about 70% or less than about 80%, or less than about 90% of the non-conductive area encompassed by the loop section.

Figure 11:
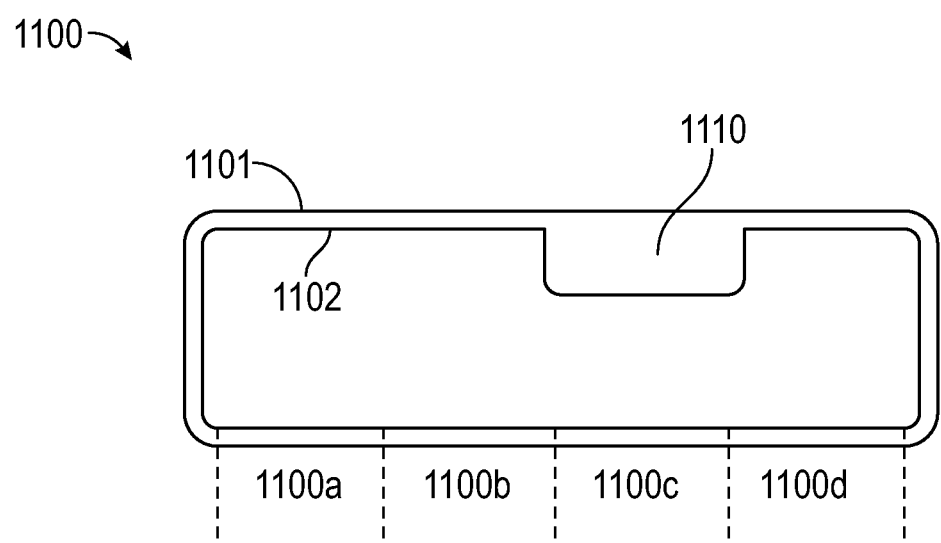
FIGS. 11 and 12 show masking features of loop sections in accordance with some embodiments.

FIG. 11 shows a closed electrically conductive loop having four equal width loop sections 1100a through 1100d extending along the x-axis. Loop section 1100a is positioned to correspond to the transmitter element of a reader which is not shown in FIG. 11. The electromagnetic signal transmitted by the transmitter element induces a current in the loop section 1100a and the induced current generates a magnetic amplitude response from loop sections 1100b through 1100d.

Figure 12:
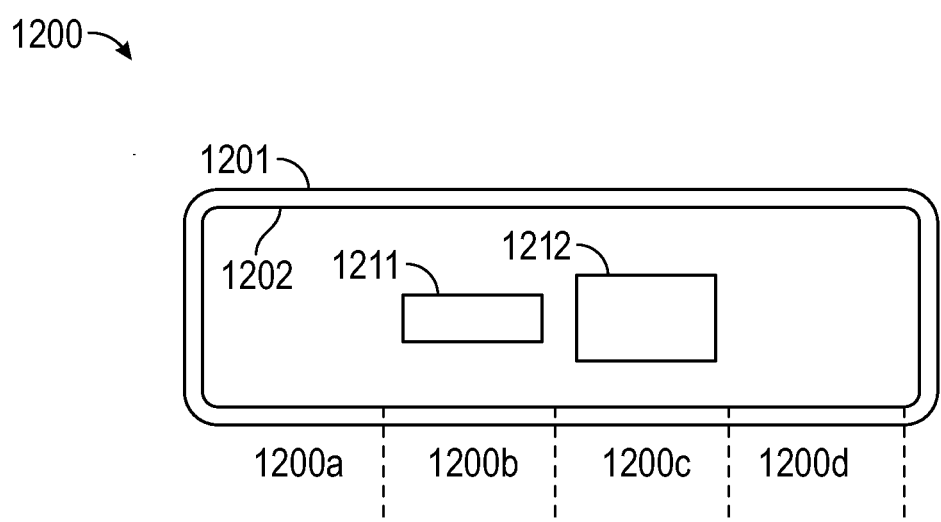

The electrically conductive region 1110 comprises a conductive peninsula that modifies the magnetic field of the loop region 1100c. In this example, the conductive region 1110 is electrically connected to the loop, although this need not be the case as illustrated in FIG. 12. The conductive region 1110 modifies the magnetic response of loop section 1100c and modifies coupling between the loop section 1110c and its corresponding sensor element when compared to when compared to similarly constructed loop sections 1100b and 1100d without a conductive region. The conductive region 1110 may have an area that is greater than 10%, 25%, 50%, or 75% but less than 100% of the area of the loop section which contains it where the area of the loop section is bounded by inner edges 1102 of the loop and/or borders of adjacent loop sections.

A conductive loop may include multiple conductive regions as illustrated by conductive loop 1200 of FIG. 12. Conductive regions may be electrically connected to the loop or may be electrically disconnected from the loop as illustrated by conductive regions 1211 and 1212 in FIG. 12. Loop 1200 includes four equal width loop sections that extend along the x-axis where section 1200a is positioned to correspond to the transmitter element which is not shown in FIG. 12. The electromagnetic signal from the transmitter element induces a current in the loop 1200 that generates magnetic amplitude responses in each of loop sections 1200b, 1200c, 1200d. Loop section 1200b includes a first conductive region 1211 and loop section 1200c includes a second conductive region 1212 having a larger area than the area of conductive region 1211. Electromagnetic excitement of the loop 1200 induces a first eddy current in conductive region 1211 and a second eddy current in conductive region 1212. For example, the eddy current in the larger area region 1212 may be larger than the eddy current in the smaller area region 1211.

The presence of the eddy currents in the conductive regions 1211, 1212 of loop sections 1200b and 1200c can decrease the magnetic amplitude response of loop sections 1200b, 1200c relative to a similarly constructed loop section 1200d that does not include a conductive region. The decrease in magnetic amplitude response corresponds to decreased coupled signal between loop sections 1200b, 1200c and their corresponding sensor elements. Furthermore, the magnetic response of loop section 1200c is decreased relatively more than the magnetic response of loop section 1200b due to the larger eddy current in region 1212 of loop section 1200c compared with the smaller eddy current in region 1211 of loop section 1200b. Signals generated from the loop sections 1200b, 1200c, 1200d on corresponding sensor elements represent the magnetic amplitude responses of the loop sections 1200b, 1200c, 1200d. In this example, loop section 1200d would generate a signal having the relatively highest amplitude on its corresponding sensor element that could be interpreted as level 2 of a tertiary code, loop section 1200c would generate a signal having the relatively lowest amplitude signal on its corresponding sensor element that could be interpreted as level 0 of the tertiary code, and loop section 1200b would generate a signal having an amplitude between that of the signals generated by loop section 1200b and loop section 1200d that could be interpreted as level 1 of the tertiary code.

FIGS. 13 through 15 illustrate operation of detection members that generate magnetic phase and/or amplitude responses corresponding to codes when the detection members are electromagnetically excited. FIGS. 13 through 15 illustrate detection members comprising one or more closed electrically conductive loops disposed in a detection area of a component. FIGS. 13 through 15 also illustrate a portion of a host device comprising a reader including sensor elements where a transmitter element transmits an electromagnetic signal to excite the loop sections and signals are generated onto sensor elements in accordance with the magnetic responses of the loop sections.

In each of the examples of FIGS. 13 through 15, the magnetic phase and amplitude responses of the loop sections correspond to a three digit binary code which is represented in the phase and amplitude of the signals generated from the respective loop sections. Although a three digit binary code is illustrated in these examples, it will be appreciated that the code could have more or fewer digits. Although binary codes are illustrated, tertiary, quaternary, or higher order codes could be implemented. For example, the magnetic amplitude responses of the loop sections could have three, four, or more designated magnetic amplitude response levels and the corresponding electromagnetic signals generated by the loop sections could have three, four, or more designated amplitude levels to implement a tertiary quaternary, or higher code.

In the embodiments shown in FIGS. 13A through 13G, each of the closed conductive loops 1311-1317 extends linearly with four spatially separated loop sections. One loop section is arranged closest to the transmitter element and is electromagnetically excited by the transmitter element. The loops include at least one cross over feature that shifts the phase of the magnetic phase response of a loop section relative to the phase of the magnetic response of the electromagnetically excited loop section (the leftmost loop section) and shifts the phase of the signals generated on the sensor elements relative to the phase of the transmitted electromagnetic signal. Typically the section boundary will pass through a crossover feature, but this is not necessarily the case.

In each example provided in FIGS. 13A through 13G, a logic level 1 is assigned to a magnetic phase response of a loop section with a substantially 180° phase shift relative to the loop section coupled to the transmitter element which is the leftmost loop section in each example. The 180° phase shift of the magnetic phase response results in a 180° phase shift between the signal generated from the loop section on its corresponding sensor element and the transmitted signal. A logic level 0 is assigned to a magnetic phase response of a loop section with a 0° phase shift relative to the loop section coupled to the transmitter element. The 0° phase shift of the magnetic phase response results in a 0° phase shift between the signal generated from the loop section on its corresponding sensor element and the transmitted signal. A logic level 0 is also assigned to a low (or zero) amplitude signal on a sensor element. In these examples, the signal on the rightmost sensor element 1330d is designated as corresponding to the least significant bit (LSB) of the code and the signal on the leftmost sensor element 1330b is designated as corresponding to the most significant bit (MSB) of the code.

Figure 13A:
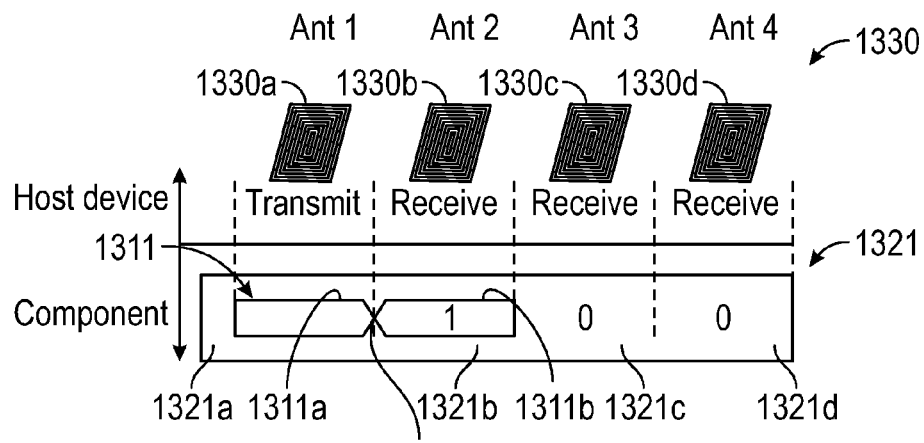
FIGS. 13A through 13G show closed conductive loops with crossover features in between some loop sections wherein the magnetic response of the loop sections corresponds to a code in accordance with some embodiments.

FIG. 13A illustrates a portion of a component that includes a detection member comprising a closed conductive loop 1311 disposed within a detection area 1321 of the component. FIG. 13A also illustrates a portion of a host device comprising reader 1330 including sensor elements 1330a-1330d.

Detection area 1321 includes four spatially separated detection area sections 1321a, 1321b, 1321c, 1321d in this example. Loop 1311 includes two spatially separate loop sections 1311a, 1311b disposed respectively in detection area sections 1321a, 1321b with a cross over feature 1341 disposed between loop sections 1311a and 1311b. Electromagnetic excitation of the first loop section 1311a by an electromagnetic signal transmitted from the transmitter element 1330a induces a current in the first loop section 1311a that generates a magnetic field in the first loop section 1311a that opposes the magnetic field of the transmitted electromagnetic signal. The cross over feature 1341 reverses the direction of the current through loop section 1311b, shifting the phase of the magnetic response in the second loop section 1311*b* from that of the first loop section 1311*a* by 180°. A signal is generated on sensor element 1330*b* from the second loop section, wherein the signal on sensor element 1330*b* is shifted in phase by 180° with respect to the transmitted signal due to the cross over feature 1340.

There are no loop sections in detection area sections 1321*c* and 1321*d* causing the signal on sensor elements 1330*c* and 1330*d* to have a low or zero amplitude. In this particular example, a logic level 1 is assigned to signal with a 180° phase shift relative to the transmitted signal; a logic level 0 is assigned to a signal with a 0° phase shift relative to the transmitted signal; and a logic level 0 is assigned to a signal with low or zero amplitude. With this interpretation, the signals on the sensor elements 1330*b*-1330*d* represent the three digit binary code 100, or decimal 4, where the signal on sensor element 1330*d* is designated as corresponding to the least significant bit (LSB) of the code and the signal on sensor element 1330*b* is designated as corresponding to the most significant bit (MSB) of the code.

Figure 13B:
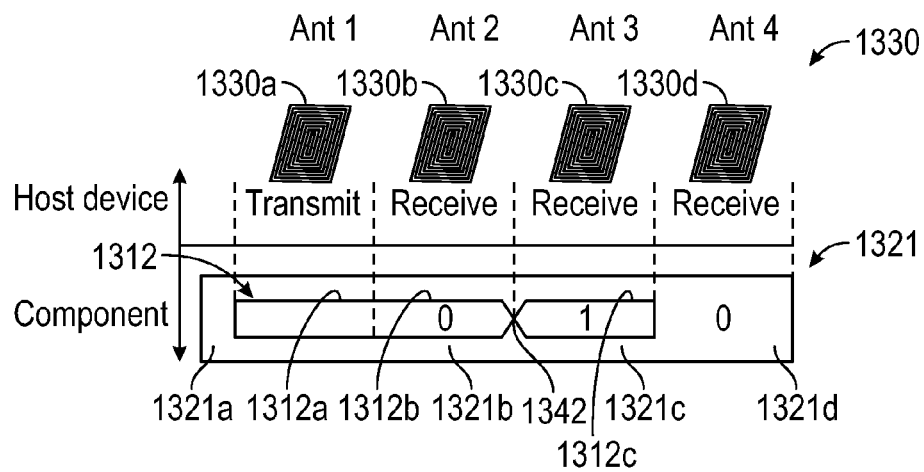

FIG. 13B illustrates a portion of a component that includes a detection member comprising a closed conductive loop 1312 disposed within a detection area 1321 of the component. FIG. 13B also illustrates a portion of a host device comprising a reader 1330. Closed conductive loop 1312 includes three spatially separate loop sections 1312*a*, 1312*b*, 1312*c* disposed respectively in detection area sections 1321*a*, 1321*b*, 1321*c* with a cross over feature 1342 disposed between loop sections 1312*b* and 1312*c*. Electromagnetic excitation of the first loop section 1312*a* by an electromagnetic signal transmitted from the transmitter element 1330*a* induces a current and a corresponding magnetic field in the first loop section 1312*a* that opposes the magnetic field of the transmitted electromagnetic signal. Current induced in the second loop section 1312*b* generates a magnetic response that has a 0° phase shift with respect to the magnetic field in the first loop section 1312*a*. The electromagnetic signal generated by loop section 1312*b* on sensor element 1330*b* has a phase shift of 0° with respect to the signal transmitted by sensor element 1330*a*. The cross over feature 1342 reverses the angular direction of the current through loop section 1312*c*, shifting the phase of the magnetic response in the third loop section 1312*c* in accordance with the right-hand rule from that of the first loop section 1312*a* and second loop section 1312*b* by 180°. The third loop section 1312*c* generates a signal on sensor element 1330*c* that is shifted in phase by 180° with respect to the transmitted signal due to the cross over feature 1342. There is no loop section in detection area section 1321*d* causing the signal on sensor element 1330*d* to be low or zero. A logic level 1 is assigned to a sensor element signal with a 180° phase shift relative to the transmitted signal; a logic level 0 is assigned to a sensor signal with a 0° phase shift relative to the transmitted signal; and a logic level 0 is assigned to sensor signal with low amplitude. The signals on the sensor elements 1330*b*-1330*d* correspond to the three digit binary code 010, or decimal 2, where the signal on sensor element 1330*d* is designated as corresponding to the least significant bit (LSB) of the code and the signal on sensor element 1330*b* is designated as corresponding to the most significant bit (MSB) of the code.

Figure 13C:
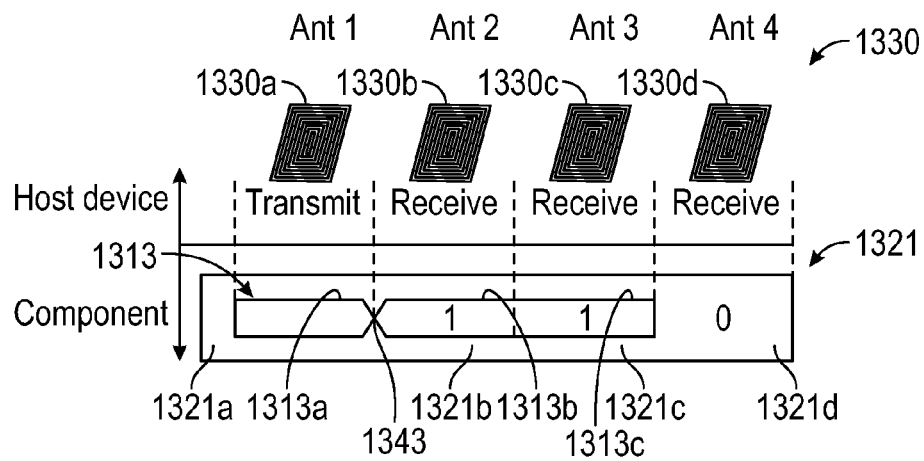

FIG. 13C illustrates a portion of a component that includes a detection member comprising a closed conductive loop 1313 disposed within a detection area 1321 of the component. FIG. 13C also illustrates a portion of a host device comprising a reader 1330. Closed conductive loop 1313 includes three spatially separate loop sections 1313*a*, 1313*b*, 1313*c* disposed respectively in detection area sections 1321*a*, 1321*b*, 1321*c* with a cross over feature 1343 disposed between loop sections 1313*a* and 1313*b*. Electromagnetic excitation of the first loop section 1313*a* by an electromagnetic signal transmitted from the transmitter element 1330*a* induces a current in the first loop section 1313*a* that causes a magnetic field opposing the magnetic field of the transmitted electromagnetic signal. Current in the second loop section 1313*b* generates a magnetic response of the second loop section 1313*b* that has a 180° phase shift with respect to the magnetic field of the first loop section 1313*a* due to the cross over feature 1343 disposed between the first 1313*a* and second 1313*b* loop sections. The signal generated by the second loop section 1313*b* on sensor element 1330*b* has a phase shift of 180° with respect to the signal transmitted by sensor element 1330*a* due to the cross over feature 1343. The magnetic response of the third loop section 1313*c* is also shifted in phase from the magnetic field of the first loop section 1313*a* by 180° due to the cross over feature 1343. The third loop section 1313*c* generates an electromagnetic signal on sensor element 1330*c* that is shifted in phase by 180° with respect to the transmitted signal due to the cross over feature 1343. There is no loop section in detection area section 1321*d* causing the signal on sensor element 1330*d* to be low or zero. A logic level 1 is assigned to a signal on a sensor element with a 180° phase shift relative to the transmitted signal; a logic level 0 is assigned to a signal on a sensor element with a 0° phase shift relative to the transmitted signal; and a logic level 0 is assigned to a signal on a sensor element with low amplitude. The signals on sensor elements 1330*b*-1330*d* correspond to the three digit binary code 110, or decimal 6, where the signal on sensor element 1330*d* is designated as corresponding to the least significant bit (LSB) of the code and the signal on sensor element 1330*b* is designated as corresponding to the most significant bit (MSB) of the code.

Figure 13D:
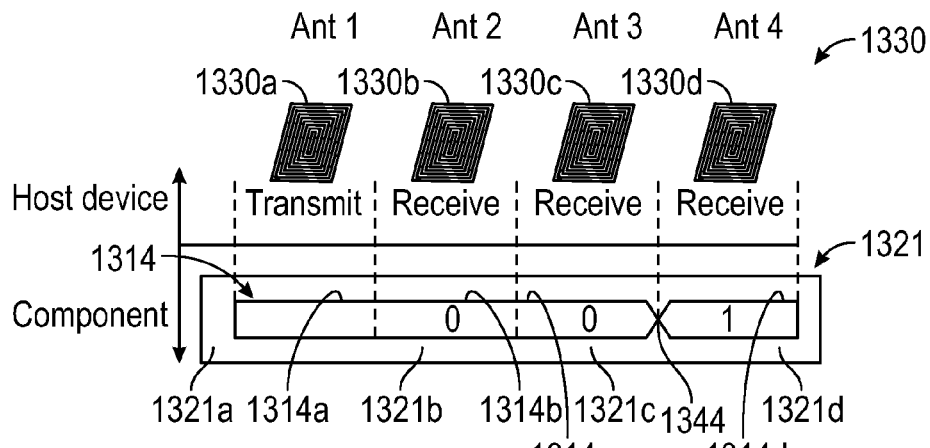

FIG. 13D illustrates a portion of a component that includes a detection member comprising a closed conductive loop 1314 disposed within a detection area 1321 of the component. FIG. 13D also illustrates a portion of a host device comprising a reader 1330. Closed conductive loop 1314 includes four spatially separate loop sections 1314*a*, 1314*b*, 1314*c*, 1314*d* disposed respectively in detection area sections 1321*a*, 1321*b*, 1321*c*, 1321*d* with a cross over feature 1344 disposed between loop sections 1314*c* and 1314*d*. Electromagnetic excitation of the first loop section 1314*a* by an electromagnetic signal transmitted from the transmitter element 1330*a* induces a current in the loop which generates a corresponding magnetic field in the first loop section 1314*a* that opposes the magnetic field of the electromagnetic signal. The magnetic response of loop section 1314*b* has a 0° phase shift with respect to the magnetic field of the first loop section 1314*a*. The electromagnetic signal generated by loop section 1314*b* on sensor element 1330*b* has a phase shift of 0° with respect to the signal transmitted by sensor element 1330*a*. The a magnetic response of loop section 1314*c* that has a 0° phase shift with respect to the magnetic field of the first loop section 1314*a*. The electromagnetic signal generated by loop section 1314*c* on sensor element 1330*c* has a phase shift of 0° with respect to the signal transmitted by sensor element 1330*a*.

The direction of the current flow in the loop is reversed in the fourth loop section 1314*d* relative to the direction of current in the first loop section 1314*a* due to the cross over feature 1344. Current in the fourth loop section 1314*d* generates a magnetic response that has a 180° phase shift with respect to the magnetic field of the first loop section 1314a. The signal generated by loop section 1314d on sensor element 1330d has a phase shift of 180° with respect to the signal transmitted by sensor element 1330a due to the cross over feature 1344. A logic level 1 is assigned to sensor signal with a 180° phase shift relative to the transmitted signal and a logic level 0 is assigned to a sensor signal with a 0° phase shift relative to the transmitted signal. The signals on the sensor elements 1330b-1330d correspond to the three digit binary code 001, or decimal 1, where the signal on sensor element 1330d is designated as corresponding to the least significant bit (LSB) of the code and the signal sensed by sensor element 1330b is designated as corresponding to the most significant bit (MSB) of the code.

Figure 13E:
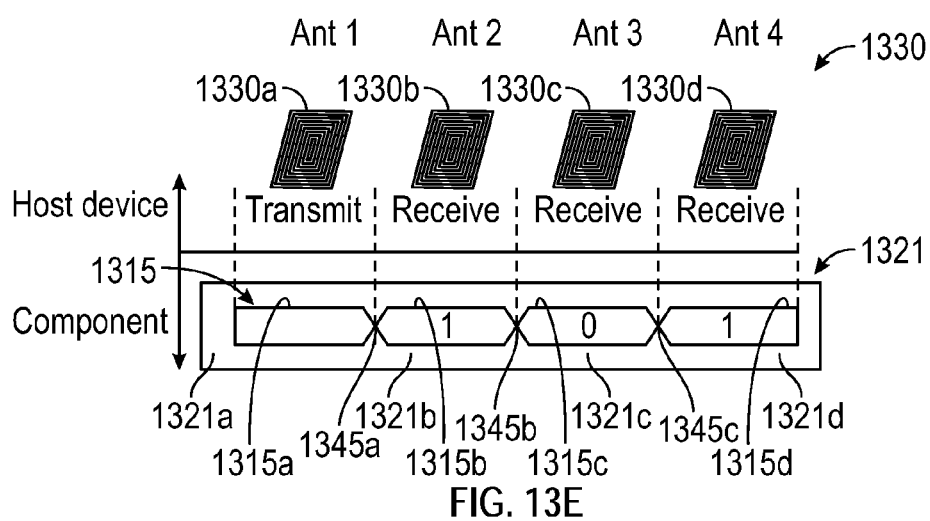

FIG. 13E illustrates a portion of a component that includes a detection member comprising a closed conductive loop 1315 disposed within a detection area 1321 of the component. FIG. 13E also illustrates a portion of a host device comprising a reader 1330. Closed conductive loop 1315 includes four spatially separate loop sections 1315a, 1315b, 1315c, 1315d disposed respectively in detection area sections 1321a, 1321b, 1321c, 1321d. Closed conductive loop 1315 includes multiple cross over features including a first cross over feature 1345a disposed between loop sections 1315a and 1315b, a second cross over feature 1345b disposed between loop sections 1315b and 1315c, and a third cross over feature 1345c disposed between loop sections 1315c and 1315d.

Electromagnetic excitation of the first loop section 1315a by an electromagnetic signal transmitted from the first sensor element 1330a induces a current that results in a magnetic field in the first loop section 1315a that opposes the magnetic field of the transmitted electromagnetic signal. Current in the second loop section 1315b reverses angular direction of current relative to the current in the first loop section 1315a due to the first cross over feature 1345a. Current in the second loop section 1315b generates a magnetic response that has a 180° phase shift with respect to the magnetic field of the first loop section 1315a. The signal generated from loop section 1315b onto sensor element 1330b has a phase shift of 180° with respect to the signal transmitted by sensor element 1330a.

Current in the third loop section 1315c reverses angular direction relative to the current in the second loop section 1315b due to the second cross over feature 1345b. Current in the third loop section 1315c generates a magnetic response that has a 360° (0°) phase shift with respect to the magnetic field of the first loop section 1315a. The signal generated from loop section 1315c onto sensor element 1330c has a phase shift of 0° with respect to the signal transmitted by sensor element 1330a.

Current in the fourth loop section 1315d reverses angular direction relative to the current in the third loop section 1315c due to the third cross over feature 1345c. Current in the fourth loop section 1315d generates a magnetic response in the fourth loop section 1315d that has a 540° (180°) phase shift with respect to the magnetic field of the first loop section 1315a. The signal generated from loop section 1315d onto sensor element 1330d has a phase shift of 180° with respect to the signal transmitted by sensor element 1330a.

A logic level 1 is assigned to a signal on a sensor element with a 180° phase shift relative to the transmitted signal and a logic level 0 is assigned to a signal on a sensor element with a 0° phase shift relative to the transmitted signal. The signals on the sensor elements 1330b-1330d correspond to the three digit binary code 101, or decimal 5, where the signal on sensor element 1330d is designated as corresponding to the least significant bit (LSB) of the code and the signal sensed by sensor element 1330b is designated as corresponding to the most significant bit (MSB) of the code.

Figure 13F:
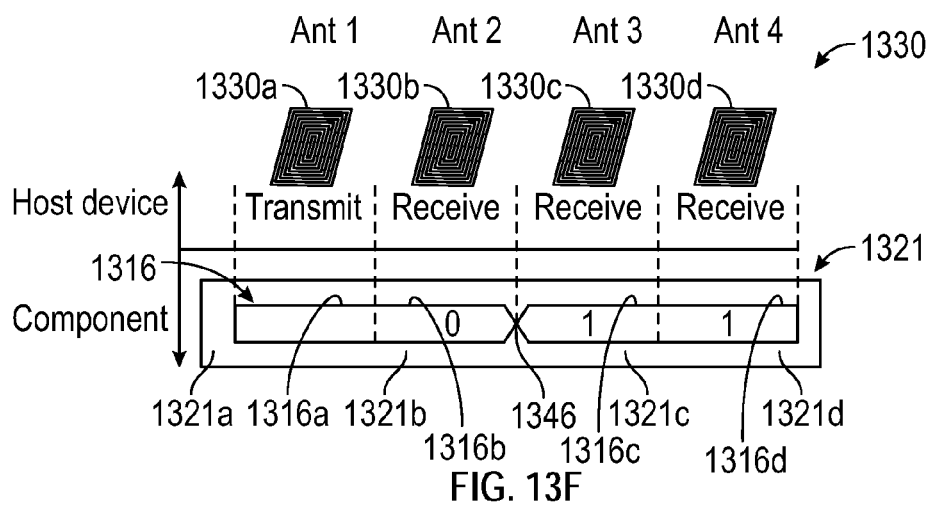

FIG. 13F illustrates a portion of a component that includes a detection member comprising a closed conductive loop 1316 disposed within a detection area 1321 of the component. FIG. 13F also illustrates a portion of a host device comprising a reader 1330. Closed conductive loop 1316 includes four spatially separate loop sections 1316a, 1316b, 1316c, 1316d disposed respectively in detection area sections 1321a, 1321b, 1321c, 1321d. Closed conductive loop 1316 includes a cross over feature 1346 disposed between loop sections 1316b and 1316c.

Electromagnetic excitation of the first loop section 1316a by an electromagnetic signal transmitted from the first sensor element 1330a induces a current that results in a magnetic field in the first loop section 1316a that opposes the magnetic field of the transmitted electromagnetic signal. Current in the second loop section 1316b has the same angular direction as current in loop section and generates a magnetic response in the second loop section 1316b with a 0° phase shift with respect to the magnetic field of the first loop section 1316a. The signal generated from loop section 1316b onto sensor element 1330b has a phase shift of 0° with respect to the signal transmitted by sensor element 1330a.

Current in the third loop section 1316c reverses angular direction relative to the current in the second loop section 1316b due to the second cross over feature 1346. Current in the third loop section 1316c generates a magnetic response that has a 180° phase shift with respect to the magnetic field of the first loop section 1316a. The signal generated from loop section 1316c onto sensor element 1330c has a phase shift of 180° with respect to the signal transmitted by sensor element 1330a.

Current in the fourth loop section 1316d travels in the same angular direction as the current in the third loop section 1316c. Current in the fourth loop section 1316d generates a magnetic response in the fourth loop section 1316d that has a 180° phase shift with respect to the magnetic field of the first loop section 1316a. The signal generated from loop section 1316d onto sensor element 1330d has a phase shift of 180° with respect to the signal transmitted by sensor element 1330a.

A logic level 1 is assigned to a signal on a sensor element with a 180° phase shift relative to the transmitted signal and a logic level 0 is assigned to a signal on a sensor element with a 0° phase shift relative to the transmitted signal. The signals on the sensor elements 1330b-1330d correspond to the three digit binary code 011, or decimal 3, where the signal on sensor element 1330d is designated as corresponding to the least significant bit (LSB) of the code and the signal sensed by sensor element 1330b is designated as corresponding to the most significant bit (MSB) of the code.

Figure 13G:
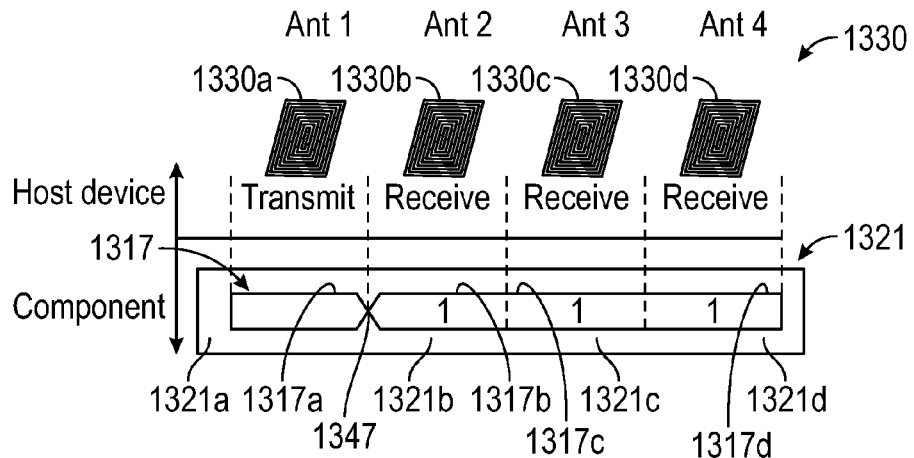

FIG. 13G illustrates a portion of a component that includes a detection member comprising a closed conductive loop 1317 disposed within a detection area 1321 of the component. FIG. 13G also illustrates a portion of a host device comprising a reader 1330. Closed conductive loop 1317 includes four spatially separate loop sections 1317a, 1317b, 1317c, 1317d disposed respectively in detection area sections 1321a, 1321b, 1321c, 1321d. Closed conductive loop 1317 includes cross over feature 1347 between loop sections 1317a and 1317b.

Electromagnetic excitation of the first loop section 1317a by an electromagnetic signal transmitted from the first sensor element 1330a induces a current that results in a magnetic field in the first loop section 1317*a* that opposes the magnetic field of the transmitted electromagnetic signal. Current in the second loop section 1317*b* reverses angular direction relative to the current in the first loop section 1317*a* due to the first cross over feature 1347. Current in the second loop section 1317*b* generates a magnetic response that has a 180° phase shift with respect to the magnetic field of the first loop section 1317*a*. The signal generated from loop section 1317*b* onto sensor element 1330*b* has a phase shift of 180° with respect to the signal transmitted by sensor element 1330*a*.

Current in the third loop section 1317*c* travels in the same angular direction relative to the current in the second loop section 1317*b*. Current in the third loop section 1317*c* generates a magnetic response that has a 180° phase shift with respect to the magnetic field of the first loop section 1317*a*. The signal generated from loop section 1317*c* onto sensor element 1330*c* has a phase shift of 180° with respect to the signal transmitted by sensor element 1330*a*.

Current in the fourth loop section 1317*d* travels in the same angular direction relative to the current in the second and third loop sections 1317*b*, 1317*c*. Current in the fourth loop section 1317*d* generates a magnetic response in the fourth loop section 1317*d* that has a 180° phase shift with respect to the magnetic field of the first loop section 1317*a*. The signal generated from loop section 1317*d* onto sensor element 1330*d* has a phase shift of 180° with respect to the signal transmitted by sensor element 1330*a*.

A logic level 1 is assigned to a signal on a sensor element with a 180° phase shift relative to the transmitted signal and a logic level 0 is assigned to a signal on a sensor element with a 0° phase shift relative to the transmitted signal. The signals on the sensor elements 1330*b*-1330*d* correspond to the three digit binary code 111, or decimal 7, where the signal on sensor element 1330*d* is designated as corresponding to the least significant bit (LSB) of the code and the signal sensed by sensor element 1330*b* is designated as corresponding to the most significant bit (MSB) of the code.

In the embodiments shown in FIGS. 14A through 14G, a detection area 1421 extends linearly and includes four spatially separated sections 1421*a*-1421*d*. A closed conductive loop 1411-1417 includes two, three, or four spatially separated loop sections, each loop section disposed in a detection area section. One loop section is arranged closest to the transmitter element 1430*a* and is electromagnetically excited by the transmitter element. The loops 1412, 1414-1416 include at least one loop section with a notch feature. The notch feature reduces the magnetic amplitude response of the loop section and reduces the amplitude of the signal generated from the loop section on the corresponding sensor element relative to similarly constructed loop sections that do not include a notch feature.

In each example provided in FIGS. 14A through 14G, a logic level 1 is assigned to a relatively high magnetic amplitude response and a relatively high amplitude sensor signal. A logic level 0 is assigned to a relatively low magnetic amplitude response and a relatively low amplitude sensor signal. In these examples, the magnetic response of the rightmost loop section 1411*d*-1417*d* and the signal on the rightmost sensor element 1430*d* are designated as corresponding to the least significant bit (LSB) of the code. The magnetic response of the second to the leftmost loop section 1411*b*-1417*b* and the signal on the leftmost sensor element 1430*b* are designated as corresponding to the most significant bit of the code.

Figure 14A:
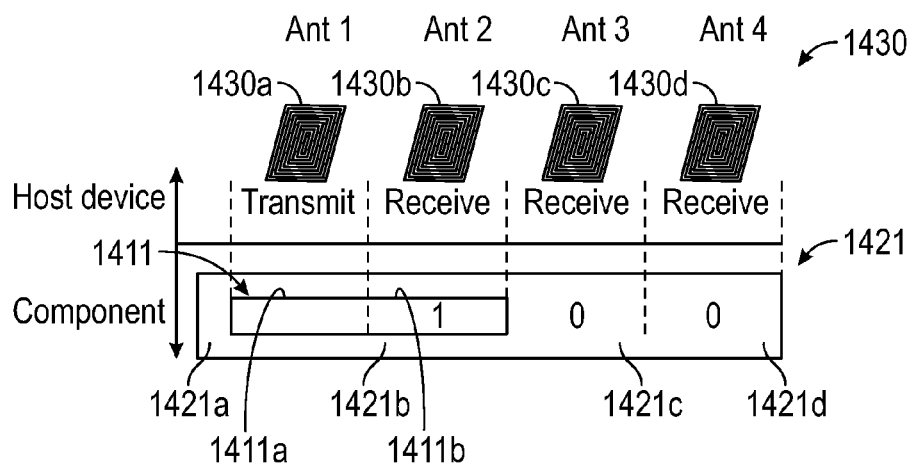
FIGS. 14A through 14G show closed conductive loops with notch features in some loop sections wherein the magnetic response of the loop sections corresponds to a code in accordance with some embodiments.

FIG. 14A illustrates a detection member comprising a closed conductive loop 1411 that includes two spatially separate loop sections 1411*a*, 1411*b* disposed respectively in detection area sections 1421*a*, 1421*b*. Electromagnetic excitation of the first loop section 1411*a* by an electromagnetic signal transmitted from the transmitter element 1430*a* induces a current in the loop 1411. In response to the electromagnetic excitement, loop section 1411*b* generates a predetermined magnetic amplitude response and a signal is generated from loop section 1411*b* onto sensor element 1430*b*. The magnetic amplitude response of loop section 1411*b* is higher than the magnetic responses of loop sections 1411*c* and 1411*d* which have no loop sections. The amplitude of the signal on sensor 1430*b* is relatively higher than the low or zero amplitude signals on sensor elements 1430*c* and 1430*d*. The magnetic amplitude response from the loop section 1411*a* arranged in the detection area 1421 and the signals on the sensor elements 1430*b*-1430*d* represent the three digit binary code 100, or decimal 4.

Figure 14B:
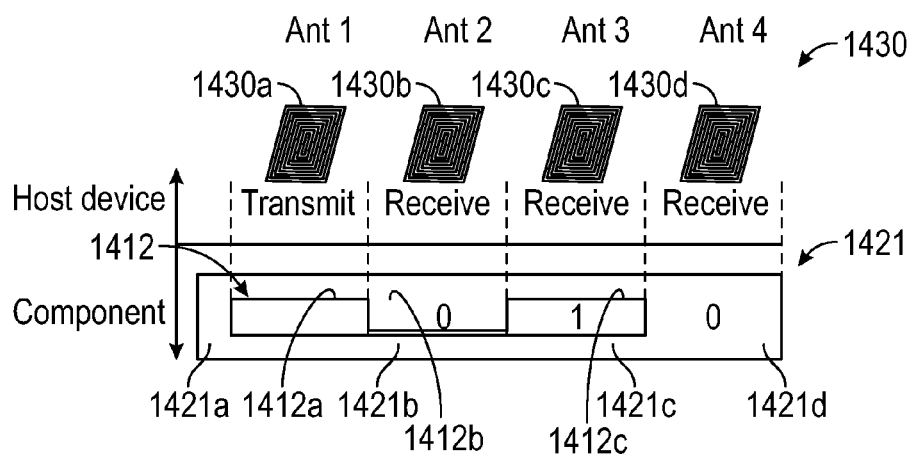

FIG. 14B illustrates a detection member comprising a closed conductive loop 1412 that includes three spatially separate loop sections 1412*a*-1412*c* disposed respectively in detection area sections 1421*a*-1421*c* with a notch feature in loop section 1412*b* that reduces the magnetic amplitude response of loop section 1412*b* relative to loop section 1412*c*. Electromagnetic excitation of the first loop section 1412*a* by an electromagnetic signal transmitted from the transmitter element 1430*a* induces a current in the loop 1412. The induced current generates predetermined magnetic amplitude responses in loop sections 1412*b* and 1412*c*. The magnetic amplitude response of loop section 1412*b*, which has a notch, is relatively low when compared with the magnetic amplitude response of loop section 1412*c* without a notch feature. The signal generated on sensor element 1430*b* from loop section 1412*b* is a relatively low amplitude signal when compared with the relatively higher signal generated on sensor element 1430*c* from loop section 1412*c*. Detection area section 1421*d* has no loop section and thus the signal generated on sensor element 1430*d* is a relatively low amplitude signal. The magnetic amplitude responses from the loop sections 1412*b* through 1412*c* arranged in the detection area 1421 and the signals on the sensor elements 1430*b*-1430*d* correspond to the three digit binary code 010, or decimal 2.

Figure 14C:
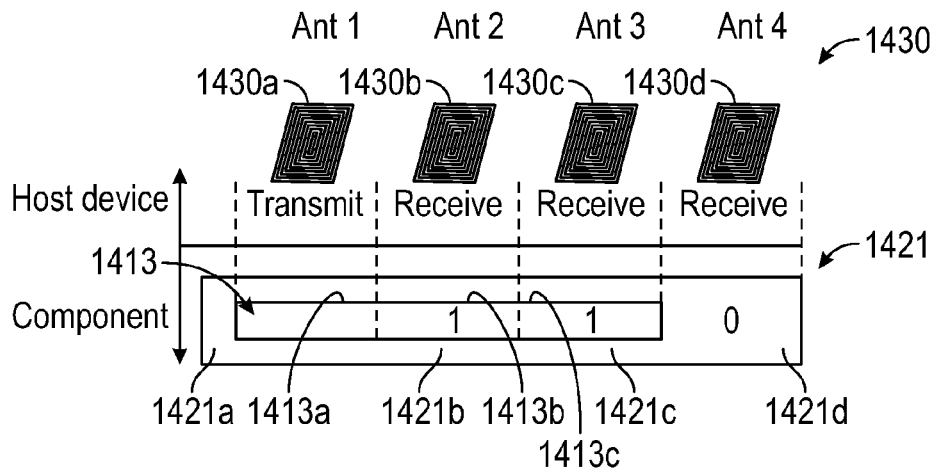

FIG. 14C illustrates a detection member comprising a closed conductive loop 1413 that includes three spatially separate loop sections 1413*a*-1413*c* disposed respectively in detection area sections 1421*a*-1421*c*. Electromagnetic excitation of the first loop section 1413*a* by an electromagnetic signal transmitted from the transmitter element 1430*a* induces a current in the loop 1413. The induced current generates predetermined magnetic amplitude responses in loop sections 1413*b* and 1413*c* that are relatively higher than magnetic amplitude response of detection area section 1421*d* which includes no loop section. The signals generated on sensor elements 1430*b* and 1430*c* from loop sections 1413*b* and 1413*c*, respectively, are higher amplitude signals when compared with the signal on sensor element 1430*d*. The magnetic amplitude responses from the loop sections 1413*b* through 1413*c* arranged in the detection area 1421 and the signals on the sensor elements 1430*b*-1430*d* correspond to the three digit binary code 110, or decimal 3.

Figure 14D:
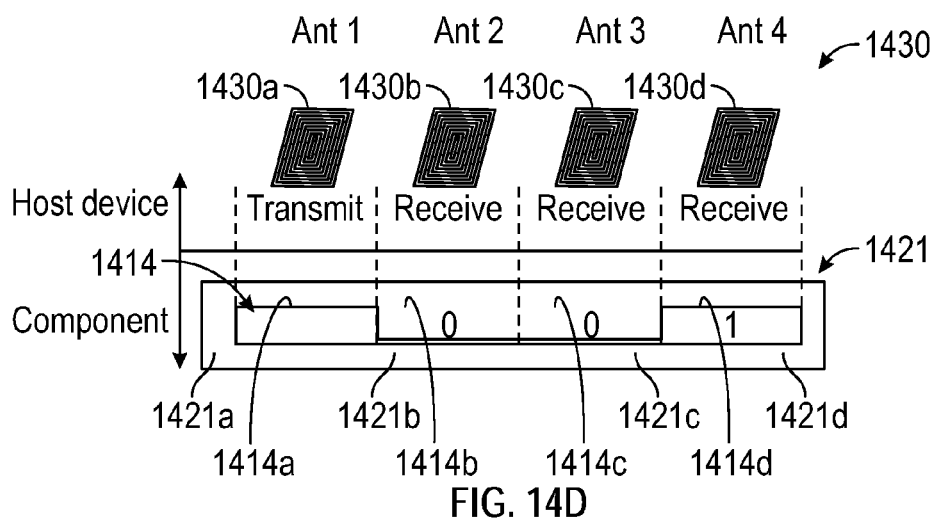

FIG. 14D illustrates a detection member comprising a closed conductive loop 1414 that includes four spatially separate loop sections 1414*a*-1414*d* disposed respectively in detection area sections 1421*a*-1421*d* with notch features in loop sections 1414*b* and 1414*c* that reduce the magnetic amplitude responses of loop sections 1414*b* and 1414*c* relative to loop section 1414*d*. Electromagnetic excitation of the first loop section 1414a by an electromagnetic signal transmitted from the transmitter element 1430a induces a current in the loop 1414. The induced current generates predetermined magnetic amplitude responses in loop sections 1414b through 1414d. The magnetic amplitude responses of loop sections 1414b and 1414c, which have a notch, are relatively low when compared with the magnetic amplitude response of loop section 1414d without a notch. The signals generated on sensor elements 1430b and 1430c from loop sections 1414b and 1414c, respectively, are relatively low amplitude signals when compared with the relatively higher amplitude signal generated on sensor element 1430d from loop section 1414d. The magnetic amplitude responses from the loop sections 1414b through 1414d arranged in the detection area 1421 and the signals on the sensor elements 1430b-1430d correspond to the three digit binary code 001, or decimal 1.

Figure 14E:
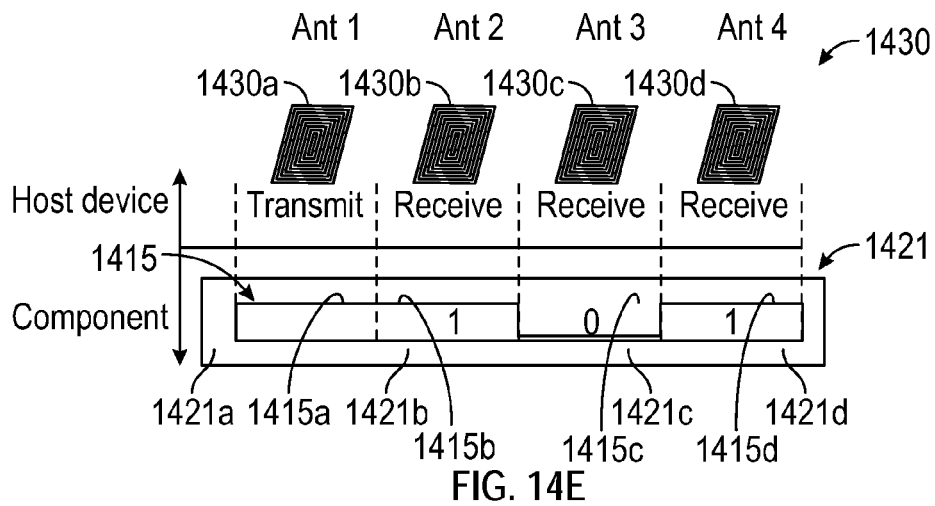

FIG. 14E illustrates a detection member comprising a closed conductive loop 1415 that includes four spatially separate loop sections 1415a-1415d disposed respectively in detection area sections 1421a-1421d with notch features in loop section 1415c that reduces the magnetic amplitude responses of loop section 1415c relative to the magnetic amplitude responses of loop sections 1415b and 1415d. Electromagnetic excitation of the first loop section 1415a by an electromagnetic signal transmitted from the transmitter element 1430a induces a current in the loop 1415. The induced current generates predetermined magnetic amplitude responses in loop sections 1415b through 1415d. The magnetic amplitude responses of loop section 1415c, which has a notch, is relatively low when compared with the magnetic amplitude responses of loop sections 1415b and 1415d which do not have notches. The signal generated on sensor element 1430c from loop section 1415c is relatively a low amplitude signal when compared with the relatively higher amplitude signals generated on sensor elements 1430b and 1430d from loop section 1415b and 1415d, respectively. The magnetic amplitude responses from the loop sections 1415b through 1415d arranged in the detection area 1421 and the signals on the sensor elements 1430b-1430d correspond to the three digit binary code 101, or decimal 5.

Figure 14F:
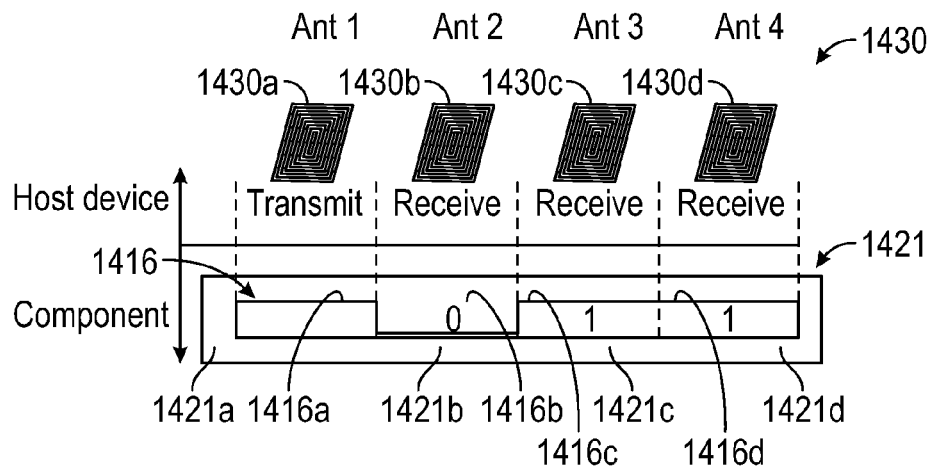

FIG. 14F illustrates a detection member comprising a closed conductive loop 1416 that includes four spatially separate loop sections 1416a-1416d disposed respectively in detection area sections 1421a-1421d with a notch feature in loop section 1416b that reduces the magnetic amplitude response of loop section 1416b relative to loop sections 1416c and 1416d. Electromagnetic excitation of the first loop section 1416a by an electromagnetic signal transmitted from the transmitter element 1430a induces a current in the loop 1416. The induced current generates predetermined magnetic amplitude responses in loop sections 1416b through 1416d. The magnetic amplitude response of loop section 1416b, which has a notch, is relatively low when compared with the magnetic amplitude responses of loop sections 1416c and 1416d which do not have notches. The signal generated on sensor element 1430b from loop section 1416b is a relatively a low amplitude signal when compared with the relatively higher amplitude signals generated on sensor elements 1430c and 1430d from loop sections 1416c and 1416d, respectively. The magnetic amplitude responses from the loop sections 1416b through 1416d arranged in the detection 1421 and the signals on the sensor elements 1430b-1430d correspond to the three digit binary code 011, or decimal 3.

Figure 14G:
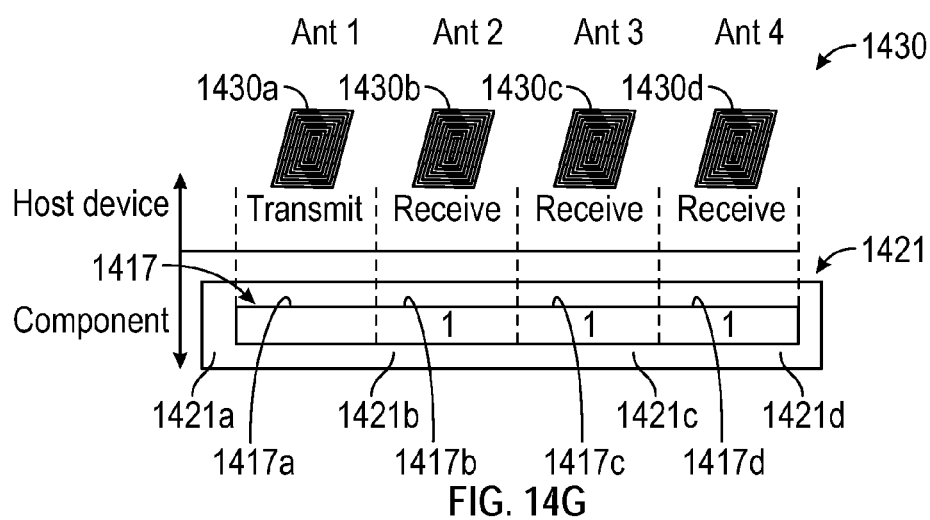

FIG. 14G illustrates a detection member comprising a closed conductive loop 1417 that includes four spatially separate loop sections 1417a-1417d disposed respectively in detection area sections 1421a-1421d. None of the loop sections include notches in this example. Electromagnetic excitation of the first loop section 1417a by an electromagnetic signal transmitted from the transmitter element 1430a induces a current in the loop 1417. The induced current generates predetermined magnetic amplitude responses in loop sections 1417b through 1417d. The magnetic amplitude responses of loop sections 1417b through 1417d are relative high and the signals generated from loop sections 1417b though 1417d onto sensor elements 1430b through 1430d, respectively, are relatively high amplitude signals. The magnetic amplitude responses from the loop sections 1417b through 1417d arranged in the detection area 1421 and the signals on the sensor elements 1430b-1430d correspond to the three digit binary code 111, or decimal 7.

In the embodiments shown in FIGS. 15A through 15G, a detection area 1521 extends linearly and includes four spatially separated sections 1521a-1521d. A closed conductive loop 1511-1517 includes two, three, or four spatially separated loop sections, each loop section disposed in a corresponding detection area section. One loop section is arranged closest to the transmitter element 1530a and is electromagnetically excited by the transmitter element. Each loop 1511-1517 includes at least one loop section with two inductive turns. The 1:2 turns ratio of the 2-turn loop sections increases the magnetic amplitude response of the loop section and increases the closed circuit current amplitude of the signal generated from the loop section on the corresponding sensor element relative to similarly constructed loop sections that include only one inductive turn.

In each example provided in FIGS. 15A through 15G, a logic level 1 is assigned to a relatively high magnetic amplitude response and a relatively high closed circuit current amplitude sensor signal that is greater than a baseline signal level. A logic level 0 is assigned to a relatively low magnetic amplitude response and a relatively low closed circuit current amplitude sensor signal and a sensor signal that is at baseline signal level. In these examples, the magnetic response of the rightmost loop section 1511d-1517d and the signal on the rightmost sensor element 1530d is designated as corresponding to the least significant bit (LSB) of the code. The magnetic response of the second to the leftmost loop section 1511b-1517b and the signal on the leftmost sensor element 1530b is designated as corresponding to the most significant bit (MSB) of the code.

Figure 15A:
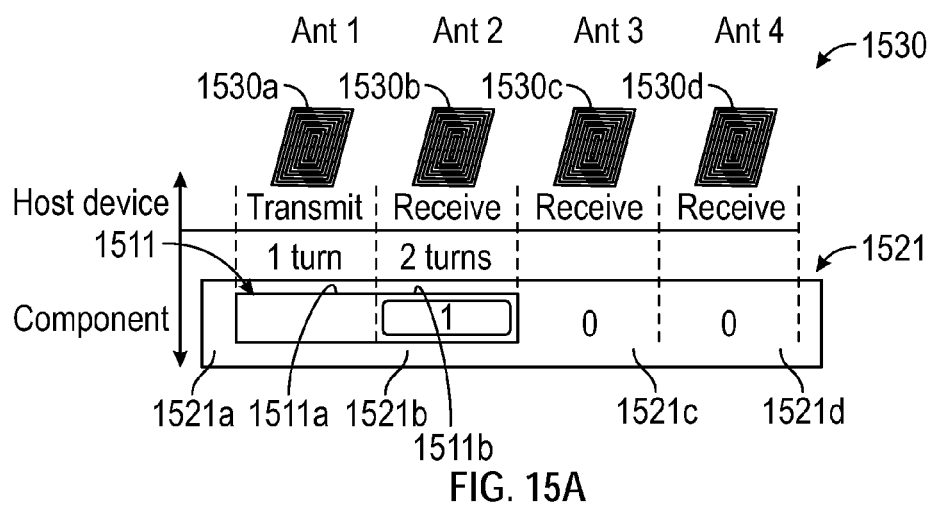
FIGS. 15A through 15G show closed conductive loops with some multiple turn loop sections wherein the magnetic response of the loop sections corresponds to a code in accordance with some embodiments.

FIG. 15A illustrates a detection member comprising a closed conductive loop 1511 that includes two spatially separate loop sections 1511a, 1511b disposed respectively in detection area sections 1521a, 1521b. Electromagnetic excitation of the first loop section 1511a by an electromagnetic signal transmitted from the transmitter element 1530a induces a current in the loop 1511. In response to the electromagnetic excitement, loop section 1511b generates a predetermined magnetic amplitude response and a signal is generated from loop section 1511b onto sensor element 1530b. The loop section 1511b has twice as many turns as loop section 1511a, providing a 1:2 turns ratio, therefore the magnetic amplitude response of loop section 1411b is relatively higher than a loop section with a 1:1 turns ratio, and is higher than a baseline (zero) magnetic response for a detection area section with no loop present. Thus the signal generated on sensor element 1530b from loop section 1511b has a higher closed circuit current amplitude when compared with a signal generated from a 1:1 turns ratio loop section and a higher amplitude than the baseline signal generated on sensor elements 1511c and 1511d. The magnetic amplitude response from the loop section 1511a arranged in the detection area 1521 and the signals on the sensor elements 1530b-1530d represent the three digit binary code 100, or decimal 4.

Figure 15B:
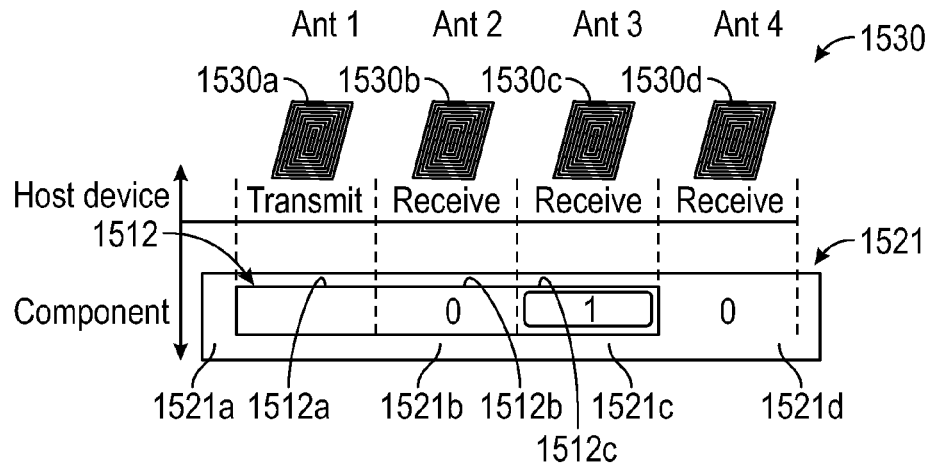

FIG. 15B illustrates a detection member comprising a closed conductive loop 1512 that includes three spatially separate loop sections 1512a-1512c disposed respectively in detection area sections 1521a-1521c. Loop section 1512b is a 1:1 turns ratio loop section, loop section 1512c is a 1:2 turns ratio section, and detection area section 1521d includes no loop section. Electromagnetic excitation of the first loop section 1512a by an electromagnetic signal transmitted from the transmitter element 1530a induces a current in the loop 1512. The induced current generates predetermined magnetic amplitude responses in loop sections 1512b and 1512c. The magnetic amplitude response of loop section 1512b, which has a 1:1 turns ratio, is relatively lower when compared with the magnetic amplitude response of 1:2 turns ratio loop section 1512c. The magnetic amplitude response of 1:2 turns ratio loop section 1512c is relatively higher than the magnetic amplitude response of the 1:1 turns ratio loop section 1512b and is higher than the baseline magnetic response of detection area section 1521d which contains no loop section. The signal generated on sensor element 1530b from loop section 1512b is a relatively lower closed circuit amplitude signal when compared with the relatively higher closed circuit amplitude signal generated on sensor element 1530c from loop section 1512c. The signal generated on sensor element 1530c from loop section 1512c has a relatively higher closed circuit amplitude than the signal on sensor element 1530b and is higher than the baseline signal generated on sensor element 1530d. The magnetic amplitude responses from the loop sections 1512b through 1512c arranged in the detection area 1521 and the signals on the sensor elements 1530b-1530d correspond to the three digit binary code 010, or decimal 2.

Figure 15C:
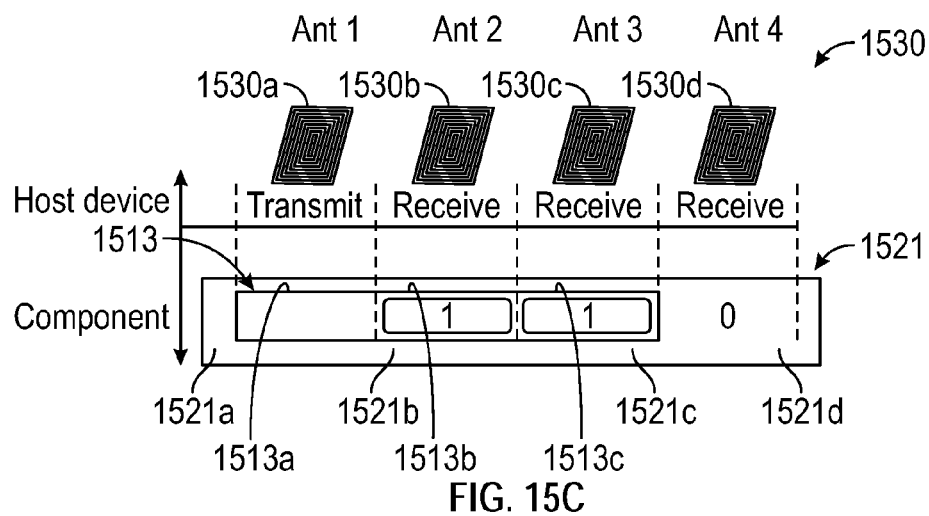

FIG. 15C illustrates a detection member comprising a closed conductive loop 1513 that includes three spatially separate loop sections 1513a-1513c disposed respectively in detection area sections 1521a-1521c. Loop section 1513b is a 1:2 turns ratio loop section, loop section 1513c is a 1:2 turns ratio loop section, and detection area section 1521d has no loop section. Electromagnetic excitation of the first loop section 1513a by an electromagnetic signal transmitted from the transmitter element 1530a induces a current in the loop 1513. The induced current generates predetermined magnetic amplitude responses in loop sections 1513b and 1513c that are relatively higher than a magnetic amplitude response of a loop section with a 1:1 turns ration and relatively higher than the baseline magnetic response of detection area section 1521d which includes no loop section. The signals generated on sensor elements 1530b and 1530c from loop sections 1513b and 1513c, respectively, are comparatively higher closed circuit current amplitude signals when compared with the signals from a 1:1 turn ratio loop section and are higher than the baseline signal on sensor element 1530d. The magnetic amplitude responses from the loop sections 1513b through 1513c arranged in the detection area 1521 and the signals on the sensor elements 1530b-1530d correspond to the three digit binary code 110, or decimal 6.

Figure 15D:
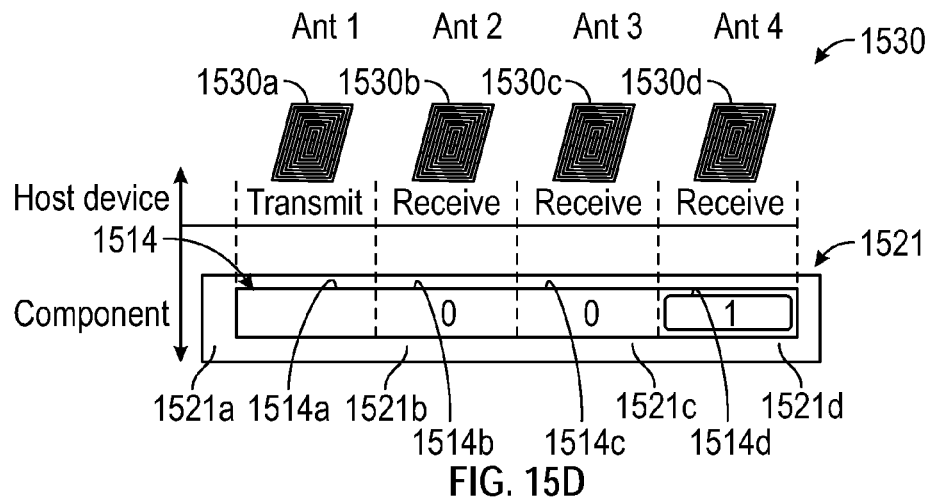

FIG. 15D illustrates a detection member comprising a closed conductive loop 1514 that includes four spatially separate loop sections 1514a-1514d disposed respectively in detection area sections 1521a-1521d. Loop section 1514b is a 1:1 turns ratio loop section, loop section 1514c is a 1:1 turns ratio loop section, and loop section 1514d is a 1:2 turns ratio loop section. Electromagnetic excitation of the first loop section 1514a by an electromagnetic signal transmitted from the transmitter element 1530a induces a current in the loop 1514. The induced current generates predetermined magnetic amplitude responses in loop sections 1514b through 1514d. The magnetic amplitude responses of the 1:1 turns ratio loop sections 1514b and 1514c are relatively lower when compared with the magnetic amplitude response of the 1:2 turns ratio loop section 1514d. The signals generated on sensor elements 1530b and 1530c from loop sections 1514b and 1514c, respectively, are relatively lower closed circuit current amplitude signals when compared with the relatively higher closed circuit current amplitude signal generated on sensor element 1530d from loop section 1514d. The signal on sensor element 1530d from loop section 1514d is higher than the baseline signal. The magnetic amplitude responses from the loop sections 1514b through 1514d arranged in the detection area 1521 and the signals on the sensor elements 1530b-1530d correspond to the three digit binary code 001, or decimal 1.

Figure 15E:
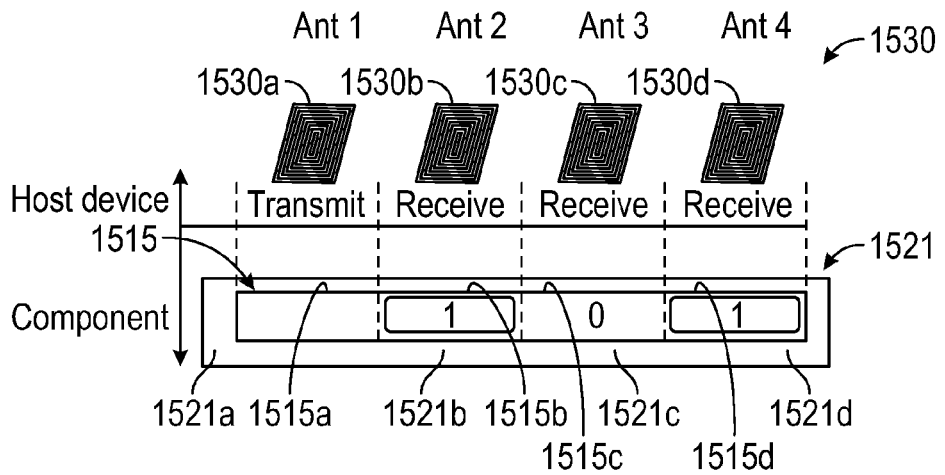

FIG. 15E illustrates a detection member comprising a closed conductive loop 1515 that includes four spatially separate loop sections 1515a-1515d disposed respectively in detection area sections 1521a-1521d of detection area 1521. Loop section 1515b is a 1:2 turns ratio loop section, loop section 1515c is a 1:1 turns ratio loop section, and loop section 1515d is a 1:2 turns ratio loop section. Electromagnetic excitation of the first loop section 1515a by an electromagnetic signal transmitted from the transmitter element 1530a induces a current in the loop 1515. The induced current generates predetermined magnetic amplitude responses in loop sections 1515b through 1515d. The magnetic amplitude responses of the 1:2 turns ratio loop sections 1515b and 1515d are relatively high when compared with the magnetic amplitude responses of 1:1 turns ratio loop section 1515c. The signal generated on sensor element 1530c from loop section 1515c is relatively a lower closed circuit current amplitude signal when compared with the relatively higher closed circuit amplitude signals generated on sensor elements 1530b and 1530d from loop section 1515b and 1515d, respectively. The signals on sensor elements 1530b and 1530d from loop section 1515b and 1515d, respectively, are higher than the baseline signal. The magnetic amplitude responses from the loop sections 1515b through 1515d arranged in the detection area 1521 and the signals on the sensor elements 1530b-1530d correspond to the three digit binary code 101, or decimal 5.

Figure 15F:
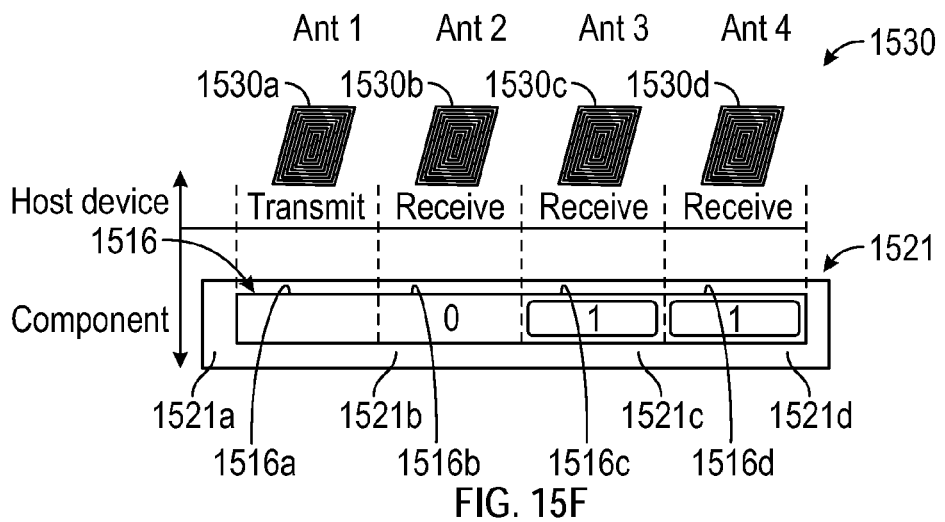

FIG. 15F illustrates a detection member comprising a closed conductive loop 1516 that includes four spatially separate loop sections 1516a-1516d disposed respectively in detection area sections 1521a-1521d of detection area 1521. Loop section 1516b is a 1:1 turns ratio loop section, loop section 1516c is a 1:2 turns ratio loop section, and loop section 1516d is a 1:2 turns ratio loop section. Electromagnetic excitation of the first loop section 1516a by an electromagnetic signal transmitted from the transmitter element 1530a induces a current in the loop 1516. The induced current generates predetermined magnetic amplitude responses in loop sections 1516b through 1516d. The magnetic amplitude response of the 1:1 turns ratio loop section 1516b is relatively lower when compared with the magnetic amplitude responses of loop sections 1516c and 1516d which are 1:2 turns ratio loop sections. The signal generated on sensor element 1530b from loop section 1516b is a relatively a lower closed circuit current amplitude signal when compared with the relatively higher closed circuit current amplitude signals generated on sensor elements 1530c and 1530d from loop sections 1516c and 1516d, respectively. The signals on sensor elements 1530c and 1530d have amplitudes that are higher than an amplitude of a baseline signal. The magnetic amplitude responses from the loop sections 1516b through 1516d arranged in the detection 1521 and the signals on the sensor elements 1530b-1530d correspond to the three digit binary code 011, or decimal 3.

Figure 15G:
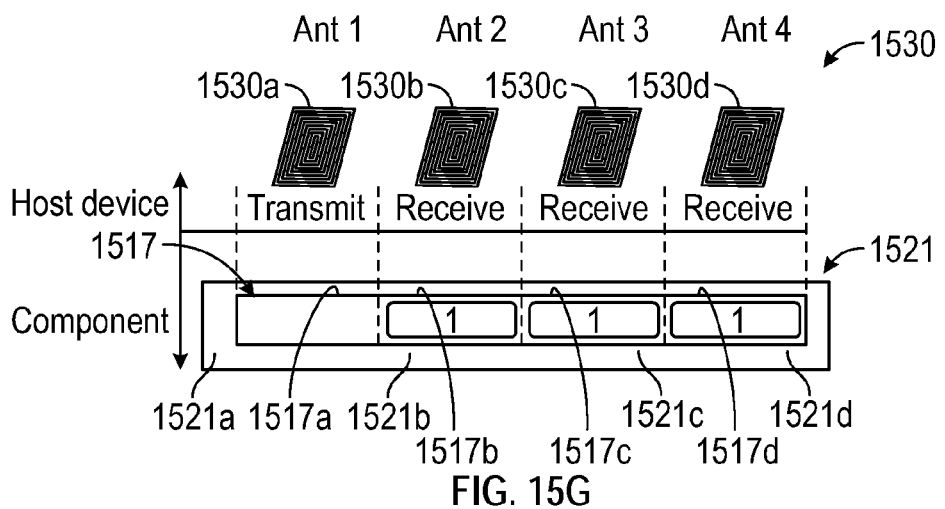

FIG. 15G illustrates a detection member comprising a closed conductive loop 1517 that includes four spatially separate loop sections 1517a-1517d disposed respectively in detection area sections 1521a-1521d. Loop sections 1517b-1517d are 1:2 turns ratio loop sections. Electromagnetic excitation of the first loop section 1517a by an electromagnetic signal transmitted from the transmitter element 1530a induces a current in the loop 1517. The induced current generates predetermined magnetic amplitude responses in loop sections 1517b through 1517d. The magnetic amplitude responses of loop sections 1517b through 1517d are relative higher than a magnetic amplitude response of a 1:1 turns ratio loop section. The signals generated from loop sections 1517b though 1517d onto sensor elements 1530b through 1530d, respectively, are relatively higher closed circuit current amplitude signals and higher than a baseline signal. The magnetic amplitude responses from the loop sections 1517b through 1517d arranged in the detection area 1521 and the signals on the sensor elements 1530b-1530d correspond to the three digit binary code 111, or decimal 7.

Figure 16A:
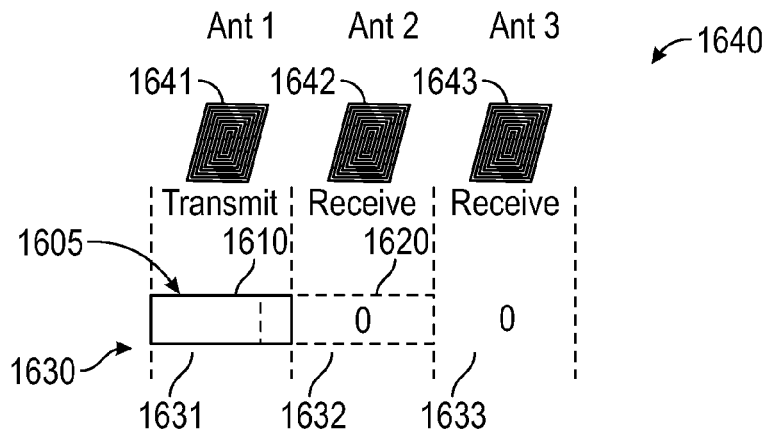
FIGS. 16A through 16C show examples of detection members comprising multiple inductively coupled, galvanically isolated closed conductive loops wherein at least one section of the closed conductive loops has a different magnetic phase response when compared with at least one other section of the multiple closed conductive loops.
Figure 16B:
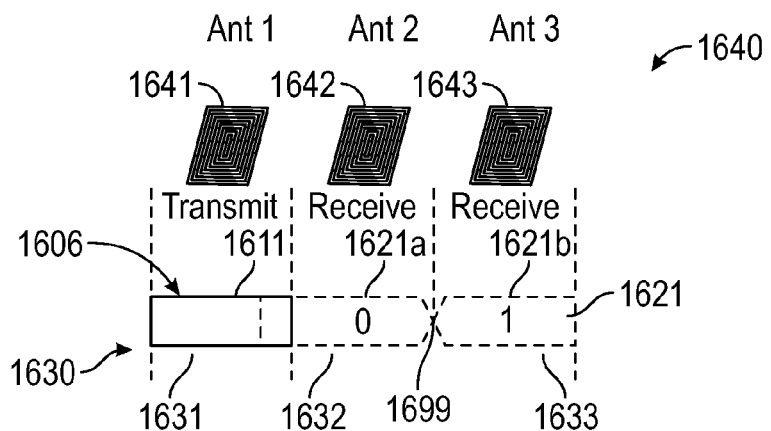
Figure 16C:
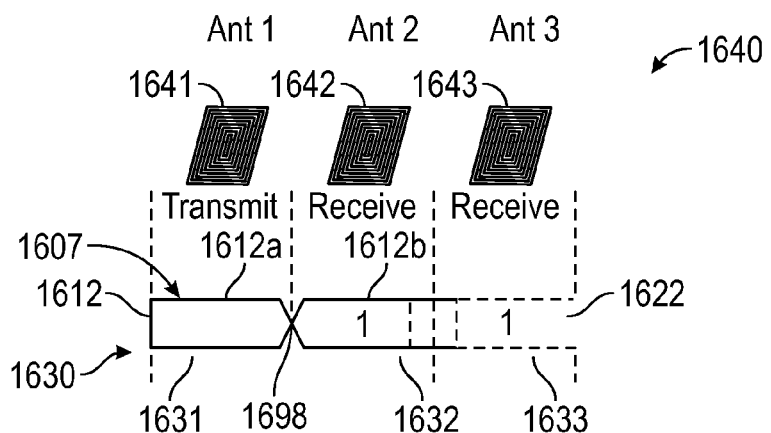

The detection member may include two or more two closed conductive loops as illustrated in FIGS. 16 and 17. In these embodiments, at least two closed conductive loops are arranged to be inductively coupled and galvanically isolated such that there is no direct current flow between the closed conductive loops. FIGS. 16A through 16C show examples of detection members comprising multiple inductively coupled, galvanically isolated closed conductive loops. FIGS. 16B and 16C illustrate detection members having multiple closed conductive loops wherein at least one section of the closed conductive loops has a different magnetic phase response when compared with at least one other section of the multiple closed conductive loops.

FIG. 16A illustrates a detection member 1605 comprising a first closed conductive loop 1610 and a second closed conductive loop 1620 arranged in a detection area 1630 having three detection area sections 1631, 1632, 1633. The first closed conductive loop 1610 is disposed in the first detection area section 1631 and the second closed conductive loop 1620 is disposed in the second detection area section 1632. No loop section is disposed in the third detection area section 1633. The first and second loops 1610, 1620 are galvanically isolated and inductively coupled between the first and the second detection area sections 1631, 1632. A sensor array 1640 comprising sensor elements 1641, 1642, 1643 is shown proximate and in communication range of the detection member 1605.

The first sensor element 1641 is the transmit sensor in this example. The first sensor element 1641 transmits an electromagnetic signal that electromagnetically excites the first loop 1610. The first loop 1610 inductively communicates the electromagnetic energy from the transmitted signal to the second loop 1620, inducing a magnetic response in the second loop 1620. The magnetic response of the second loop 1620 has a zero degree phase shift with respect to the magnetic response of the first loop 1610 which is electromagnetically excited. A signal is generated from the second loop 1620 on the second sensor element 1642. The signal on the second sensor element 1642 has zero phase shift with respect to the electromagnetic signal transmitted from the first element 1641. Because the third detection area section 1633 does not include a loop section, no magnetic response is generated in the third detection area section 1633 and the signal on the third sensor element 1643 is a baseline low or zero amplitude signal with zero phase shift with respect to the transmitted signal from the first element 1641. In this particular example, a 180 degree change in phase from the magnetic response of the first loop 1610 corresponds to a logical 1 which is represented by a 180 degree phase shift of a sensor signal relative to the phase of the transmitted electromagnetic signal. A 0 degree phase shift from the magnetic response of the first loop 1610 corresponds to a logical 0 which is represented by a 0 degree phase shift of a sensor signal relative to the phase of the transmitted electromagnetic signal. A two bit binary code is represented in the signals generated on the second 1642 and third 1643 sensor elements from the second 1632 and third 1633 detection area sections, respectively. When the third sensor element 1643 is designated as representing the LSB of the code and the second sensor element 1642 is designated as representing the MSB of the code, the code corresponding to the magnetic response of the loops 1610, 1620 in the detection area 1630 is 00.

FIG. 16B illustrates a detection member 1606 comprising a first closed conductive loop 1611 and a second closed conductive loop 1621 that are spatially separated and arranged in a detection area 1630 having three detection area sections 1631, 1632, 1633. The first closed conductive loop 1621 is disposed in the first detection area section 1631. The second closed conductive loop 1621 includes spatially separate first 1621a and second 1621b sections. The first section 1621a of the second loop 1621 is disposed in the second detection area section 1632 and the second section 1621b of the second closed conductive loop 1621 is disposed in the third detection area section 1633. The first and second loops 1611, 1621 are gavantically isolated and are inductively coupled between the first 1631 and second 1632 detection area sections. There is a phase shifting cross over 1699 between the first and second sections 1621a, 1621b of the second loop 1621. A sensor array 1640 comprising sensor elements 1641, 1642, 1643 is shown proximate and in communication range of the detection member 1606.

The first sensor element 1641 is the transmit sensor in this example. The first sensor element 1641 transmits an electromagnetic signal that electromagnetically excites the first loop 1611. The first loop 1611 inductively communicates the electromagnetic energy from the transmitted signal to the second loop 1621, generating magnetic responses in the first and second sections 1621a, 1621b of the second loop 1621. An electrical signal on the second sensor element 1642 is generated from the first section 1621a of the second loop 1621. The magnetic response of the first section 1621a of the second loop 1621 has zero phase shift with respect to the phase of the magnetic response of the first loop 1611. The signal generated on the second sensor element 1642 has zero phase shift with respect to the electromagnetic signal transmitted from the first element 1641. The cross over 1699 reverses the angular direction of current through the second section 1621b of the second loop 1621 and shifts the phase of the magnetic response of the second section 1621b of the second loop 1621 with respect to the phase of the magnetic response of the first loop 1611 by 180 degrees. An electrical signal is generated on the third sensor element 1643 from the second section 1621b of the second loop 1621 that has a phase shift of 180 degrees with respect to the phase of the electromagnetic signal transmitted from the first element 1641. In this particular example, a 180 degree change in phase from the transmitted signal corresponds to a logical 1 and a 0 degree phase shift from the transmitted signal corresponds to a logical 0. The two bit binary code is represented in the signals generated on the second 1642 and third 1643 sensor elements from the first and second 1621a, 1621b sections, respectively. When the third sensor element 1643 is designated as representing the LSB of the code and the second sensor element 1642 is designated as representing the MSB of the code, the code corresponding to the magnetic response of the loops 1611, 1621 in the detection area 1630 and represented by the signals on the second and third sensor elements 1642, 1643 is 01.

FIG. 16C illustrates a detection member 1607 comprising a first closed conductive loop 1612 and a second closed conductive loop 1622 that are spatially separated and arranged in a detection area 1630 having three detection area sections 1631, 1632, 1633. The first closed conductive loop 1612 includes first 1612a and second 1612b spatially separate sections disposed respectively in first 1631 and second 1632 detection area sections. There is a cross over phase shifting feature 1698 between the first 1612a and second 1612b sections of the first loop 1612. The second closed conductive loop 1622 is disposed in the third detection area section 1633. The first and second loops 1612, 1622 are gavantically isolated and are inductively coupled between the second 1632 and third 1633 detection area sections. A sensor array 1640 comprising sensor elements 1641, 1642, 1643 is shown proximate and in communication range of the detection member 1607.

The first sensor element 1641 is the transmit sensor in this example. The first sensor element 1641 transmits an electromagnetic signal that electromagnetically excites the first loop section 1612a of the first loop 1612. The first loop 1612 inductively communicates the electromagnetic energy from the transmitted signal to the second loop 1622. Magnetic responses are generated in the second section 1612b of the first loop 1621 and in the second loop 1622. An electrical signal is generated from the second section 1612b of the first loop 1612 onto the second sensor element 1642. The magnetic response of the second section 1612b of the first loop 1612 has a 180 degree phase shift with respect to the phase of the magnetic response of the first section 1612a of the first loop 1612 due to the cross over 1698. The signal generated on the second sensor element 1642 from the second section 1612b of the first loop 1612 has a 180 degree phase shift with respect to the electromagnetic signal transmitted from the first element 1641. The cross over 1698 also shifts the phase of the magnetic response of the second loop 1622 with respect to the phase of the magnetic response of the first section 1612a of the first loop 1611 by 180 degrees. An electrical signal generated on the third sensor element 1643 from the second loop 1622 has a phase shift of 180 degrees with respect to the phase of the electromagnetic signal transmitted from the first element 1641. In this particular example, a 180 degree change in phase from the magnetic response of the first section 1612a of the first loop 1612 corresponds to a logical 1 and a 0 degree phase shift from the magnetic response of the first section 1612a of the first loop 1612 corresponds to a logical 0. The two bit binary code corresponding to the magnetic responses of the second section 1612b of the first loop 1612 and the second loop 1622 is represented in the signals on the second 1642 and third 1643 sensor elements. When the third sensor element 1643 is designated as representing the LSB of the code and the second sensor element 1642 is designated as representing the MSB of the code, the code corresponding to the magnetic responses of the second section 1612b of the first loop 1612 and the second loop 1622 is 11.

Figure 17A:
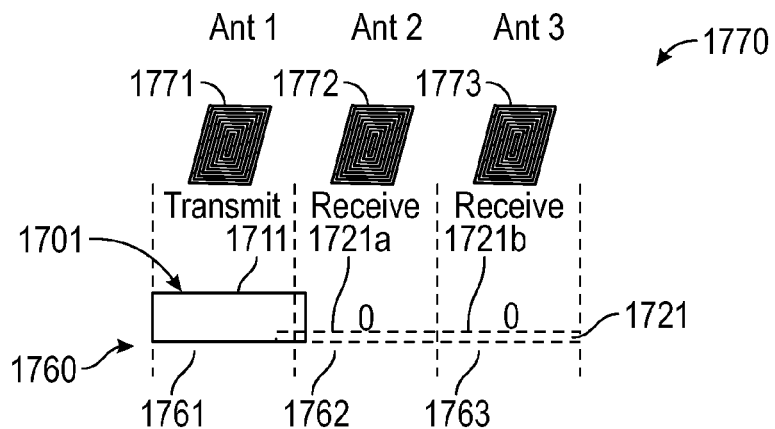
FIGS. 17A through 17E show examples of detection members comprising multiple inductively coupled, galvanically isolated closed conductive loops wherein at least one section of the closed conductive loops has a different magnetic amplitude response when compared with at least one other section of the multiple closed conductive loops.
Figure 17B:
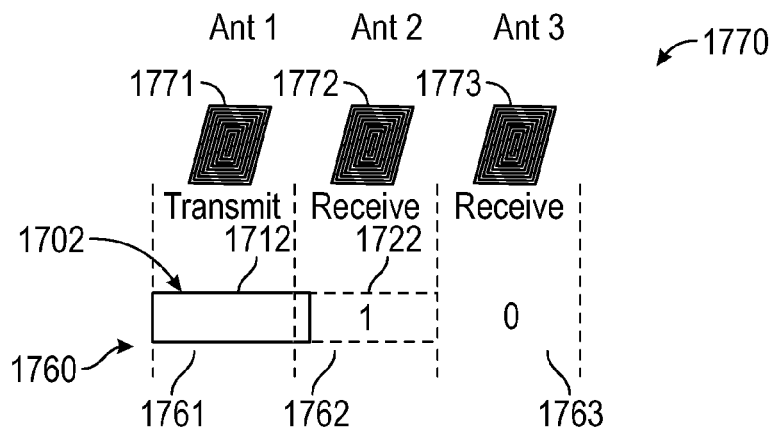

FIGS. 17A through 17E show examples of detection members comprising multiple inductively coupled, galvanically isolated closed conductive loops. The loops that are galvanically isolated and inductive coupled lie in different planes, e.g., loops indicated by dashed lines lie in a different plane from loops indicated by solid lines. FIGS. 17A and 17B illustrate detection members having multiple closed conductive loops wherein at least one section of the closed conductive loops has a different magnetic amplitude response when compared with at least one other section of the multiple closed conductive loops.

FIG. 17A illustrates a detection member 1701 comprising two spaced apart closed conductive loops 1711, 1721. The second conductive loop 1721 includes two spaced apart sections 1721a, 1721b. The first and second loops 1711, 1721 are arranged in a detection area 1760 having three spaced apart detection area sections 1761, 1762, 1763. The first closed conductive loop 1711 is disposed in the first detection area section 1761, the first section 1721a of the second loop 1721 is disposed in the second detection area section 1762, and the second section 1721b of the second loop 1721 is disposed in the third detection area section 1763. The first and second loops 1711, 1721 are galvanically isolated and inductively coupled between the first and the second detection area sections 1761, 1762. A sensor array 1770 comprising sensor elements 1771, 1772, 1773 is shown proximate and in communication range of the detection member 1701.

The first sensor element 1771 is the transmit sensor in this example. The first sensor element 1771 transmits an electromagnetic signal that electromagnetically excites the first loop 1711. The first loop 1711 inductively communicates the electromagnetic energy from the transmitted signal to the second loop 1721, generating a magnetic response in the first and second sections 1721a, 1721b of the second loop 1721. The first and second sections 1721a, 1721b of the second loop 1712 are two notched sections in series having a relatively low geometrical correspondence with respect to their sensor elements 1772, 1773 resulting in a low magnetic amplitude response of loop sections 1721a, 1721b. The relatively low coupled signal between the first section 1721a of the second loop 1721 and its corresponding sensor element 1772 and between the second section 1721b and its corresponding sensor element 1773 generate relatively low amplitude signals on the sensor elements 1772 and 1773. Each of the low amplitude signals is interpreted by the reader circuitry as representing a logical zero. When the third sensor element 1773 is designated as representing the LSB of the code and the second sensor element 1772 is designated as representing the MSB of the code, the code corresponding to the magnetic response of the loop sections 1721a and 1721b in the detection area 1706 is 00.

FIG. 17B illustrates a detection member 1702 comprising two spaced apart closed conductive loops 1712, 1722. The first and second loops 1712, 1722 are arranged in a detection area 1760 having three spaced apart detection area sections 1761, 1762, 1763. The first loop 1712 is disposed in detection area section 1761, the second loop is disposed in detection area section 1762, and no loop section is disposed in detection area section 1763. The first and second loops 1712, 1722 are galvanically isolated and inductively coupled between the first and the second detection area sections 1761, 1762. A sensor array 1770 comprising sensor elements 1771, 1772, 1773 is shown proximate and in communication range of the detection member 1702.

The first sensor element 1771 is the transmit sensor in this example. The first sensor element 771 transmits an electromagnetic signal that electromagnetically excites the first loop 1712. The first loop 1712 inductively communicates the electromagnetic energy from the transmitted signal to the second loop 1722, generating a magnetic response in the second loop 1722. The second loop has a relatively high geometrical correspondence with respect to its sensor element 1772 resulting in a relatively high magnetic amplitude response and a relatively high amplitude signal on the sensor element 1772. The relatively high amplitude signal on sensor element 1772 represents a logical 1 in this example. There is no loop section disposed in detection area 1763 and the signal on the sensor element 1773 corresponding to detection area 1763 is a low or zero amplitude signal which represents a logical 0 in this example. When the third sensor element 1773 is designated as representing the LSB of the code and the second sensor element 1772 is designated as representing the MSB of the code, the code corresponding to the magnetic response of the loop 1722 in the detection area 1760 is 10.

Figure 17C:
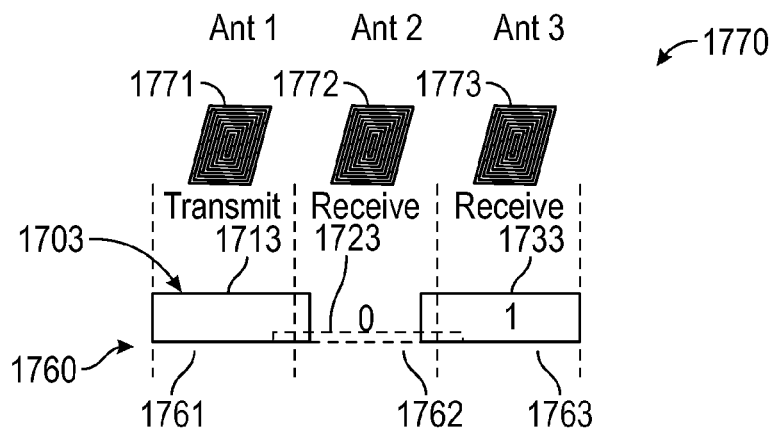

FIG. 17C illustrates a detection member 1703 comprising three spaced apart closed conductive loops 1713, 1723, 1733. The loops 1713, 1723, 1733 are arranged in a detection area 1760 having three spaced apart detection area sections 1761, 1762, 1763. The first loop 1713 is disposed in detection area section 1761, the second loop 1723 is disposed in detection area section 1762, and the third loop 1733 is disposed in detection area section 1763. The first and second loops 1713, 1723 are galvanically isolated and inductively coupled between the first and the second detection area sections 1761, 1762. The second and third loops 1723, 1733 are galvanically isolated and inductively coupled between the second and the third detection area sections 1762, 1763. A sensor array 1770 comprising sensor elements 1771, 1772, 1773 is shown proximate and in communication range of the detection member 1703.

The first sensor element 1771 is the transmit sensor in this example. The first sensor element 1771 transmits an electromagnetic signal that electromagnetically excites the first loop 1713. The first loop 1713 inductively communicates the electromagnetic energy from the transmitted signal to the second loop 1723, generating a magnetic response in the second loop 1723. The second loop 1723 has a relatively low geometrical correspondence with respect to its sensor element 1772 resulting in a relatively low magnetic amplitude response and relatively low amplitude signal on the sensor element 1772. The relatively low amplitude signal on sensor element 1772 represents a logical 0 in this example. The second loop 1723 is inductively coupled to the third loop 1733 between the second and third detection area sections 1762, 1763. The second loop 1723 inductively communicates the electromagnetic energy from the transmitted signal to the third loop 1733, generating a magnetic response in the third loop 1733. The third loop 1733 has a relatively high geometrical correspondence with respect to its sensor element 1773 resulting in a relatively high magnetic amplitude response and relatively high amplitude signal on the sensor element 1773. The relatively high amplitude signal on sensor element 1773 represents a logical 1 in this example. When the third sensor element 1773 is designated as representing the LSB of the code and the second sensor element 1772 is designated as representing the MSB of the code, the code corresponding to the magnetic response of the second and third loops 1723, 1733 in the detection area 1760 is 01.

Figure 17D:
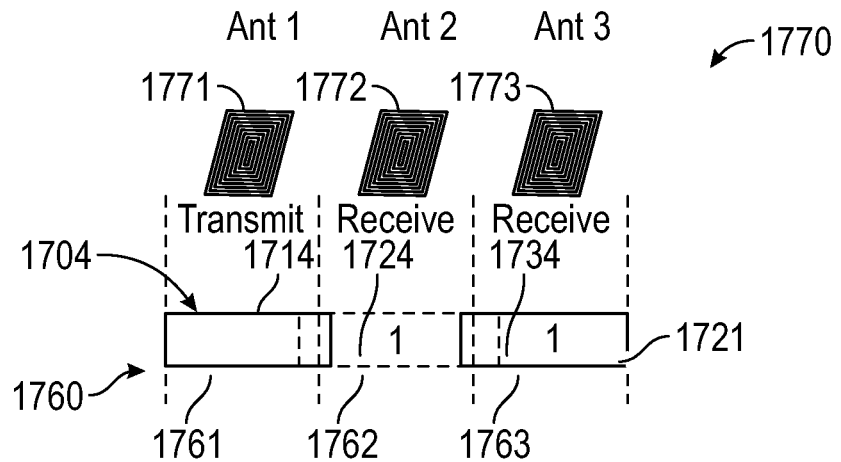

FIG. 17D illustrates a detection member 1704 comprising three spaced apart closed conductive loops 1714, 1724, 1734. The loops 1714, 1724, 1734 are arranged in a detection area 1760 having three spaced apart detection area sections 1761, 1762, 1763. The first loop 1714 is disposed in detection area section 1761, the second loop 1724 is disposed in detection area section 1762, and the third loop 1734 is disposed in detection area section 1763. The first and second loops 1714, 1724 are galvanically isolated and inductively coupled between the first and the second detection area sections 1761, 1762. The second and third loops 1724, 1734 are galvanically isolated and inductively coupled between the second and the third detection area sections 1762, 1763. A sensor array 1770 comprising sensor elements 1771, 1772, 1773 is shown proximate and in communication range of the detection member 1704.

The first sensor element 1771 is the transmit sensor in this example. The first sensor element 1771 transmits an electromagnetic signal that electromagnetically excites the first loop 1714. The first loop 1714 inductively communicates the electromagnetic energy from the transmitted signal to the second loop 1724, generating a magnetic response in the second loop 1724. The second loop 1724 has a relatively high geometrical correspondence with respect to its sensor element 1772 resulting in a relatively high magnetic amplitude response and relatively high amplitude signal on the sensor element 1772. The relatively high amplitude signal on sensor element 1772 represents a logical 1 in this example. The second loop 1724 is inductively coupled to the third loop 1734 between the second and third detection area sections 1762, 1763. The second loop 1724 inductively communicates the electromagnetic energy from the transmitted signal to the third loop 1734, generating a magnetic response in the third loop 1734. The third loop 1734 also has a relatively high geometrical correspondence with respect to its sensor element 1773 resulting in a relatively high magnetic amplitude response and relatively amplitude signal on the sensor element 1773. The relatively high amplitude signal on sensor element 1773 represents a logical 1 in this example. When the third sensor element 1773 is designated as representing the LSB of the code and the second sensor element 1772 is designated as representing the MSB of the code, the code corresponding to the magnetic response of the second and third loops 1724, 1734 in the detection area 1760 is 11.

Figure 17E:
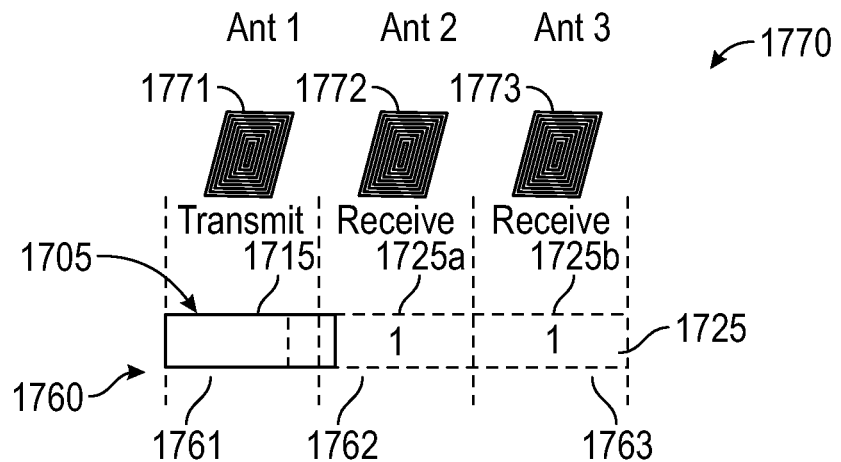
Figure 18A:
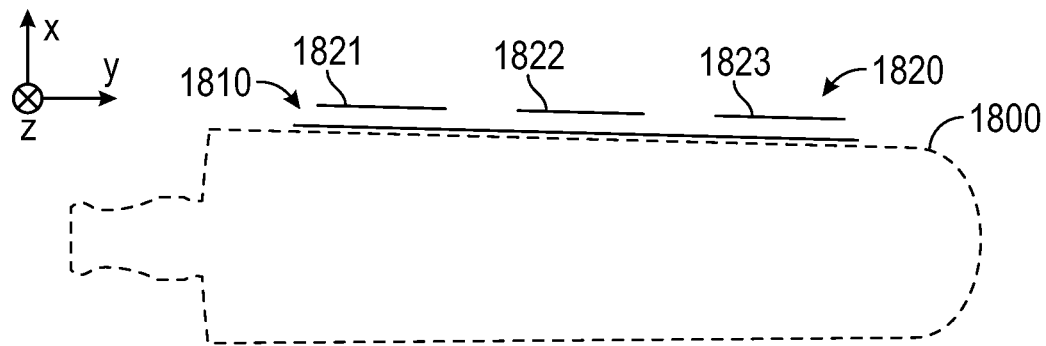
FIGS. 18A through 18D a closed conductive loop and sensor array arranged and rotated along the longitudinal axis (y-axis) of a treatment cartridge in accordance with some embodiments.
Figure 18B:
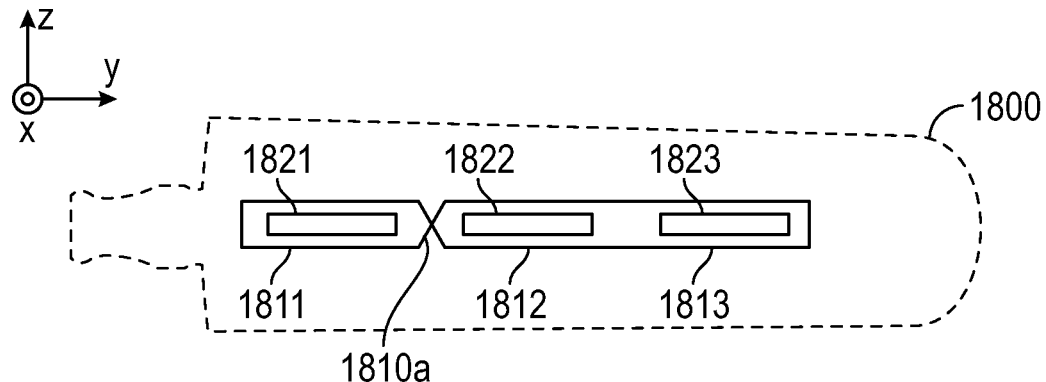
Figure 18C:
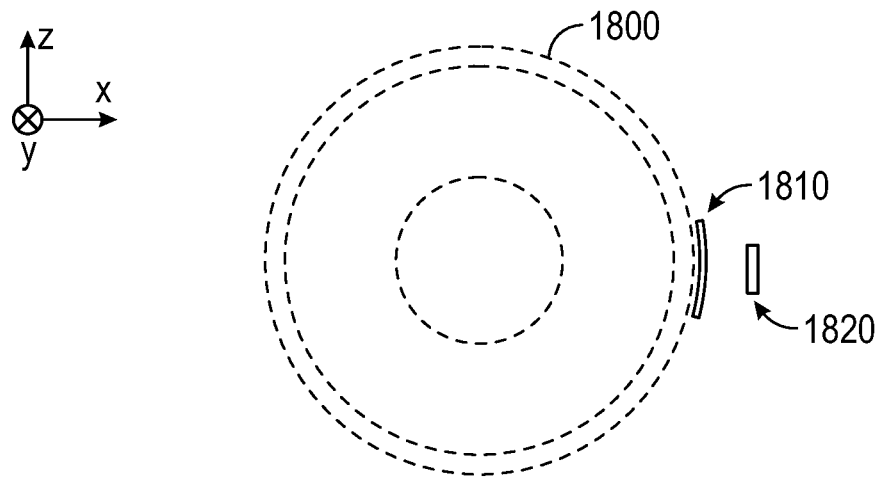
Figure 18D:
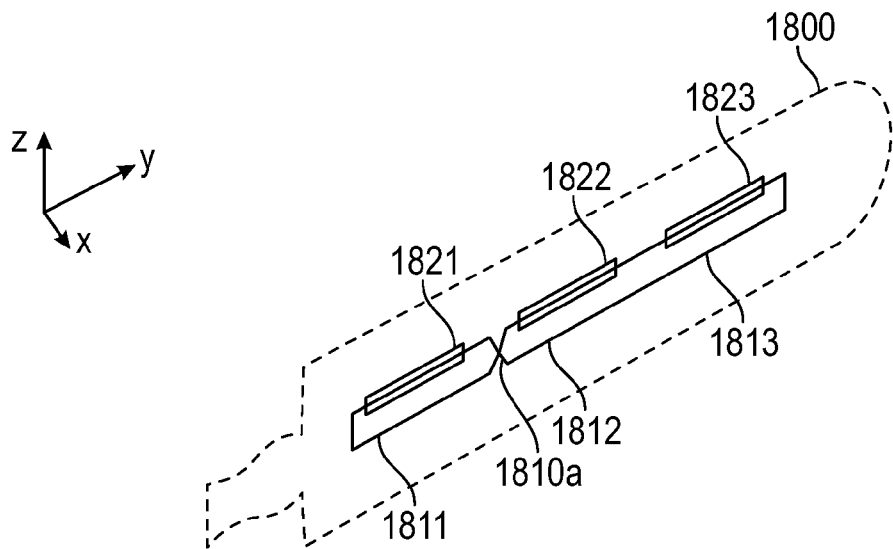

FIG. 17E illustrates a detection member 1705 comprising two spaced apart closed conductive loops 1715, 1725. The loops 1715, 1725 are arranged in a detection area 1760 having three spaced apart detection area sections 1761, 1762, 1763. The first loop 1715 is disposed in detection area section 1761, a first section 1725a of the second loop 1725 is disposed in detection area section 1762, and a second section 1725b of the second loop 1725 is disposed in detection area section 1763. The first and second loops 1715, 1725 are galvanically isolated and inductively coupled between the first and the second detection area sections 1761, 1762. A sensor array 1770 comprising sensor elements 1771, 1772, 1773 is shown proximate and in communication range of the detection member 1705.

The first sensor element 1771 is the transmit sensor in this example. The first sensor element 1771 transmits an electromagnetic signal that electromagnetically excites the first loop 1715. The first loop 1715 inductively communicates the electromagnetic energy from the transmitted signal to the second loop 1725, generating magnetic responses in the spaced apart first 1725a and second 1725b sections of the second loop 1725 The first section 1725a of the second loop 1725 has a relatively high geometrical correspondence with respect to its sensor element 1772 resulting in a relatively high magnetic amplitude response and relatively high amplitude signal on the sensor element 1772. The relatively high amplitude signal on sensor element 1772 represents a logical 1 in this example. The second section 1725b of the second loop 1725 also has a relatively high geometrical correspondence with respect to its sensor element 1773 resulting in a relatively high magnetic amplitude response and relatively high amplitude signal on the sensor element 1773. The relatively high amplitude signal on sensor element 1773 represents a logical 1 in this example. When the third sensor element 1773 is designated as representing the LSB of the code and the second sensor element 1772 is designated as representing the MSB of the code, the code corresponding to the magnetic response of the first and second sections 1725a, 1725b of the second loop 1725 in the detection area 1760 is 11.

A closed conductive loop and/or sections of the loop of a detection member may have various orientations with respect to the transmit and/or receive sensor elements as illustrated in FIGS. 18 through 22. FIGS. 18A through 18D illustrate an embodiment in which a closed conductive loop 1810 and sensor array 1820 are arranged along the longitudinal axis (y-axis) of a cartridge 1800. FIGS. 18A through 18D show various views of the cartridge 1800 that includes closed conductive loop 1810 having sections 1811, 1812, 1813 and a sensor array 1820 comprising corresponding sensor elements 1821, 1822, 1823. FIG. 18A shows the cartridge 1800, closed conductive loop 1810, and sensor array 1820 when viewed along the z axis; FIG. 18B shows the cartridge 1800, closed conductive loop 1810, and sensor array 1820 when viewed along the x axis; and FIG. 18C shows the cartridge 1800, closed conductive loop 1810, and sensor array 1820 when viewed along the y axis. FIG. 18D is an isometric view of the cartridge 1800, closed conductive loop 1810, and sensor array 1820.

The sensor elements 1821, 1822, 1823 of the sensor 1820 array are shown oriented in a plane that is substantially parallel to the planes of the loop sections 1811, 1812, 1813 in this embodiment. In this embodiment, the loop sections 1811, 1812, 1813 are disposed in two parallel planes due to the cross over 1810a between the first 1811 and second 1812 loop sections. When disposed longitudinally along the cylindrical cartridge 1800, the loop sections 1811, 1812, 1813 and/or sensor elements 1821, 1822, 1823 may not lie strictly in a flat plane due to the curvature of the cartridge, and thus the loop sections 1811, 1812, 1813 and corresponding sensor elements 1821, 1822, 1823 may be disposed on parallel, curved, e.g., coaxial, surfaces.

In this embodiment, the first sensor element 1821 is the transmit element and second and third sensor elements 1822, 1823 are receive sensor elements. The cross over 1810a reverses the angular direction of the current and causes the phase of the magnetic response of the second loop section 1812 to be shifted 180 degrees with respect to the phase of the magnetic response of the first loop section 1811. The phase of the electrical signal generated on the second sensor element 1822 from the second loop section 1812 is phase shifted by 180 degrees with respect to an electromagnetic signal transmitted from the first sensor element 1821. The phase of the magnetic response of the third loop section 1813 is also shifted in phase by 180 degrees with respect to the magnetic response of the first loop section 1811. The signal generated on the third sensor element 1823 from the third loop section 1813 is phase shifted by 0 degrees with respect to the signal generated on the second sensor element 1822 from the second loop section 1812 and is phase shifted by 180 degrees with respect to the electromagnetic signal transmitted from the first sensor element 1821.

When the signal on the third sensor element 1823 is designated as representing the LSB of the code, the signal on the second sensor element 1822 is designated as representing the MSB of the code, and a phase shift of 180 degrees from the phase of the transmitted signal represents a logical 1, the code corresponding to the magnetic response of the second and third loop sections 1812, 1813 is 11.

Figure 19A:
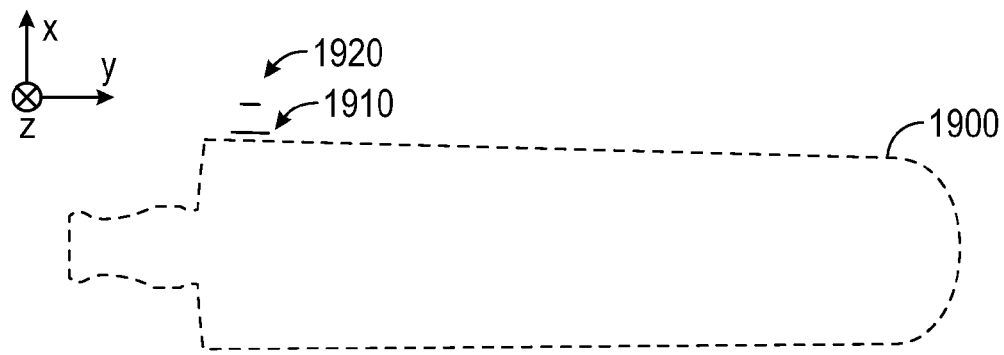
FIGS. 19A through 19C illustrate a closed conductive loop and a sensor array oriented along the circumference of a treatment cartridge in accordance with some embodiments.
Figure 19B:
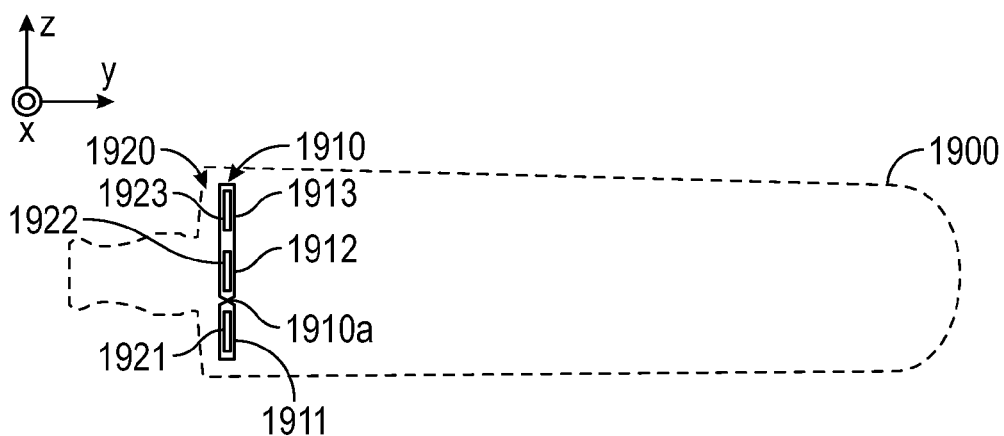
Figure 19C:
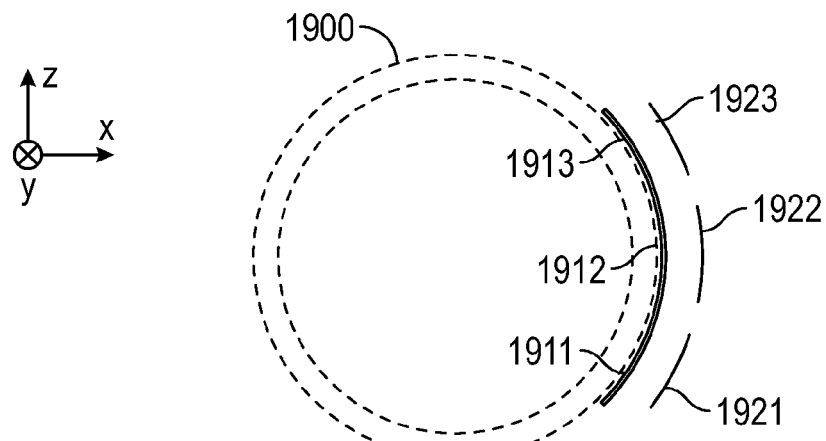

FIGS. 19A through 19C illustrate an embodiment in which a closed conductive loop 1910 and a sensor array 1920 are oriented along the circumference of a cartridge 1900. FIGS. 19A through 19C show various views of the cartridge 1900 that includes a closed conductive loop 1910 having sections 1911, 1912, 1913 and a sensor array 1920 comprising corresponding sensor elements 1921, 1922, 1923. FIG. 19A shows the cartridge 1900, closed conductive loop 1910, and sensor array 1920 when viewed along the z axis; FIG. 19B shows the cartridge 1900, closed conductive loop 1910, and sensor array 1920 when viewed along the x axis; and FIG. 19C shows the cartridge 1900, closed conductive loop 1910, and sensor array 1920 when viewed along the y axis.

The loop sections 1911, 1912, 1913 of the closed conductive loop 1910 and the sensor elements 1921, 1922, 1923 of the sensor array 1920 are spaced apart around a portion of the circumference of the cartridge 1900 in this embodiment. When disposed circumferentially around a cylindrical housing, the loop sections 1911, 1912, 1913 and/or sensor elements 1921, 1922, 1923 may be curved such that the loop sections 1911, 1912, 1913 and the corresponding sensor elements 1921, 1922, 1923 are disposed on parallel curved surfaces, e.g., coaxial surfaces.

In this embodiment, the first sensor element 1921 is the transmit element and second and third sensor elements 1922, 1923 are receive sensor elements. The cross over 1910a of disposed between the first 1911 and second 1912 loop sections reverses the angular direction of the current and causes the phase of the magnetic response of the second loop section 1912 to be shifted 180 degrees with respect to the phase of the magnetic response of the first loop section 1911. The phase of the electrical signal generated on the second sensor element 1922 from the second loop section 1912 is phase shifted by 180 degrees with respect to the electromagnetic signal transmitted from the first sensor element 1921. The phase of the magnetic response of the third loop section 1913 is also shifted in phase by 180 degrees with respect to the magnetic response of the first loop section 1911. The signal generated on the third sensor element 1923 from the third loop section 1913 is phase shifted by 0 degrees with respect to the signal generated on the second sensor element 1922 from the second loop section 1912 and is phase shifted by 180 degrees with respect to the electromagnetic signal transmitted from the first sensor element 1921.

When the signal on the third sensor element 1923 is designated as representing the LSB of the code, the signal on the second sensor element 1922 is designated as representing the MSB of the code, and a phase shift of 180 degrees from the phase of the transmitted signal represents a logical 1, the code corresponding to the magnetic response of the second and third loop sections 1912, 1913 is 11.

Figure 20A:
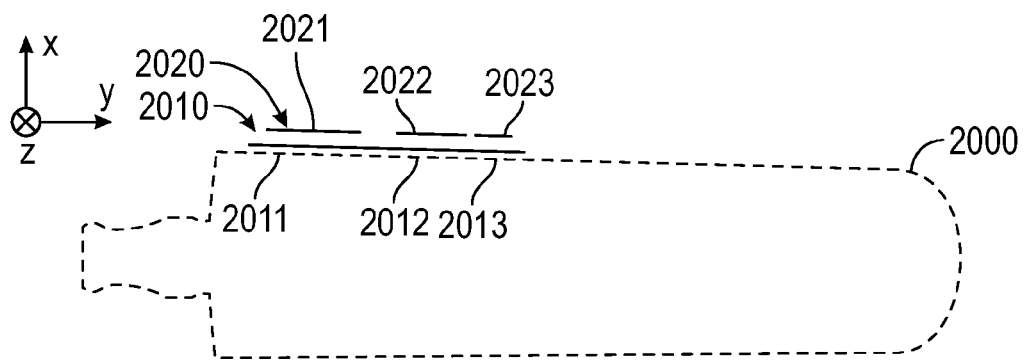
FIGS. 20A through 20D illustrate a closed conductive loop that includes a loop section that is oriented at an angle to the other loop sections and a sensor array that includes a corresponding sensor element oriented at an angle to the other sensor elements in accordance with some embodiments.
Figure 20B:
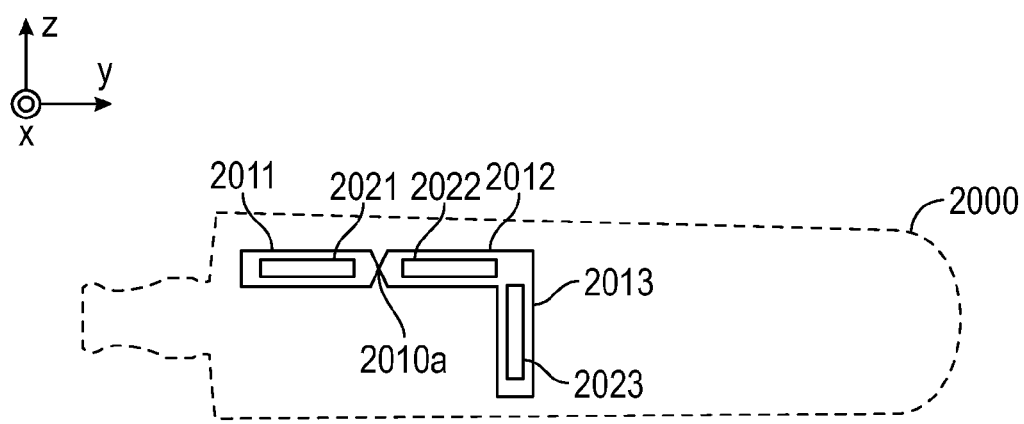
Figure 20C:
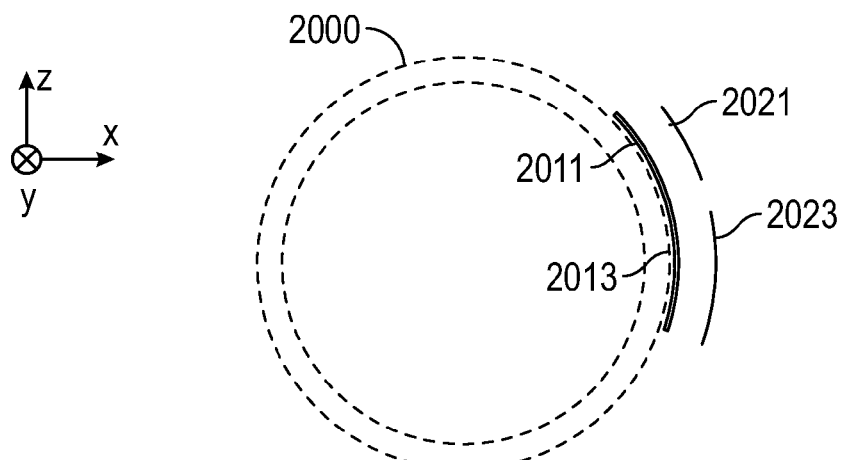
Figure 20D:
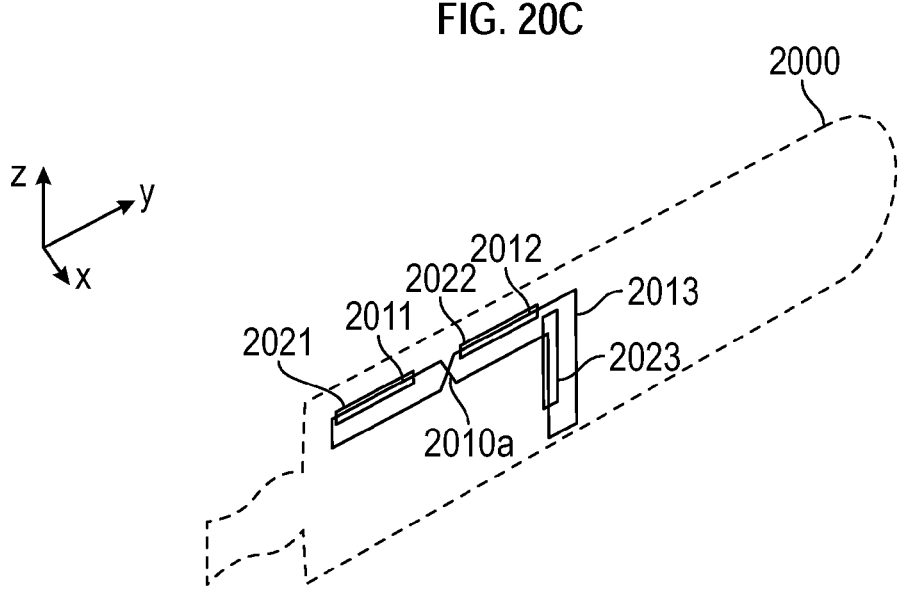

FIGS. 20A through 20D illustrate an embodiment in which a closed conductive loop 2010 includes a loop section 2013 that is oriented at an angle to the other loop sections 2011, 2012 and a sensor array 2020 includes sensor element 2023 corresponding to loop section 2013 that is oriented at an angle to the other sensor elements 2021, 2022. FIGS. 20A through 20D show various views of the cartridge 2000 that includes a closed conductive loop 2010 having sections 2011, 2012, 2013 and a sensor array 2020 comprising corresponding sensor elements 2021, 2022, 2023. FIG. 20A shows the cartridge 2000, closed conductive loop 2010, and sensor array 2020 when viewed along the z axis; FIG. 20B shows the cartridge 2000, closed conductive loop 2010, and sensor array 2020 when viewed along the x axis; and FIG. 20C shows the cartridge 2000, closed conductive loop 2010, and sensor array 2020 when viewed along the y axis. FIG. 20D is an isometric view of the cartridge 2000, closed conductive loop 2010, and sensor array 2020.

Loop sections 2011 and 2012 are spaced apart along the longitudinal y-axis of the cartridge 2000 and loop section 2013 is oriented at about a 90 degree angle with respect to loop sections 2011 and 2012. Loop section extends partially around the circumference of the cartridge 2000. When the cartridge is cylindrical, loop sections 2011, 2012, 2013 may lie in a curved plane that is parallel to the curved plane of the cartridge surface. In this embodiment, the loop sections are disposed in two parallel surfaces due to the cross over 2010a between the first 2011 and second 2012 loop sections. Sensor elements 2021 and 2022 are oriented along the longitudinal y-axis of the cartridge 2000 and sensor element 2023 is oriented at about a 90 degree angle with respect to sensor elements 2021 and 2022, extending around a portion of the circumference of the cartridge 2000. When the cartridge is cylindrical, sensor elements 2021, 2022, 2023 may lie in a curved plane that is parallel and coaxial with the curved plane of the loop sections 2011, 2012, 2013.

In this embodiment, the first sensor element 2021 is the transmit element and second and third sensor elements 2022, 2023 are receive sensor elements. The cross over 2010a of disposed between the first 2011 and second 2012 loop sections reverses the angular direction of the current and causes the phase of the magnetic response of the second loop section 2012 to be shifted 180 degrees with respect to the phase of the magnetic response of the first loop section 2011. The phase of the electrical signal generated on the second sensor element 2022 from the second loop section 2012 is phase shifted by 180 degrees with respect to an electromagnetic signal transmitted from the first sensor element 2021. The phase of the magnetic response of the third loop section 2013 is also shifted in phase by 180 degrees with respect to the magnetic response of the first loop section 2011. The signal generated on the third sensor element 2023 from the third loop section 2013 is phase shifted by 0 degrees with respect to the signal generated on the second sensor element 2022 from the second loop section 2012 and is phase shifted by 180 degrees with respect to the electromagnetic signal transmitted from the first sensor element 2021.

When the signal on the third sensor element 2023 is designated as representing the LSB of the code, the signal on the second sensor element 2022 is designated as representing the MSB of the code, and a phase shift of 180 degrees from the phase of the transmitted signal represents a logical 1, the code corresponding to the magnetic response of the second and third loop sections 2012, 2013 is 11.

Figure 21A:
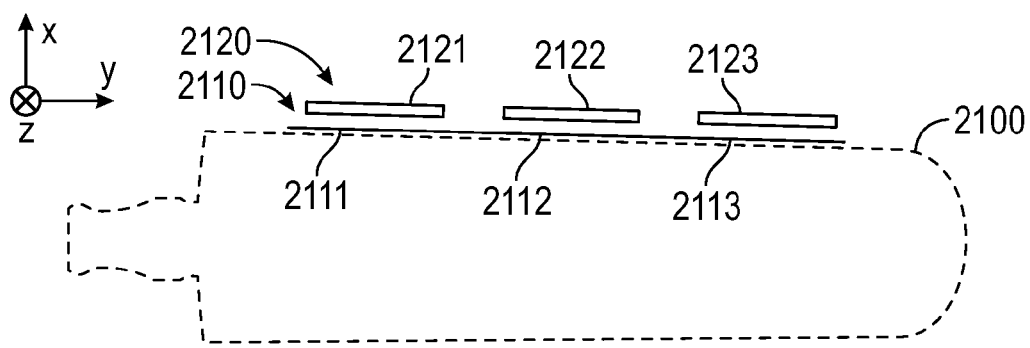
FIGS. 21A through 21C illustrate an embodiment in which the planar surface of the closed conductive loop is perpendicular to the planar surfaces of the sensor elements of the sensor array in accordance with some embodiments.
Figure 21B:
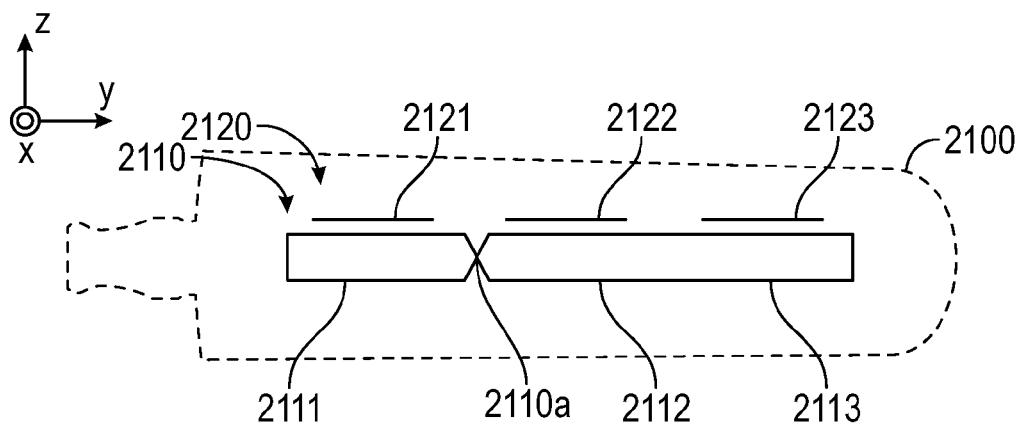
Figure 21C:
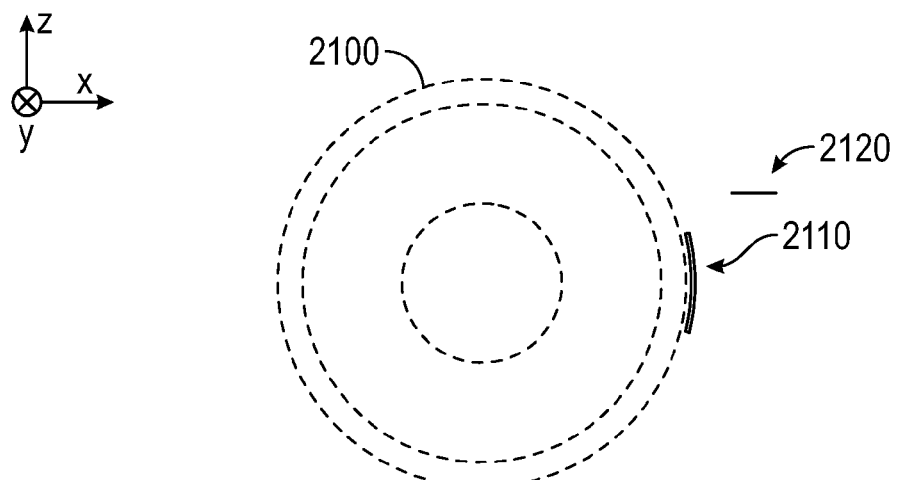

FIGS. 21A through 21C illustrate an embodiment in which the orientation of the closed conductive loop 2110 is disposed at an angle, e.g., perpendicular, to the orientation of the sensor array 2120. FIGS. 21A through 21C show various views of a cartridge 2100 that includes a closed conductive loop 2110 having sections 2111, 2112, 2113 and a corresponding sensor array 2120 comprising sensor elements 2121, 2122, 2123. FIG. 21A shows the cartridge 2100, closed conductive loop 2110, and sensor array 2120 when viewed along the z axis; FIG. 21B shows the cartridge 2100, closed conductive loop 2110, and sensor array 2120 when viewed along the x axis; and FIG. 21C shows the cartridge 2100, closed conductive loop 2110, and sensor array 2120 when viewed along the y axis.

Closed conductive loop 2100 includes three loop sections 2111, 2112, 2113 spaced apart along a longitudinal axis (y axis) of the cartridge 2100. Sensor array 2120 includes three corresponding sensor elements 2121, 2122, 2123 that are spaced apart along the y-axis where surfaces of the sensor elements 2121, 2122, 2123 are oriented at about a 90 degree angle with respect to surfaces of their corresponding loop sections 2111, 2112, 2113.

In this embodiment, the first sensor element 2121 is the transmit element and second and third sensor elements 2122, 2123 are receive sensor elements. The cross over 2110a disposed between the first 2111 and second 2112 loop sections reverses the angular direction of the current and causes the phase of the magnetic response of the second loop section 2112 to be shifted 180 degrees with respect to the phase of the magnetic response of the first loop section 2111. The phase of the electrical signal generated on the second sensor element 2122 from the second loop section 2112 is phase shifted by 180 degrees with respect to an electromagnetic signal transmitted from the first sensor element 2121. The phase of the magnetic response of the third loop section 2113 is also shifted in phase by 180 degrees with respect to the magnetic response of the first loop section 2111. The signal generated on the third sensor element 2123 from the third loop section 2113 is phase shifted by 0 degrees with respect to the signal generated on the second sensor element 2122 from the second loop section 2112 and is phase shifted by 180 degrees with respect to the electromagnetic signal transmitted from the first sensor element 2121.

When the signal on the third sensor element 2123 is designated as representing the LSB of the code, the signal on the second sensor element 2122 is designated as representing the MSB of the code, and a phase shift of 180 degrees from the phase of the transmitted signal represents a logical 1, the code corresponding to the magnetic response of the second and third loop sections 2112, 2113 is 11.

Figure 22A:
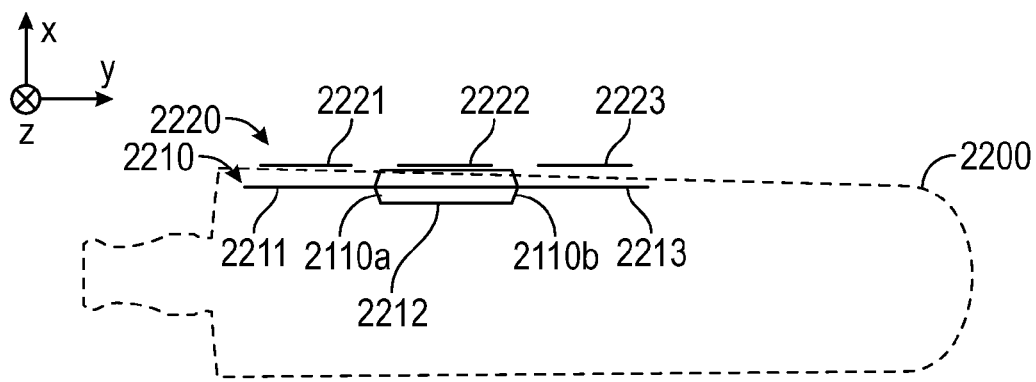
FIGS. 22A through 22C illustrate a closed conductive loop wherein sections of the closed conductive loop are rotated along the longitudinal axis (y-axis) of the treatment cartridge in accordance with some embodiments.
Figure 22B:
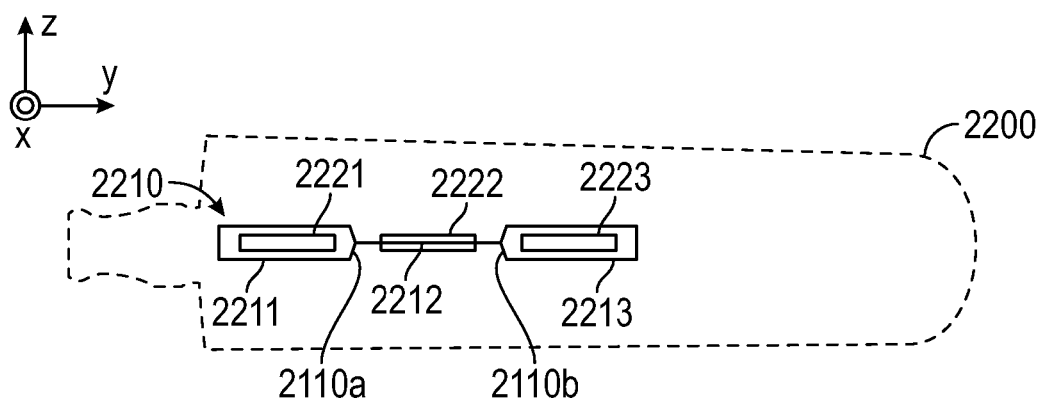
Figure 22C:
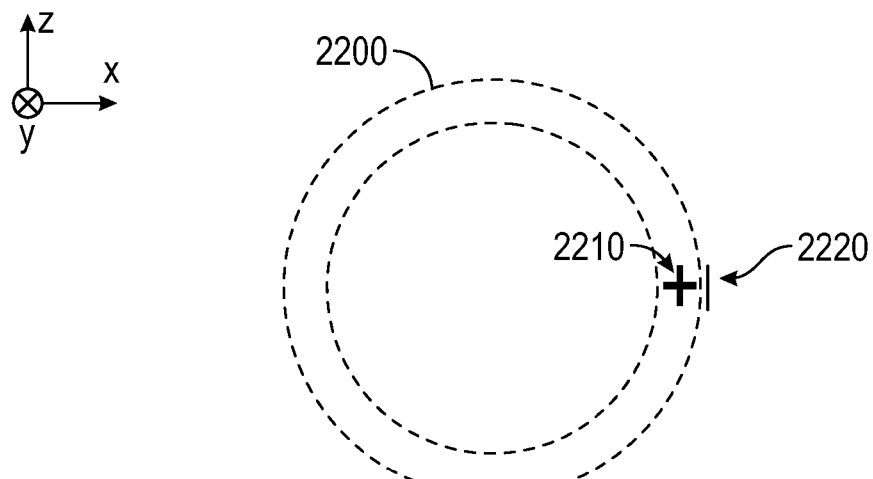

FIGS. 22A through 22C illustrate an embodiment in which a closed conductive loop 2210 and sensor array 2220 are spaced apart along the longitudinal axis of the cartridge 2200. The second section 2212 of the closed conductive loop 2210 is rotated along the longitudinal axis (y-axis) of the cartridge 2200 with respect to the first 2211 and third 2213 sections of the closed conductive loop 2210. The second sensor 2222 is rotated along the longitudinal axis (y-axis) of the cartridge 2200 with respect to the first 2221 and third 2223 sensor elements. FIGS. 22A through 22C show various views of a cartridge 2200 that includes a closed conductive loop 2210 having sections 2211, 2212, 2213 and a sensor array 2220 comprising corresponding sensor elements 2221, 2222, 2223. FIG. 22A shows the cartridge 2200, closed conductive loop 2210, and sensor array 2220 when viewed along the z axis; FIG. 22B shows the cartridge 2200, closed conductive loop 2210, and sensor array 2220 when viewed along the x axis; and FIG. 22C shows the cartridge 2200, closed conductive loop 2210, and sensor array 2220 when viewed along the y axis.

The loop 2210 includes two cross overs 2210a, 2210b and the loop 2210 is rotated 180 degrees along its length around the y-axis. The surface of the second loop section 2212 is rotated 90 degrees with respect to the orientation of the surface of the first loop section 2211. The surface of the third loop section 2213 is rotated 90 degrees with respect to the orientation of the surface of the second loop section 2212 and is rotated 180 degrees with respect to the orientation of the surface of the first loop sections 2211.

Sensor array 2220 includes three sensor elements 2221, 2222, 2223 that are spaced apart along the y-axis. The surface of the first sensor element 2221 is substantially parallel to the surface of the first loop section 2211. The surface of the second sensor element 2222 is substantially perpendicular to the surface of the second loop section 2212. The surface of the third sensor element 2223 is substantially parallel to the surface of the third loop section 2213.

In this embodiment, the first sensor element 2221 is the transmit element and second and third sensor elements 2222, 2223 are receive sensor elements. The first cross over 2210a causes the phase of the magnetic response of the second loop section 2212 to be shifted 180 degrees with respect to the phase of the magnetic response of the first loop section 2211. The phase of the electrical signal induced on the second sensor element 2222 by the second loop section 2212 is phase shifted by 180 degrees with respect to an electromagnetic signal transmitted from the first sensor element 2221. The phase of the electrical signal generated on the third sensor element 2223 by the third loop section 2213 is phase shifted by 180 degrees with respect to the signal generated on the second sensor element 2222 and is phase shifted by 360 (0) degrees with respect to the electromagnetic signal transmitted from the first sensor element 2221. The substantially perpendicular orientation between the sensor element 2222 and second loop section 2212 results in a smaller induced signal amplitude on sensor 2222 by the second loop section 2212 than the signal amplitude on sensor element 2223 caused by the third loop section 2213. The substantially parallel orientation between the sensor element 2223 and second loop section 2213 results in a larger induced signal amplitude on sensor 2223 by the second loop section 2213 than the signal amplitude on sensor element 2222 caused by the third loop section 2212.

When the signal on the third sensor element 2223 is designated as representing the LSB of the code, the signal on the second sensor element 2222 is designated as representing the MSB of the code, and a phase shift of 180 degrees from the transmitted signal represents a logical 1, the code corresponding to the magnetic response of the second and third loop sections 2212, 2213 is 10. Alternatively, when the third sensor element 2223 is designated as representing the LSB of the code and the second sensor element 2222 is designated as representing the MSB of the code, and a high amplitude signal interpreted as a logical 1 and a low amplitude signal interpreted as a logical 0, the code corresponding to the loop sections 2212, 2213 of loop 2210 is 01.

Figure 23:
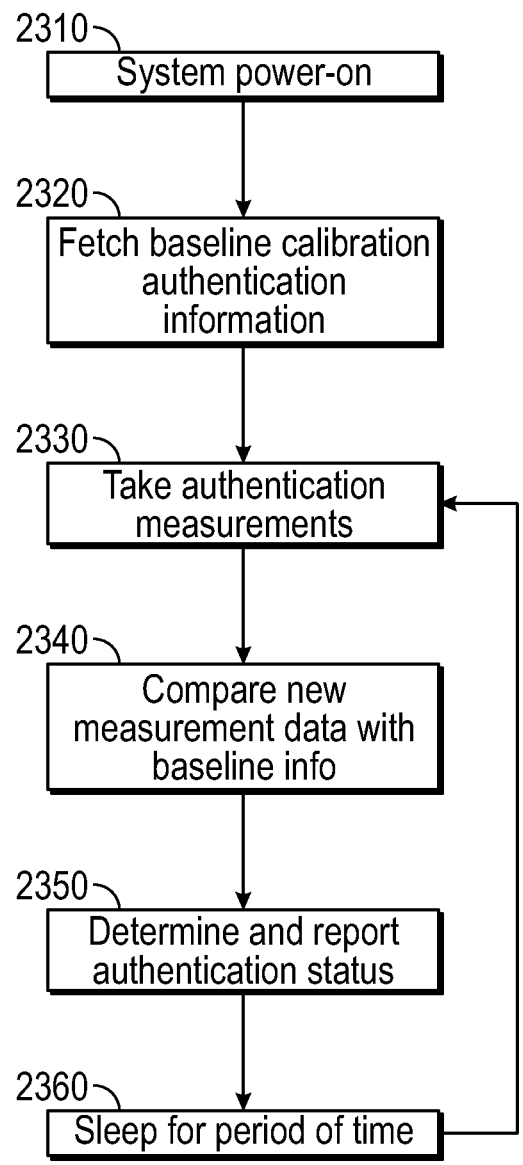
FIGS. 23 through 26 are flow diagrams that illustrate the operation of a detection system according to some embodiments.

FIGS. 23 through 26 are flow diagrams that illustrate the operation of a detection system according to some embodiments. FIG. 23 provides a high level diagram of system operation. After power on 2310 of the system, the microcontroller of the reader optionally fetches 2320 the baseline calibration authentication information, if available. In some implementations, the detection system may operate without baseline calibration authentication information. Authentication measurements 2330 are taken by transmitting electromagnetic signals from one or more sensor elements and sensing the magnetic responses of one or more loop sections using one or more sensor elements. The authentication measurements are compared 2340 to the baseline information to determine the logic levels of the sensed magnetic responses. The reader determines 2350 if the code read from the detection member is authentic and reports the results, e.g., via a user interface. The system may sleep 2360 for a period of time and initiate additional authentication measurement cycles at predetermined intervals or upon request.

Figure 24:
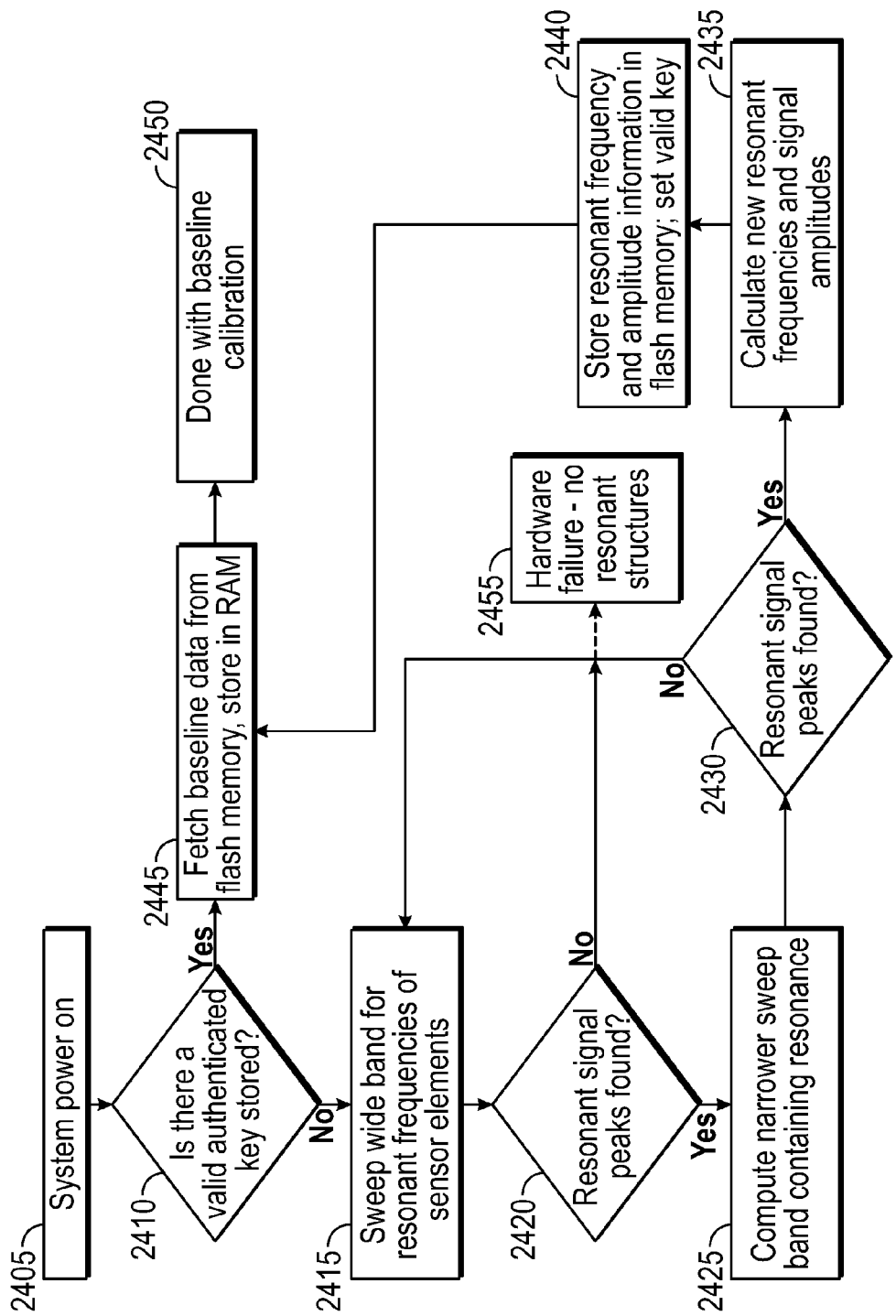

FIG. 24 illustrates how the reader's baseline calibration is performed in accordance with some embodiments. After system power on 2405, the microcontroller of the reader checks 2410 if a valid authentication key has been set indicating that a baseline calibration has previously been performed. If the valid authentication key has been set, the controller moves 2445 the baseline data from non-volatile memory to random access memory (RAM) and concludes 2450 the baseline calibration.

If the valid authentication key has not been set 2410, the reader begins the process of locating the resonant frequencies of the sensor elements. The reader transmits an electromagnetic signal from one of the sensor elements, referred to as the transmitter element, sweeping 2415 through a relatively wide band of frequencies, e.g., 10-30 MHz, while sensing the response of the other sensor elements. If initial resonant signal peaks are detected 2420 from the other (non-transmitting) sensor elements, the reader computes 2425 a narrower sweep band of frequencies that corresponds to the detected initial resonant peaks and performs a second sweep through the narrower band of frequencies. After using the wider band sweep to determine approximate resonant frequencies the reader will compute the settings to achieve a narrower band sweep. It will then utilize these settings in order to sweep over 2425 the narrower band and make the appropriate baseline measurements for each combination of sensor elements used as the transmitting elements.

If resonant peaks are detected 2430 during the second sweep, the reader circuitry calculates 2435 the new resonant frequencies and the baseline amplitudes of the sensor elements at the resonant frequencies. The resonant frequencies and baseline amplitudes for each loop section are stored 2440 in non-volatile memory and sets the authentication valid key. The reader circuitry may make several attempts to locate the resonant frequencies by performing the wider band sweep and the narrower band sweep a predetermined number of times. If no resonant frequencies are located 2420, 2430 after performing one or both of the wider and narrower band sweeps the predetermined number of times, the reader circuitry indicates 2455 a hardware failure.

Figure 25:
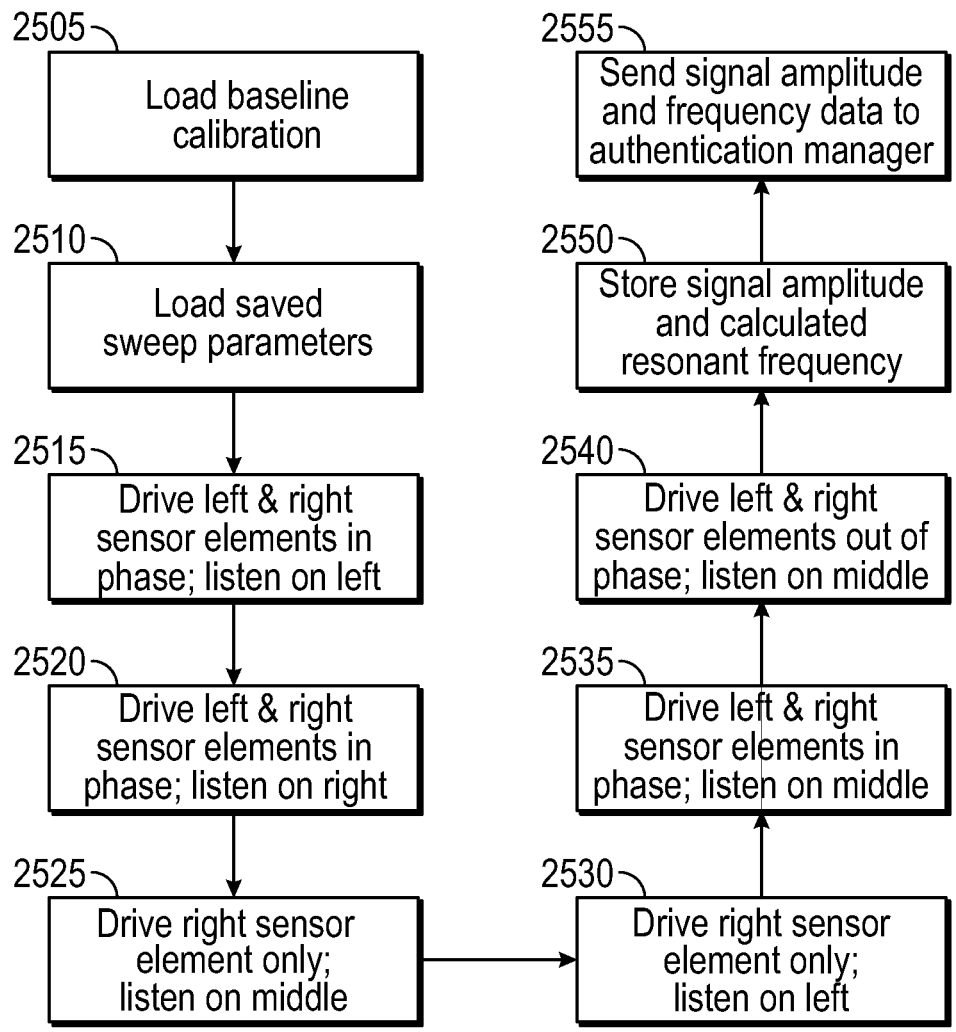

FIG. 25 is a flow diagram illustrating a process of sensing the magnetic response of conductive loop sections and determining the code of the conductive loop in accordance with some embodiments. In this embodiment, the conductive loop includes three loop sections which are designated as left, right, and middle. The left, right, and middle loop sections correspond to left, right, and middle sensor elements.

On startup the calibration information is loaded if it is deemed valid. If not valid, which would be the case the first time the electronics are powered up, then baseline amplitude and resonant frequency information would be captured and stored into non-volatile memory and the calibration would then be identified as being valid. On any subsequent startup the stored calibration information would be used to determine authenticity. Authentication measurements taken outside of calibration are only stored in volatile memory and utilized to make the decision regarding authenticity. Initially, the baseline measurements and sweep parameters, e.g., sweep band, corresponding to each drive and measurement configuration used are loaded 2505, 2510, if these baseline measurements are available. The system proceeds to transmit and sense using various optional sensor element combinations. For example, the system may drive the right and left sensor elements with electromagnetic signals that are in phase and sense 2515 the magnetic response from the left section of the conductive loop using the left sensor element; the system may drive the right and left sensor elements with electromagnetic signals that are in phase and sense 2520 the magnetic response from the right section of the conductive loop using the right sensor element; the system may drive the right sensor element only and sense 2525 the magnetic response from the middle section of the conductive loop using the middle sensor element; the system may drive the right sensor element only and sense 2530 the left section of the conductive loop using the left sensor element; the system may drive the right and left sensor elements in phase and sense 2535 the magnetic response of the middle section of the conductive loop using the middle sensor element; and/or the system may drive the right and left sensor elements out of phase, e.g., 180 degrees out of phase and sense 2540 the magnetic response of the middle section of the conductive loop using the middle sensor element. The system stores 2550 the sensed amplitude and calculated resonant frequency for each of the measurements and sends 2555 the stored amplitudes and resonant frequencies to the authentication manager.

Figure 26:
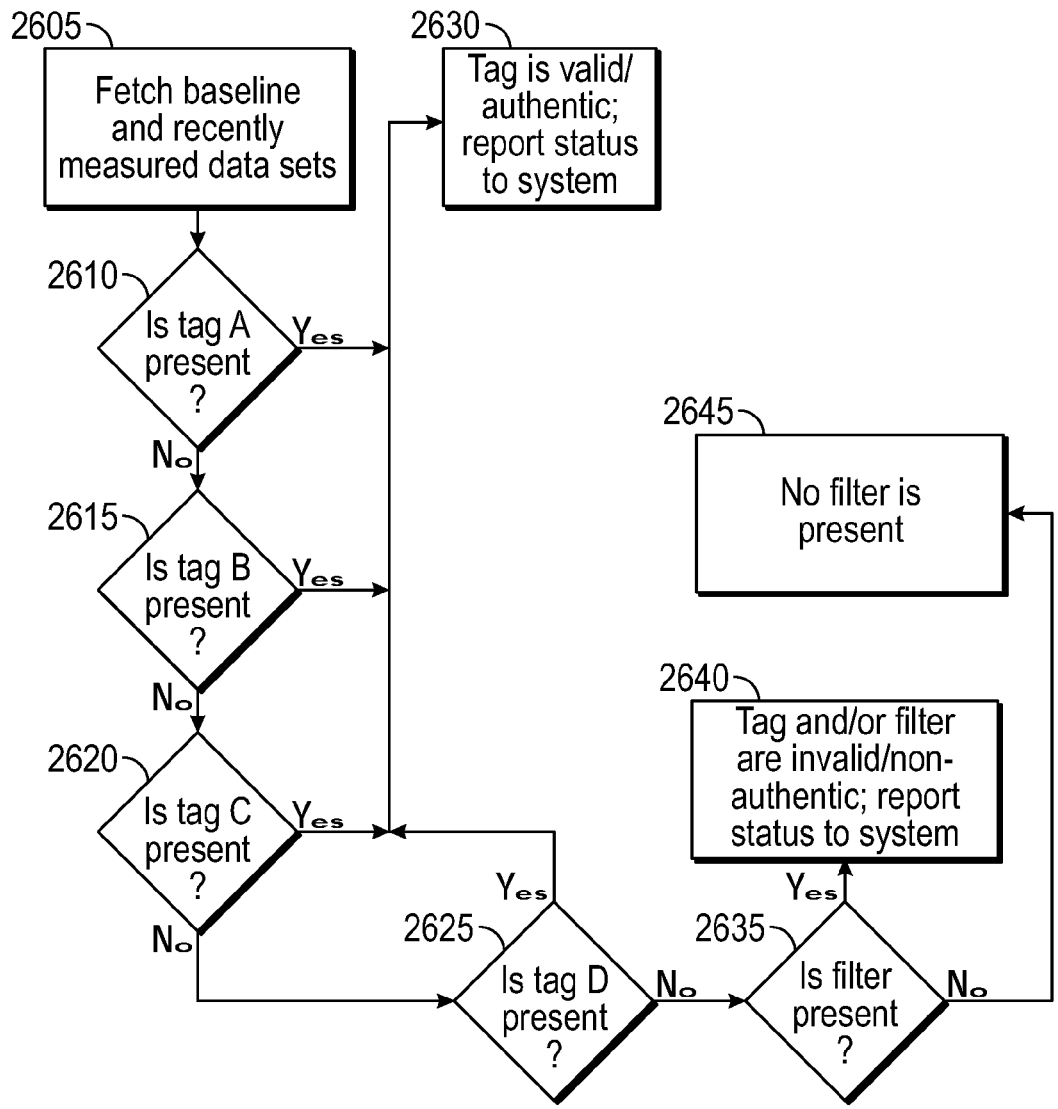

FIG. 26 is a flow diagram illustrating an authentication process in accordance with some embodiments. Prior to the process of FIG. 26, a baseline calibration may have been performed, e.g., by the process outlined in FIG. 24 and the magnetic responses of the loop sections have measured, e.g., by the process outlined in FIG. 25. In this embodiment, the conductive loop can represent four different codes. The reader circuitry fetches 2605 the baseline information and the recent measurements of the magnetic responses of the loop sections. The reader circuitry compares 2610-2625 the recent measurements to each possible code, indicated as Tag A, Tag B, Tag C, Tag D in FIG. 26. If the recent measurements correspond to one of the possible codes, then the treatment cartridge is authenticated 2630. The reader may report this status to other circuitry and/or provide an indication via a user interface that the cartridge is authenticated.

If the recent measurements do not correspond to any of the possible codes, the reader circuitry may check 2635, if a treatment cartridge is present. If no treatment cartridge is present 2645, the reader may report this status to other circuitry and/or provide an indication via a user interface that no cartridge is present. If a treatment cartridge is present, then the conductive loop and/or treatment cartridge are not authenticated 2640. The reader may report this status to other circuitry and/or provide an indication via a user interface that the cartridge cannot be authenticated.

EXAMPLES

Various three section conductive loop configurations were constructed and tested with different drive arrangements. In the following examples, the three loop sections are referred to as the leftmost, center, and rightmost loop sections. The corresponding sensor elements of the reader are referred to as leftmost, center, and rightmost sensor elements. In a single drive arrangement, a rightmost sensor element energizes the rightmost section of the conductive loop, the center sensor element senses the magnetic response of the center section of the conductive loop, and the leftmost sensor element senses the magnetic response of the leftmost section of the conductive loop. In a dual drive in-phase arrangement, rightmost and leftmost sensor elements transmit electromagnetic signals that are in-phase with each other and that respectively energize the rightmost section and the leftmost section of the conductive loop. The center sensor element senses a magnetic response of the center section of the conductive loop. In a dual drive out-of-phase arrangement, rightmost and leftmost sensor elements transmit electromagnetic signals that are out-of-phase with each other and that respectively energize the rightmost section and the leftmost section of the conductive loop. The center sensor element senses the magnetic response of the center section of the conductive loop.

Example 1

Figure 27A:
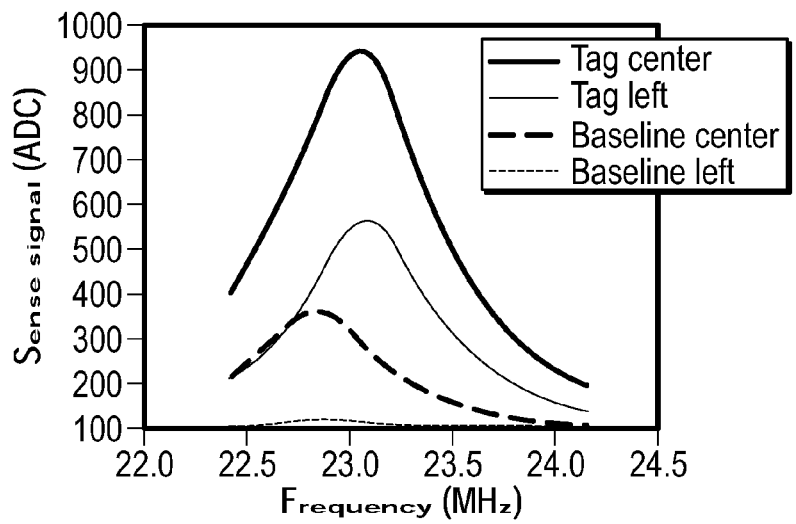
FIGS. 27A-27C compare graphs of the baseline and measurement signals for a simple conductive loop having the configuration generally shown in FIG. 1B and having three sections.
Figure 27B:
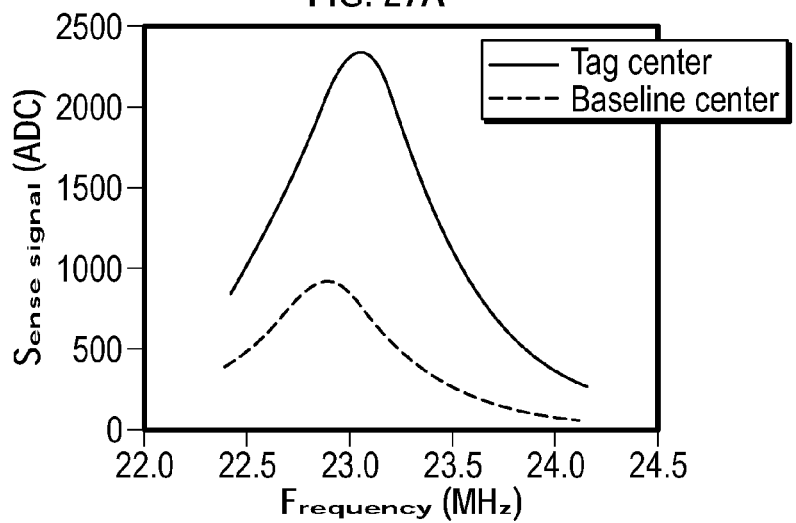
Figure 27C:
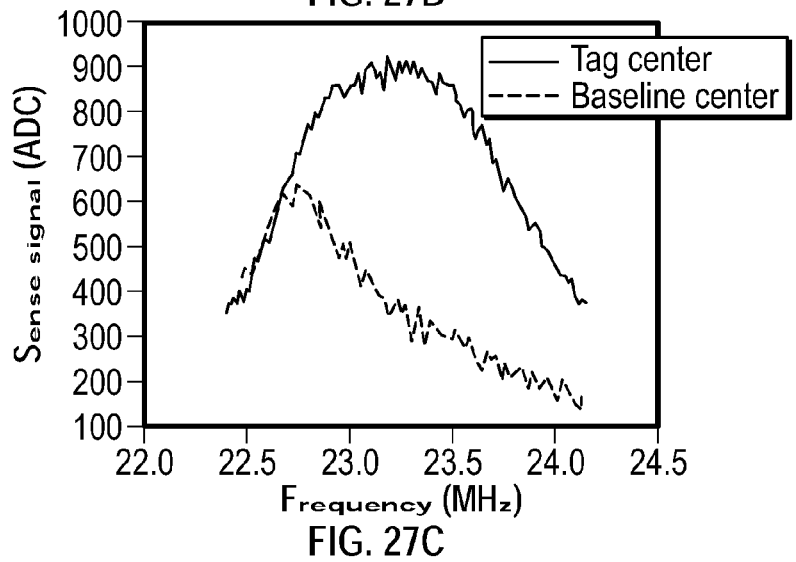

FIGS. 27A-27C compare graphs of the baseline and measurement signals for a simple conductive loop having the configuration generally shown in FIG. 1B and having three sections. FIG. 27A shows the baseline and measurement signals on the center and leftmost sensor elements when a single energizing signal is transmitted from the rightmost sensor element. Increased coupling between the center and rightmost sensor elements due to their proximity to each other increases the amplitudes of the baseline and measurement signals of the center sensor element relative to the amplitudes of the baseline and measurement signals of the leftmost sensor element.

FIG. 27B shows the baseline and measurement signals on the center sensor element when the leftmost and rightmost sensor elements transmit dual energizing signals that are in phase. The response of the center antenna has a much higher amplitude because the loop in enhancing the amount of magnetic coupling to the center sensor element. FIG. 27C shows the baseline and measurement signals on the center sensor element when the leftmost and rightmost sensor elements transmit dual energizing signals that are out-of-phase. As shown in FIG. 27C, although the measurement signal has a much smaller amplitude when compared with the measurement signals of FIGS. 27A and 27B, it is still distinguishable from the baseline signal.

Example 2

Figure 28A:
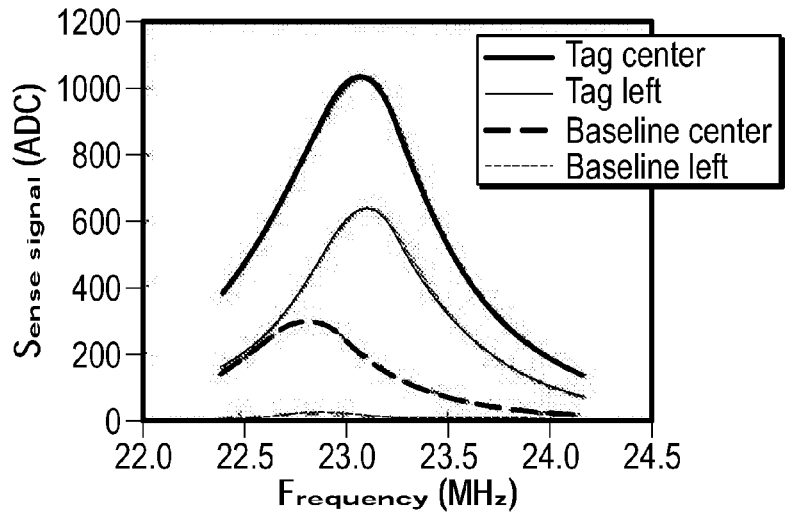
FIGS. 28A-28C compare graphs of the baseline and measurement signals for a conductive loop having the configuration generally shown in FIG. 9A and having three sections where the center section has notches at either side of the center loop section that increase the geometrical similarity between the center loop section and corresponding center sensor element.
Figure 28B:
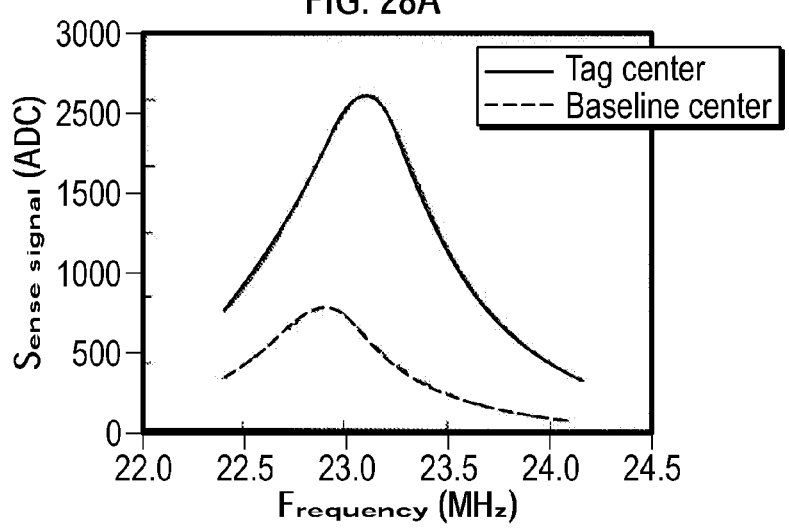
Figure 28C:
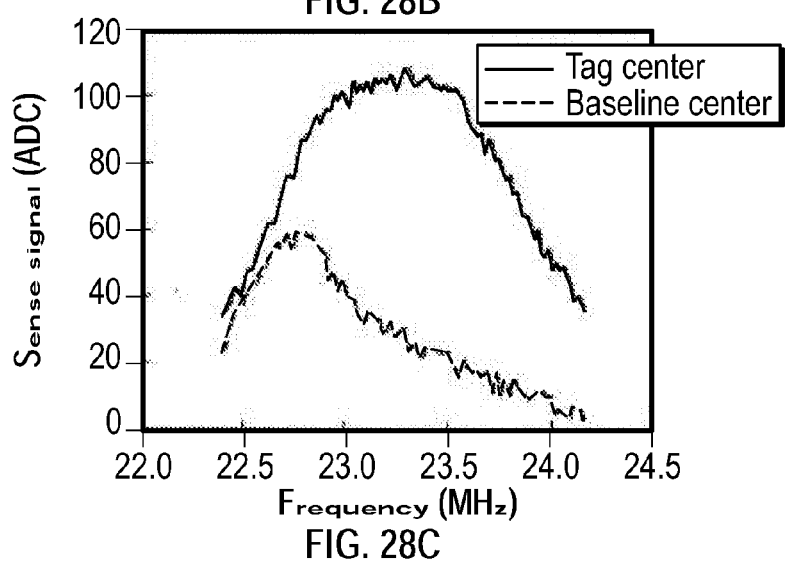

FIGS. 28A-28C compare graphs of the baseline and measurement signals for a conductive loop having the configuration generally shown in FIG. 9A with three sections. In this example, the center section has notches at either side of the center loop section that increase the geometrical similarity between the center loop section and its corresponding center sensor element. FIG. 28A shows the baseline and measurement signals on the center and leftmost sensor elements when a single energizing signal is transmitted from the rightmost sensor element. FIG. 28B shows the baseline and measurement signals on the center sensor element when the leftmost and rightmost sensor elements transmit dual energizing signals that are in phase. FIG. 28C shows the baseline and measurement signals on the center sensor element when the leftmost and rightmost sensor elements transmit dual energizing signals that are out-of-phase. As shown in FIG. 28C, although the measurement signal has a much smaller amplitude when compared with the measurement signals of FIGS. 28A and 28B, it is distinguishable from the baseline signal. The increased geometrical similarity between the center loop section and the center sensor element in this example increases the measurement signals on the center sensor element when compared to the measurement signals of the center sensor element for the simple loop example shown in FIGS. 27A-27C. The geometrical similarity of all of the loops has been increased in this example and for this reason the comparison between FIGS. 27A and 28A shows an increase in amplitude for both the center and leftmost sensor elements by approximately 150 and 100 respectively. The same similarity exists when comparing FIG. 27B and FIG. 28B showing an increase in amplitude of approximately the sum of the single drive values or approximately 250.

Example 3

Figure 29A:
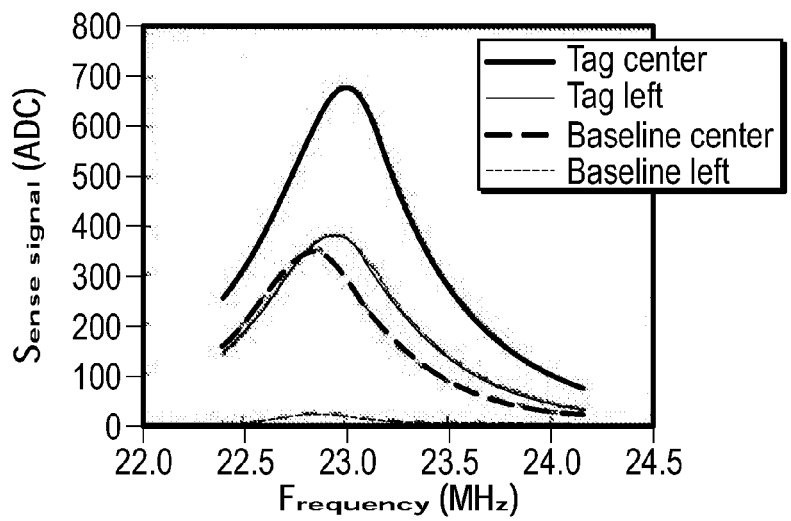
FIGS. 29A-29C compare graphs of the baseline and measurement signals for a conductive loop having the configuration generally shown in FIG. 7A and having three sections with a notch extends across the center loop section, reducing the geometrical similarity between the center loop section and the corresponding center sensor element.
Figure 29B:
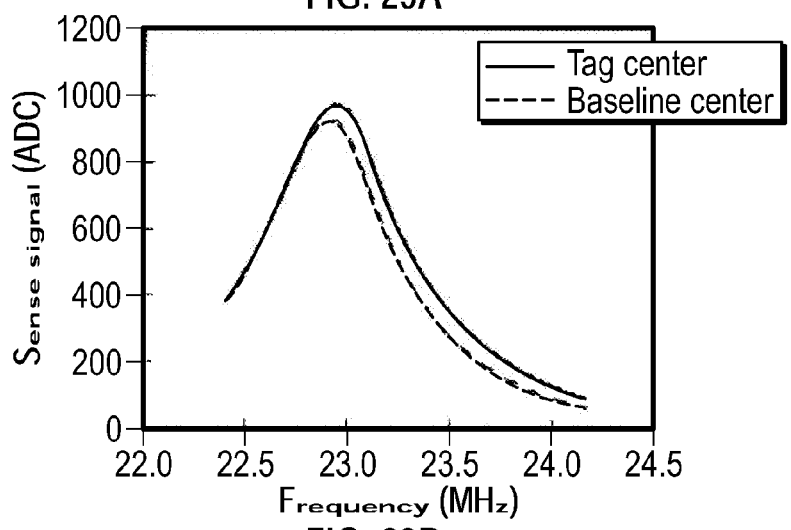
Figure 29C:
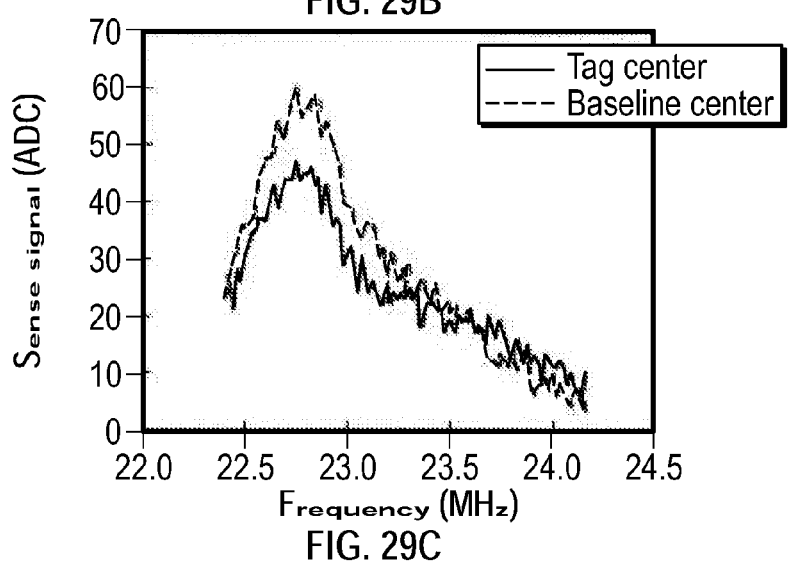

FIGS. 29A-29C compare graphs of the baseline and measurement signals for a conductive loop with the configuration generally shown in FIG. 7A and having three sections with a notch extends across the center loop section, reducing the coupling between the center loop section and the corresponding center sensor element. FIG. 29A shows the baseline and measurement signals on the center and leftmost sensor elements when a single energizing signal is transmitted from the rightmost sensor element. The leftmost sensor had a higher amplitude increase relative to the leftmost sensor baseline signal compared to the signal amplitude increase of the center sensor relative to the center sensor baseline signal.

FIG. 29B shows the baseline and measurement signals on the center sensor element when the leftmost and rightmost sensor elements transmit dual energizing signals that are in phase. FIG. 29C shows the baseline and measurement signals on the center sensor element when the leftmost and rightmost sensor elements transmit dual energizing signals that are out-of-phase. The decreased coupling between the center loop section and the center sensor element results in small, but measurable, amplitude changes of the measurement signals of the center sensor relative to the amplitude of the baseline signals of the center sensor.

Since the leftmost sensor element responds in amplitude and the center sensor element amplitude stays similar to the baseline means a tag with and extended notch or patch of metal has been used to create this signal. The frequency increase for the center sensor element gives some indication that metal has been placed in front of the sensing element. However, the shift is minor so it is not a complete patch of metal, which leads to the determination that this is an extended notch tag.

Example 4

Figure 30A:
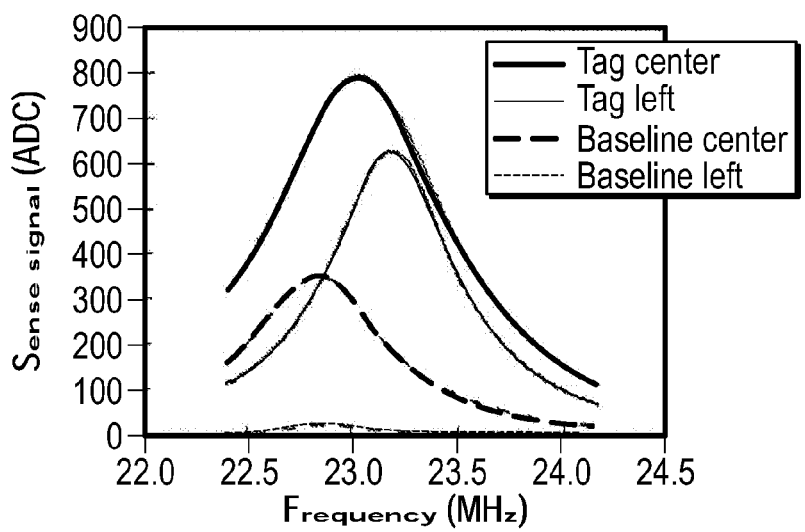
FIGS. 30A-30C compare graphs of the baseline and measurement signals for a conductive loop having the configuration generally shown in FIG. 8A and having three sections with two loop branches that extend across the center loop section, reducing the geometrical similarity between the center loop section and the corresponding center sensor element.
Figure 30B:
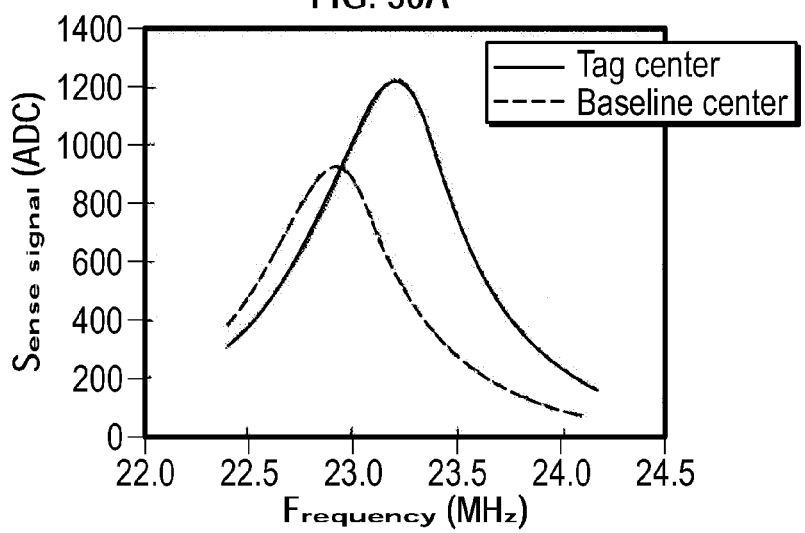
Figure 30C:
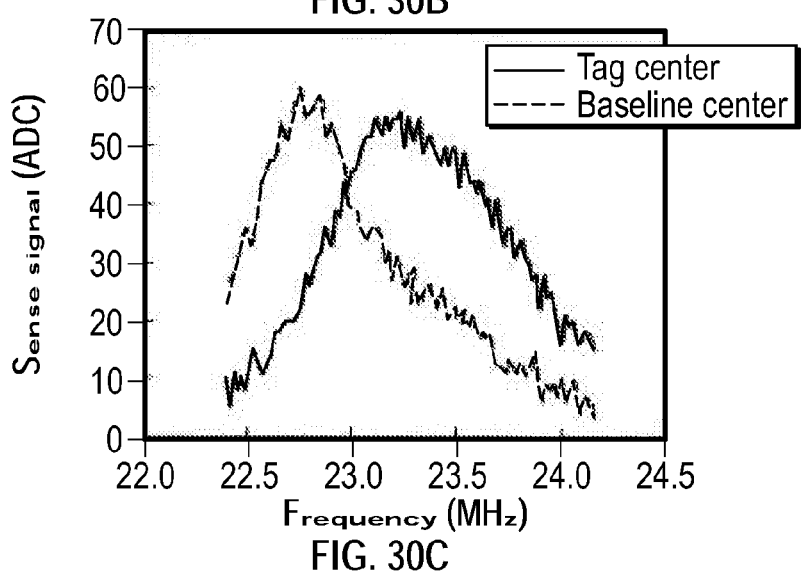

FIGS. 30A-30C compare graphs of the baseline and measurement signals for a conductive loop having the configuration generally shown in FIG. 8A and having three sections with two loop branches that extend across the center loop section. The loop branches reduce the coupling between the center loop section and the corresponding center sensor element compared to the coupling of Example 1. FIG. 30A shows the baseline and measurement signals on the center and leftmost sensor elements when a single energizing signal is transmitted from the rightmost sensor element.

FIG. 30B shows the baseline and measurement signals on the center sensor element when the leftmost and rightmost sensor elements transmit dual energizing signals that are in phase. FIG. 30C shows the baseline and measurement signals on the center sensor element when the leftmost and rightmost sensor elements transmit dual energizing signals that are out-of-phase. The decreased coupling between the center loop section and the center sensor element reduces the amplitude changes of the measurement signals of the center sensor relative to the amplitude of the baseline signals of the center sensor relative to the amplitude changes of Example 1.

For the example of FIGS. 30A-30C the design has similar coupling between the left and right sensor elements as the Example shown in FIG. 29A with the extended notch. However the center element has more than the extended notch. This mid-level center coupling along with a more significant frequency shift is a distinguishing feature that there are dual loops.

Example 5

Figure 31A:
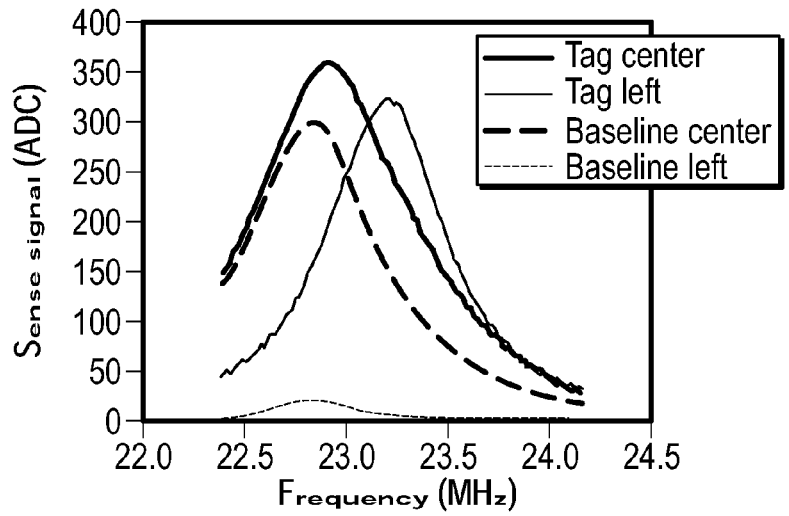
FIGS. 31A-31C compare graphs of the baseline and measurement signals for a conductive loop having the configuration generally shown in FIG. 11 and having three sections with a conductive peninsula that extends across the center loop section, masking the amplitude response of the center loop section.
Figure 31B:
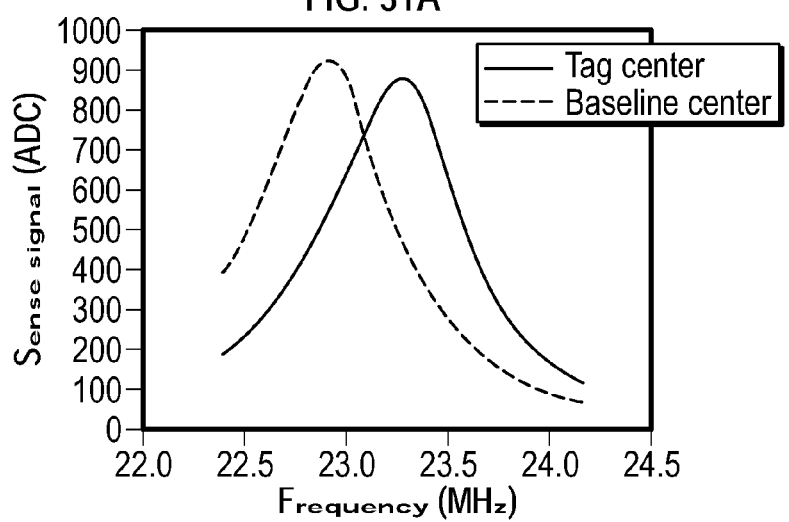
Figure 31C:
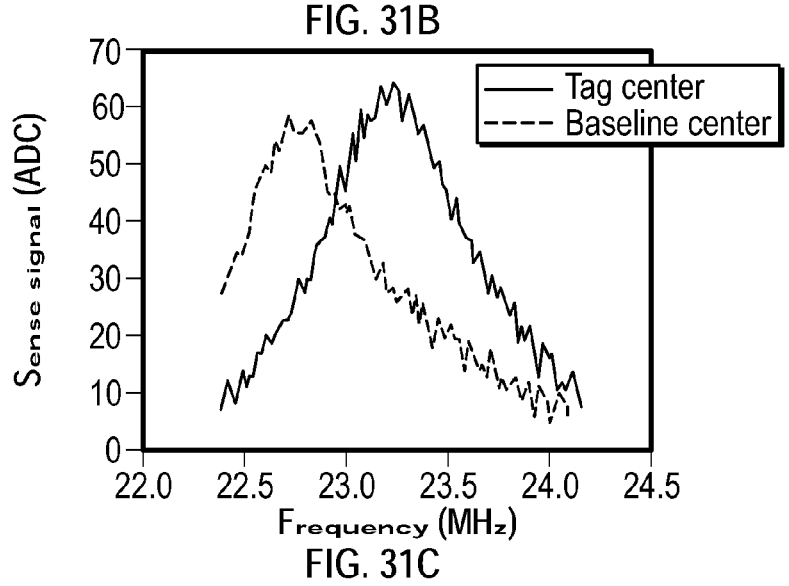

FIGS. 31A-31C compare graphs of the baseline and measurement signals for a conductive loop having the configuration generally shown in FIG. 11 and having three sections. A conductive peninsula extends across the center loop section, masking the amplitude response of the center loop section. FIG. 31A shows the baseline and measurement signals on the center and leftmost sensor elements when a single energizing signal is transmitted from the rightmost sensor element. FIG. 31B shows the baseline and measurement signals on the center sensor element when the leftmost and rightmost sensor elements transmit dual energizing signals that are in phase. FIG. 31C shows the baseline and measurement signals on the center sensor element when the leftmost and rightmost sensor elements transmit dual energizing signals that are out-of-phase.

In this example, the conductive peninsula of the center loop section causes a smaller amplitude change of the center sensor compared to the baseline of the center sensor relative to the amplitude change of the leftmost sensor relative to the baseline of the leftmost sensor. In addition, the conductive peninsula shifts the frequency having the maximum amplitude on the measured signal of the center sensor higher compared to the baseline of the center sensor. The conductive peninsula causes a significant frequency shift to occur on the center sensor element while keeping the coupling to be nearly unchanged from the baseline.

Example 6

Figure 32A:
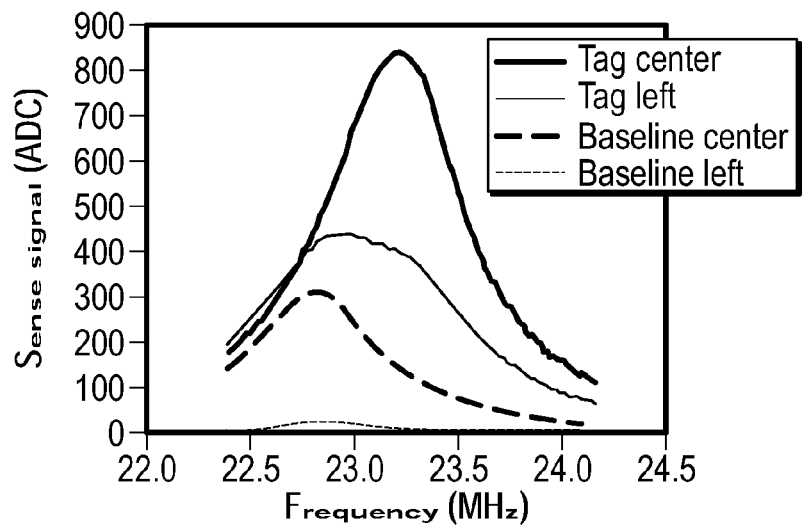
FIGS. 32A-32C compare graphs of the baseline and measurement signals for a conductive loop having the configuration generally shown in FIG. 12 and having three sections with a conductive island that extends across the center loop section, masking the amplitude response of the center loop section.
Figure 32B:
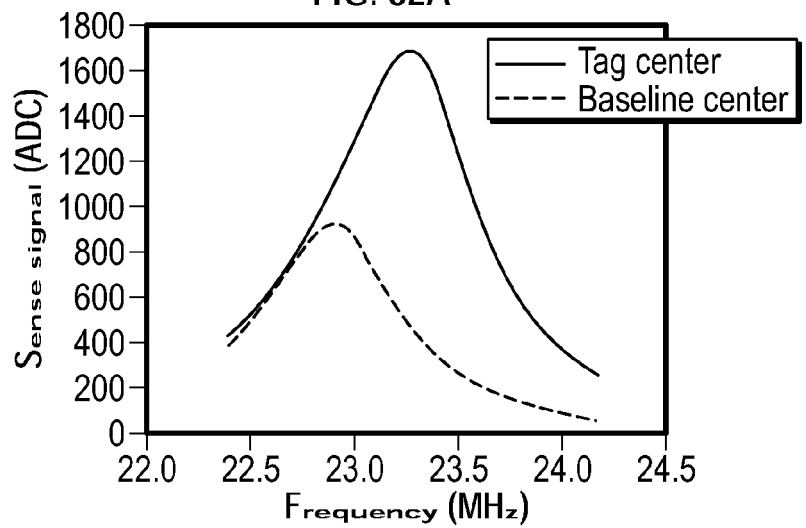
Figure 32C:
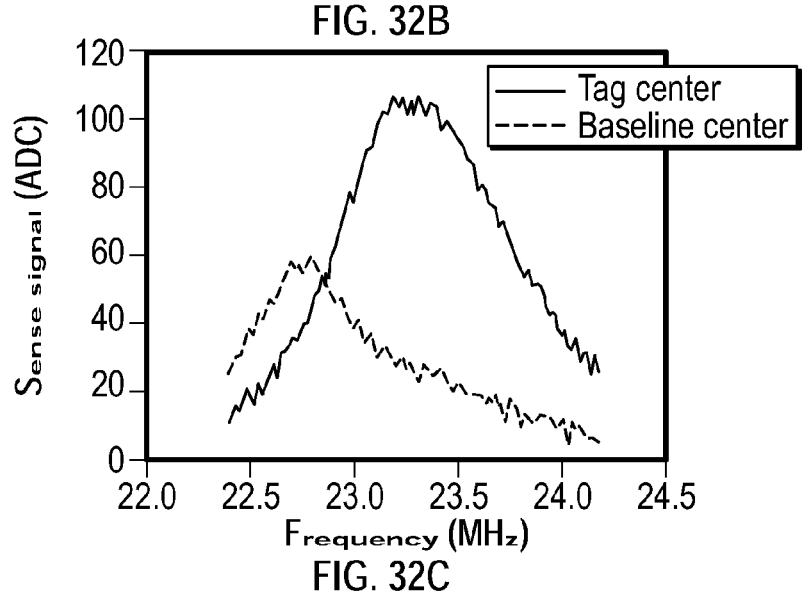

FIGS. 32A-32C compare graphs of the baseline and measurement signals for a conductive loop having the configuration generally shown in FIG. 12 and having three sections. A conductive island extends across the center loop section, modifying the amplitude response of the center loop section. FIG. 32A shows the baseline and measurement signals on the center and leftmost sensor elements when a single energizing signal is transmitted from the rightmost sensor element. FIG. 32B shows the baseline and measurement signals on the center sensor element when the leftmost and rightmost sensor elements transmit dual energizing signals that are in phase. FIG. 32C shows the baseline and measurement signals on the center sensor element when the leftmost and rightmost sensor elements transmit dual energizing signals that are out-of-phase. These graphs show a similar, but moderately smaller, change in the signal amplitudes compared the graphs of Example 1. Compared to Example 1, the shift of the frequency at maximum amplitude is larger for the center measured signal relative to the baseline signal.

In this example, the conductive island decreases the amplitude slightly when compared to a loop with no island. Additionally, the conductive island causes the frequency to shift by approximately the same amount as the peninsula feature shown in FIG. 31. In this example, the amplitude response of the center sensor element is distinguishably greater than the amplitude response of the center sensor element of the dual loop feature.

Example 7

Figure 33A:
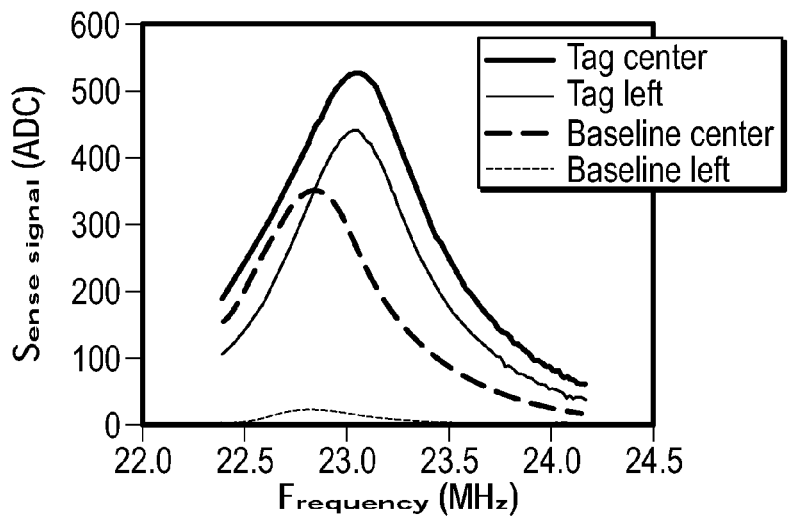
FIGS. 33A-33C compare graphs of the baseline and measurement signals for a conductive loop having the configuration generally shown in FIG. 6A and having three sections with cross over between the rightmost and center loop sections.
Figure 33B:
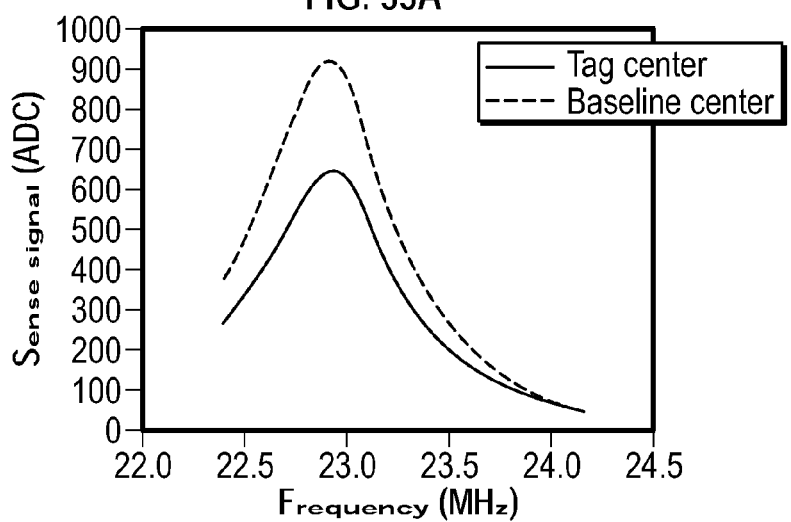
Figure 33C:
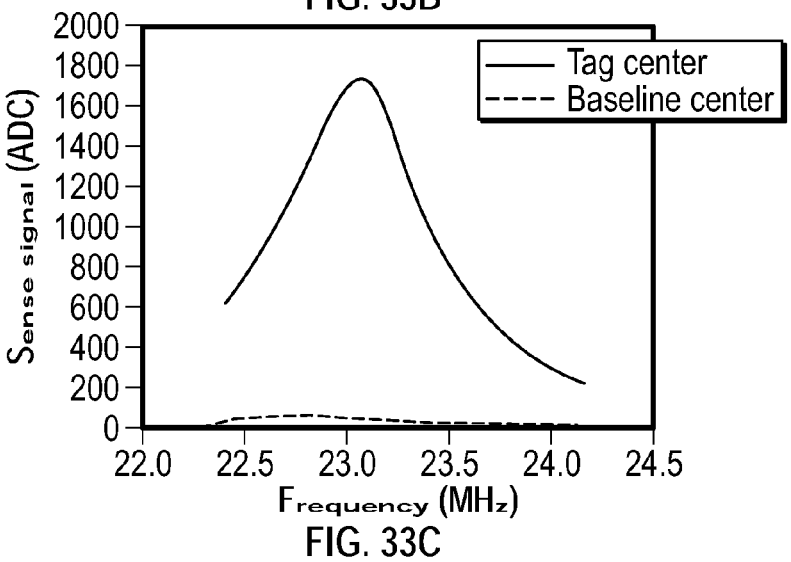

FIGS. 33A-33C compare graphs of the baseline and measurement signals for a conductive loop having the configuration generally shown in FIG. 6A and having three sections with a cross over between the leftmost and center loop sections. FIG. 33A shows the baseline and measurement signals on the center and leftmost sensor elements when a single energizing signal is transmitted from the rightmost sensor element. FIG. 33B shows the baseline and measurement signals on the center sensor element when the leftmost and rightmost sensor elements transmit dual energizing signals that are in phase. The cross over causes the measured signal amplitude on the center sensor to be lower than the baseline. FIG. 33C shows the baseline and measurement signals on the center sensor element when the leftmost and rightmost sensor elements transmit dual energizing signals that are out-of-phase.

With respect to the transmitted signal for a single drive configuration, the phase of the received signal on the center sensor element is in phase with respect to the transmitted signal and the leftmost sensor element is 180 degrees out of phase. For dual drive and in phase the resulting phase on the center sensor element is the same as the transmitted signal but the net current in the loop is minimal as both transmitters are close to offsetting each other. For dual drive out of phase the resulting phase on the center sensor element is in phase with respect to the rightmost (original single drive) transmitter element. If the crossover were moved to be between the rightmost and the center then the resulting phase for this would be 180 degrees out of phase with respect to the rightmost transmit signal.

Example 8

Figure 34A:
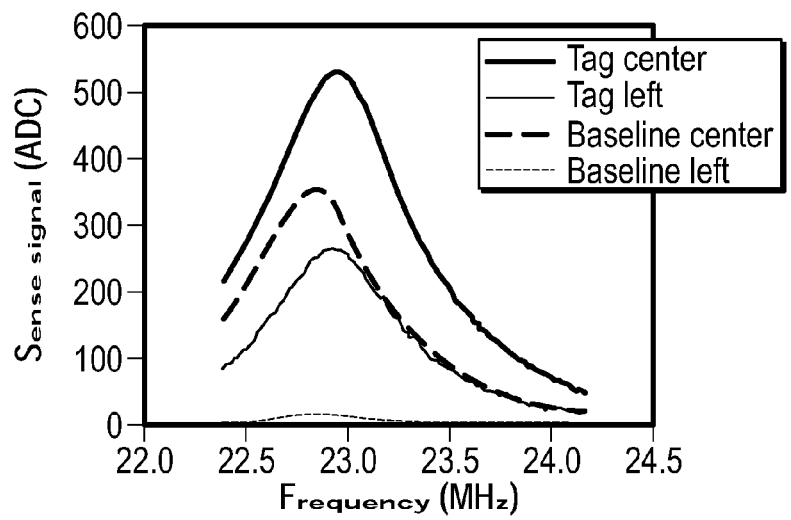
FIGS. 34A-34C compare graphs of the baseline and measurement signals for a conductive loop having the configuration generally shown in FIG. 6A and having three sections with a first cross over between the rightmost loop section and the center loop section and a second cross over between the center loop section and the leftmost loop section.
Figure 34B:
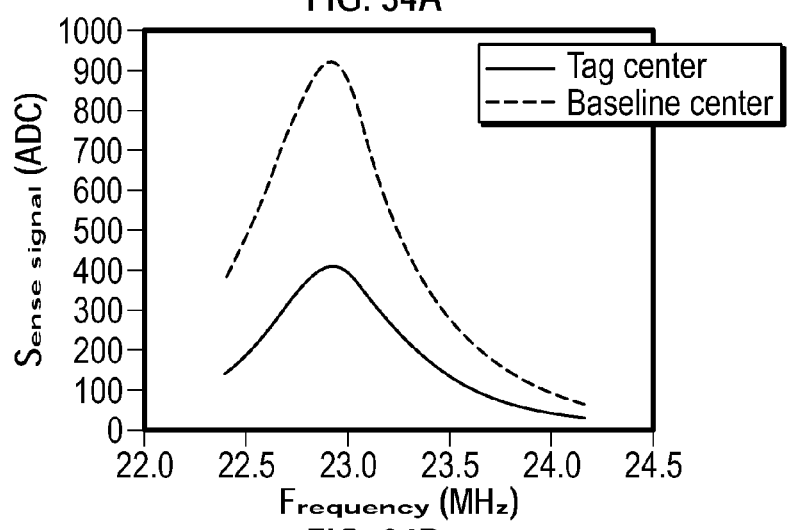
Figure 34C:
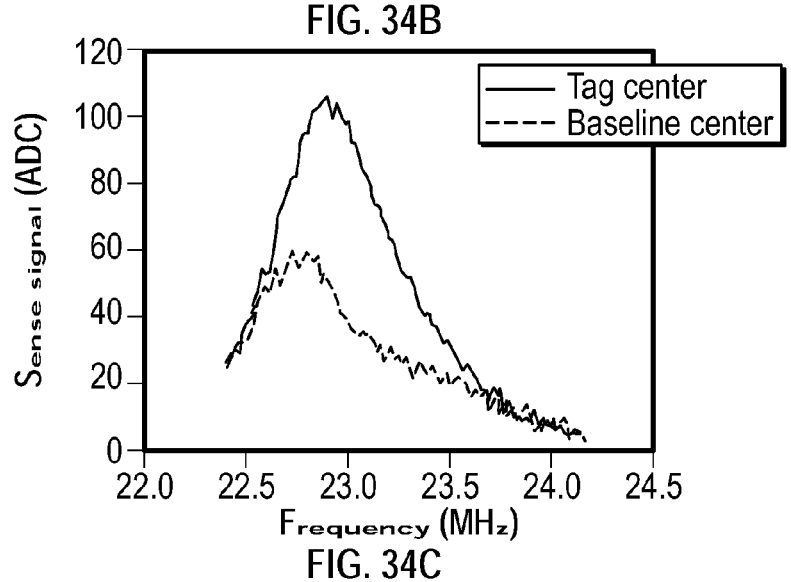

FIGS. 34A-34C compare graphs of the baseline and measurement signals for a conductive loop having the configuration generally shown in FIG. 6A and having three sections with a first cross over between the rightmost loop section and the center loop section and a second cross over between the center loop section and the leftmost loop section. FIG. 34A shows the baseline and measurement signals on the center and leftmost sensor elements when a single energizing signal is transmitted from the rightmost sensor element. FIG. 34B shows the baseline and measurement signals on the center sensor element when the leftmost and rightmost sensor elements transmit dual energizing signals that are in phase. FIG. 34C shows the baseline and measurement signals on the center sensor element when the leftmost and rightmost sensor elements transmit dual energizing signals that are out-of-phase.

For the single transmitter sensor element situation case, the received phase of the center is 180 degrees out of phase with respect to the transmitted signal. However, the leftmost sensor element is in phase with the transmitted signal. For the dual drive in phase the resulting signal on the center sensor element is 180 out of phase with respect to the transmitted signal. The dual drive out of phase situation would ideally be a net zero coupling for the two transmitters. However, practically one of the two transmitters will end up with minimally higher coupling and be the deciding phase value Parameters associated with the capacity of a treatment media can be monitored by detecting properties of an electromagnetic signal that interacts with the treatment media. In some embodiments, a reader that reads the code of a closed conductive loop of a treatment cartridge as described above and a capacity sensor that senses parameters related to the capacity of the treatment media of the treatment cartridge may operate as separate entities with separate components. Additional details regarding capacity monitoring sensors for treatment media and capacity monitoring systems are described in commonly owned U.S. Patent Application Ser. 62/205,481, U.S. Patent Application Ser. 62/205,502, and U.S. Patent Application Ser. 62/205,517, each of which was filed on Aug. 14, 2015 and is incorporated herein by reference. Additional details regarding capacity monitoring sensors for treatment media and capacity monitoring systems are described in commonly owned U.S. Patent Application Ser. 62/263,431, U.S. Patent Application Ser. 62/263,439, and U.S. Patent Application Ser. 62/263,441, each of which was filed on Dec. 4, 2015 and is incorporated herein by reference.

In other embodiments, the reader described above and a capacity sensor may share at least some components. For example, one or more of the sensor elements of the reader may provide and/or sense an electromagnetic field for monitoring the capacity of treatment media. Additionally, or alternatively, the reader circuitry, e.g., transceivers and/or a controller may provide functionality for the capacity sensor. For example, in a first mode, one or more of the sensor elements and the reader circuity may operate to detect the presence of the cartridge and to read the code of the detection member to detect, authenticate, classify, and/or identify the treatment cartridge as described above. In a second mode, one or more of the sensor elements and/or the reader circuitry may operate as part of a capacity sensor that detects and/or monitors over time one or more parameters of treatment media.

A combined reader/capacity sensor associated with a treatment cartridge can be configured to detect, authenticate, classify and/or identify the treatment cartridge based on the code of the detection member. For example, the reader may detect the presence of a treatment cartridge including verifying proper insertion of the cartridge. The reader may determine the type cartridge based on the code of the detection member. The reader may authenticate that the type of cartridge is compatible with the host system in which it is installed based on the code and/or information stored in the reader circuitry. In some implementations, the code of the detection member may be an identification code and reader may identify the cartridge based on the code. The reader may classify the cartridge based on the detected code, including classifying the treatment cartridge with regard to the designed maximum volume to be treated, flow rate, pressure drop, treatment media type, housing type, etc. The identification and/or classification of the treatment cartridge and/or treatment media within the cartridge can assist in ensuring proper configuration of the filtration and improvement of the filtration process. The identification and/or classification of the treatment cartridge and/or treatment media may also facilitate accurate capacity monitoring of the treatment media.

The reader/capacity sensor generates an electromagnetic field for actively monitoring the capacity of a treatment media contained within the housing. For example, the reader/capacity sensor may produce a magnetic field that propagates through the nonconductive treatment housing into the treatment media and is sensed by field sensor of the reader/capacity sensor.

In some embodiments the circuitry of the reader/capacity sensor determines the remaining capacity of the treatment media by periodically generating an incident magnetic field into the treatment media and measuring any change in one or more properties of the magnetic field caused by the changes in one or more characteristics (e.g., conductivity, dielectric strength, magnetic permeability, or the like) of the treatment media over time as fluid flows through the treatment media. In general, treatment capacity or efficacy refers to the remaining capability of the treatment media to remove filtrate from the untreated fluid. The term remaining treatment capacity or current capacity may be used to express the treatment capacity at a point in time or at the time of a measurement. Treatment capacity may be expressed in volume, time, percent of initial, mass, or number of particles or other units.

Moreover, in addition (or in the alternative) to directly measuring treatment capacity by monitoring the conductivity, dielectric, or permeability change of the treatment media, the treatment capacity can also be determined by measuring the change in conductivity, dielectric, or permeability of a surrogate material connected to the same fluid flow. The treatment capacity can then be calculated based on a known relationship by a measured conductivity, dielectric, or permeability change of the surrogate material and the conductivity, dielectric, or permeability change of the treatment media. The surrogate material can comprise of the same treatment media, different treatment media, non-treatment media material, or any combination and could have a different form factor. One or more surrogate materials can be connected in series or in parallel. The surrogate material could provide a filtration function or no filtration function. Several advantages of utilizing a surrogate material could be a surrogate material has a higher sensitivity, lower sensitivity, enables a simpler system, improved stability, and is reusable.

Figure 35A:
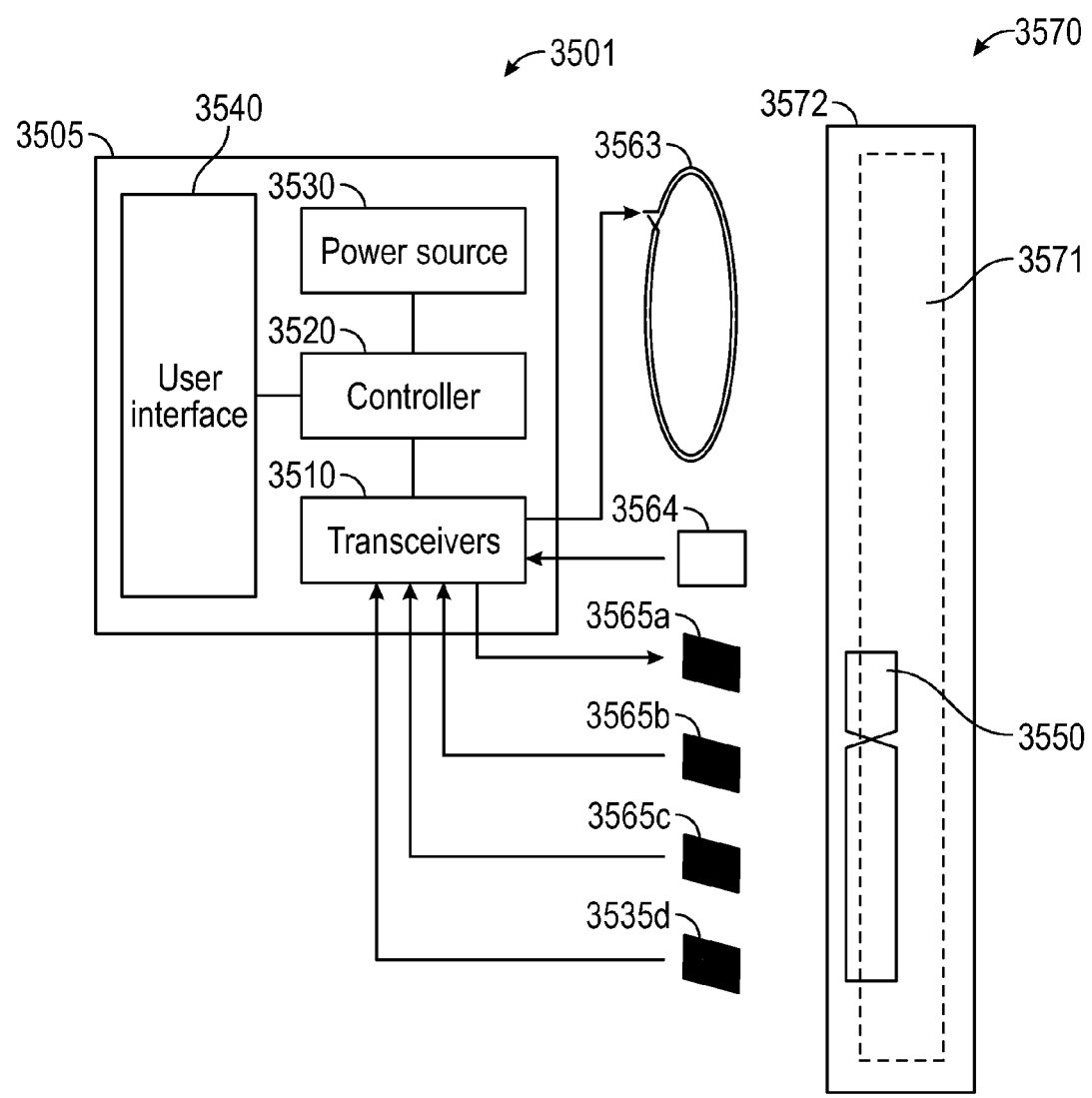
FIG. 35A is a block diagram illustrating a reader/capacity sensor in accordance with some embodiments.
Figure 35B:
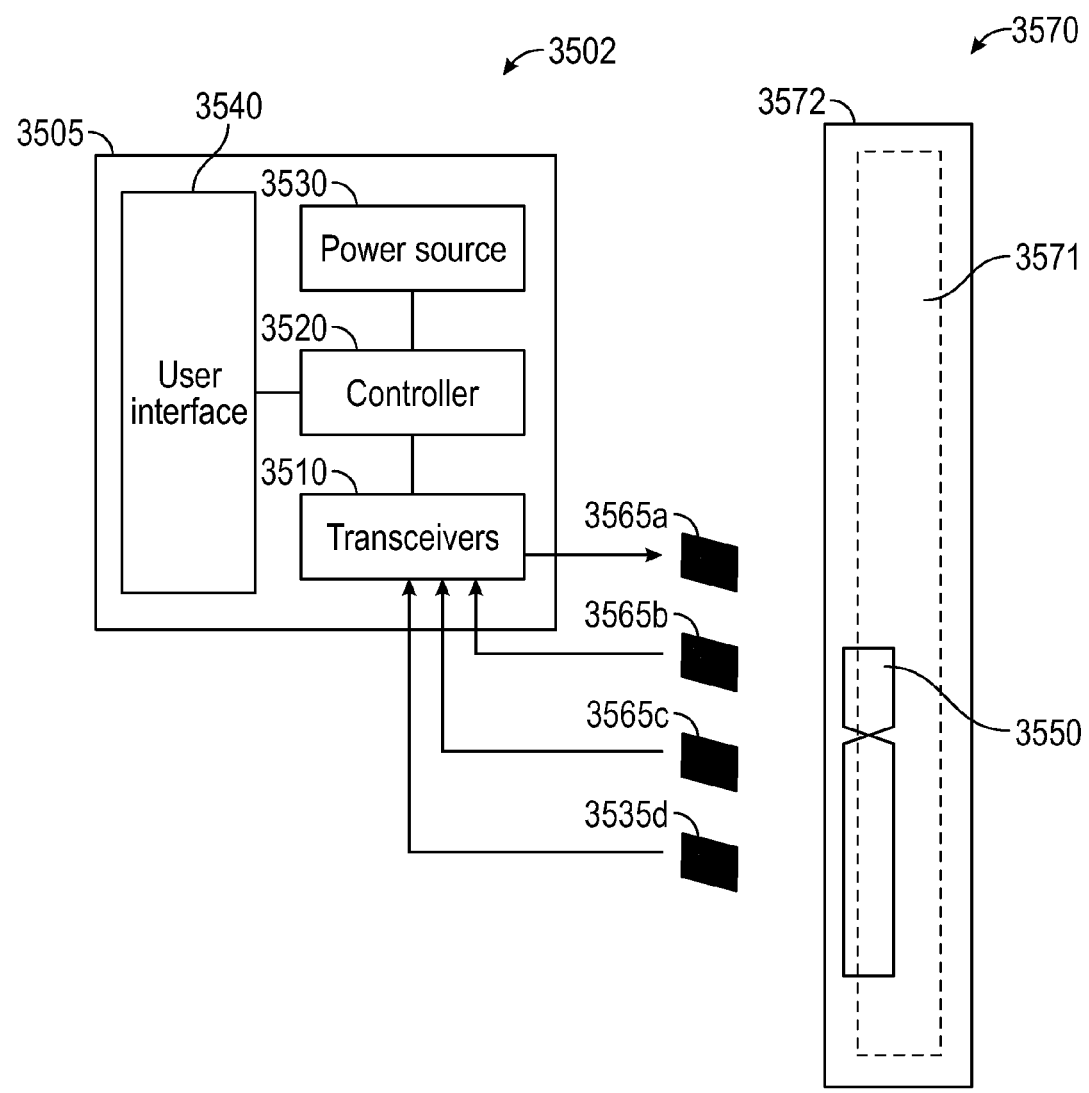
FIG. 35B is a block diagram illustrating a reader/capacity sensor where the sensor elements shared between capacity sensing and reading the code of the closed conductive loop in accordance with some embodiments.

FIG. 35A is a block diagram of a reader/capacity sensor 3501 having shared circuitry and separate capacity sensing and closed loop code reading sensor components in accordance with some embodiments. FIG. 35B is a block diagram that illustrates a reader/capacity sensor 3502 having shared reader/capacity sensing circuitry and wherein the antenna and field sensor for capacity sensing are also used as sensor elements for the closed loop code reader. In other embodiments, the antenna of the capacity sensor is a separate from the code reader sensor elements and the capacity sensing field sensor is also serves as a code reading sensor element. In other embodiments, the field sensor of the capacity sensor is a separate from the code reader sensor elements and the capacity sensing antenna also serves as a code reading sensor element. Additionally, in some embodiments, components of the code reader sensor elements, capacity sensing antenna, and capacity sensing field sensor may be shared while the circuitry coupled to these elements is separate.

FIG. 35A is a block diagram of a reader/capacity sensor 3501 in accordance with some embodiments. The reader/capacity sensor 3501 includes reader/capacity sensor circuitry 3505, a capacity sensing antenna 3563, a capacity sensing field sensor 3564, and closed loop code sensor elements 3565a-d. In this implementation, the sensor elements 3565a-d that detect the code of the closed conductive loop 3550 are separate from the antenna 3563 and field sensor 3564 used to detect the capacity of the treatment media. The reader/capacity sensor 3501 is shown next to a treatment cartridge 3570. The housing 3572 of the treatment cartridge 3570 is non-conductive, e.g., plastic, glass, porcelain, rubber, and contains treatment media 3571 for the filtration of liquids or gases.

The capacity sensor antenna 3563, capacity sensor field sensor 3564 and the sensor elements 3565a-d of the reader/capacity sensor are electrically coupled to transceiver circuitry 3510 of the reader/capacity sensor. For capacity sensing, an internal power source 3530, such as a battery, and transceiver 3510 of reader/capacity sensor generate an alternating electrical current, e.g., RF signal, through the antenna 3563 so as to produce an electromagnetic field within the treatment media. In general, the electromagnetic field propagates through at least a portion of the treatment media 3571 contained within treatment housing 3570. Examples of a suitable antenna 3563 for capacity sensing include a single turn inductor, a multi-turn inductor, a two-dimensional conductive loop, a conductive loop with three dimensional features, and a capacitive element. The antenna 3563 may be non-resonant, resonant, or self-resonant. Examples of controller 3520 include an embedded microcontroller, an Application Specific Integrated Circuit (ASIC), a field programmable gate array (FPGA), a digital signal processor (DSP), a general purposes embedded microprocessor, a logic gate, or the like, or combinations thereof.

Responsive to commands from controller 3520, the transceiver 3510 may, for example, generate an RF signal as one or more sinusoidal waves, a square wave, a discontinuous signal or the like. Transceiver 3510 may, as described herein, control a shape, phase, e.g., phase shift, and/or an amplitude of the electromagnetic signal.

As described herein, the treatment media 3571 within housing 3570 interacts with the electromagnetic field produced by the antenna 3563. For example, the electromagnetic field may interact with the treatment media to induce eddy currents within the treatment media 3571. Creation of the field eddy currents in turn operate to reduce a strength of the electromagnetic field produced by the antenna 3563. The field sensor 3564 and controller 3520 monitor characteristics of the electromagnetic field produced by the antenna 3563, and, based on those characteristics, the controller 3520 determines qualities (strength, amplitude, phase, etc.) of the electromagnetic field that are associated with properties of the antenna 3563. The controller 3520 may determine properties of the antenna 3563 that are related to interaction between the treatment media and the electromagnetic field. Example properties of the antenna 3563 that may be influenced by the interaction between the treatment media and the electromagnetic field so as to be detected by the field sensor 3564 and controller 3520 include inductance, capacitance, reactance, impedance, equivalent series resistance, equivalent parallel resistance, quality factor, and resonant frequency of the antenna 3563.

By monitoring changes in certain qualities of the electromagnetic field that are related to properties of the antenna 3563 and are influenced by the interaction between the treatment media 3571 and the electromagnetic field, the controller 3520 detects changes in characteristics of the contained treatment media that relate to treatment media capacity. The material property of the treatment media may be, for example, electrical conductivity, magnetic permeability, magnetic loss tangent, magnetic coercivity, magnetic saturation, dielectric constant, dielectric loss tangent, or dielectric strength of the treatment media.

In some example implementations controller 3520 is configured to direct transceiver 3510 to sweep the excitation frequency of antenna 3563 to measure the frequency response of the antenna. The frequency sweep may be executed as controllable discrete linear steps, log steps, or other. The size of the steps is one factor in determining sensor frequency resolution and measurement refresh rate. For a 1 MHz sweep range with 1 KHz linear steps and each step consuming 100 us, the total sweep time would be 1000*100 us=100 ms. For the same system with 10 kHz steps, the total sweep time would be 100*100 us=10 ms. The decreased sweep time with 10 kHz steps will decrease the frequency resolution of the measurement. In some examples, signal processing methods such as interpolation and regression may be used to increase the frequency resolution of the measurement.

In some applications, the measured signal may be small resulting in a noisy measurement. One method to increase the signal strength is to control the amplitude of the generated signal. In one example, the amplitude of signal is increased to fully utilize the dynamic range of the detection circuit.

In one example, the quality-factor of a resonant antenna can be monitored by a ring-down method. This method includes exciting the resonant antenna, removing the excitation source, and measuring the signal of the resonant antenna as the signal decays. The decay rate is inversely proportional to the quality factor. In this example, controlling or having knowledge of the phase, may allow the excitation to be terminated at zero-current and minimize switching spikes caused by the excitation.

In the example of FIG. 35A, transceiver 3510 interfaces with a field sensor 3564, e.g., receiving antenna, to measure properties of the electromagnetic field generated by antenna 3563. In one example, field sensor 3564 is an inductance-to-digital converter that operates in closed-loop fashion with transceiver 3510 to monitor the energy dissipated by antenna 3563 and output a digital value indicative of a magnitude of the electromagnetic field currently being produced by the antenna 3563. The field sensor 3564 may output one or more signals indicative of a variety of properties of antenna 3563 when being driven to create the electromagnetic field, such as inductance, capacitance, resonant frequency, quality factor, equivalent series resistance, or equivalent parallel resistance. In some examples, field sensor 3564 and transceiver 3510 may be implemented in a common integrated circuit or component, such as an LDC1000 available from Texas Instruments™ of Dallas, Tex. Based on the output of field sensor 2464 and transceiver 3510 as described herein, controller 3520 computes parameters indicative of characteristics of the conductivity, dielectric strength, magnetic permeability, or the like of treatment media 3571.

The controller 3520 operates user interface 3540 to display or transmit indicators representative of treatment media 3571 conductivity, dielectric strength, magnetic permeability, or the like. In some examples, user interface 3540 may include, for example, a plurality of lights such as, for example, light emitting diodes, incandescent bulbs, or the like. In other examples, user interface may include, for example, a graphical interface, a touch screen, or the like. In some examples, the indicator lights correspond to the lifetime or capacity of the treatment media based upon the treatment media 3571 conductivity, dielectric strength, magnetic permeability, or the like. In some examples, user interface 3540 may be configured to transmit signals via a radio transmitter. In some examples, the radio transmitter signals include the determined characteristics of treatment media 3571, such as remaining capacity, by radio frequency communication, wireless local area network (WLAN) connection, or the like. In other examples, user interface 3540 may transmit raw treatment media data, such as conductivity, dielectric strength, magnetic permeability, or the like for remote analysis.

In one example, the controller 3520 comprises of at least one of the following components: read-only memory (ROM), random-access memory (RAM), processor, analog peripheral, and digital peripheral. In some instances, the controller may be an integrated circuit (IC), such as an application specific integrated circuit (ASIC), field programmable logic array (FPGA), embedded microcontroller, embedded microprocessor, or logic gate. In other instances, the controller can be an amalgamation of several circuits or several integrated circuits interacting together with inputs and outputs. This controller utilizes its components to form decisions and measurements of the present treatment capacity. These decisions can be made via signal processing techniques, algorithms, and/or data management. Measurements can be either analog measurements from at least one analog to digital converter (ADC), digital measurements from at least one digital interface, or wireless measurement from at least one wireless interface.

In some instances, the controller 3520 provides provide feedback to the user regarding the state of the treatment media 3571. One feedback mechanism is digital communication. This form of communication could be but is not limited to unidirectional or bidirectional data flow between the controller 3520 and an external entity that is capable of the digital communication. An example of unidirectional digital communication is universal asynchronous receiver/transmitter (UART), where only one data line connects the controller of the sensor to external entity capable of receiving UART communication. A few examples of bidirectional digital communication from the controller of the sensor could be serial peripheral interface (SPI), inter-integrated circuit (I2C), or UART communication. The digital communication can pass data from the sensor controller by sending raw measurement data or processed information. There are advantages to both data exchanges, as refined information can be sent more quickly, whereas raw measurement data can be sent to another entity for processing.

In some instances, the controller 3520 provides feedback to an entity that does not accept digital or wireless communication. One of such other feedback mechanisms is through analog communication. This form of communication may be but is not limited to at least one digital to analog converter (DAC) output. In some instances, using an analog output can be easier and simpler to transfer data or information from the sensor controller. When a DAC output is synchronized by a time base for periodic sampling intervals, one can transfer data as an analog signal. Analog signals may be but are not limited to sinusoids, square waves, triangle waves, saw tooth waves, and direct current (DC) level signals.

In some examples, a wired connection is not desired or possible for communication. In such instances, a wireless communication network can be implemented. A wireless communication network may include at least one sensor controller, and can be interfaced to a user interface (UI) entity, other processing entity, or other sensor controller. This form of communication may be but is not limited to at least one Wi-Fi network, Bluetooth connection, or ZigBee network. Communication can be unidirectional or bidirectional. The hardware of the communication may modulate the data transfer in a particular scheme such as frequency shift keying (FSK). When the controller needs to release data or information, it can send it over a wireless channel to another entity for read out or processing.

In many instances, the reader/capacity sensor is configured to alert or alarm the user. Such events, such as the present treatment capacity reaching a certain threshold, may be communicated to the user through visible, audible, or physical methods. Such examples of an alert system include but are not limited to a DAC output, a function generator, a display, a speaker, a buzzer, or a haptic feedback mechanism. These user interfaces can be in communication with the sensor controller via analog, digital, or wireless communication.

In general, the forms of communication described above (digital, analog, and wireless), typically utilize a time based protocol generated by at least one timer circuit in the controller to maintain proper timing between data transfer sampling or signal clocking. A timer circuit could be a software timer inside of the controller, an analog circuit with time constants from charging/discharging, a software- or hardware-defined counter, or a clock signal from a communication channel. The time based protocol may also allow for the periodic sampling of the sensor to obtain measurements regarding the treatment media.

FIG. 35B depicts a reader/capacity sensor 3502 in which the sensor elements of the reader 3565a-d also serve as the antenna and field sensor for capacity sensing. In this embodiment, the reader/capacity sensor 3502, comprising sensor elements 3565a-d and reader circuitry 3505 read the code of the detection member 3550, e.g., at the time of installation of the cartridge. After the code has been read by the reader/capacity sensor, at least a first sensor element is used as the antenna of the capacity sensor and at least another second sensor element is used as the field sensor of the capacity sensor.

Figure 36A:
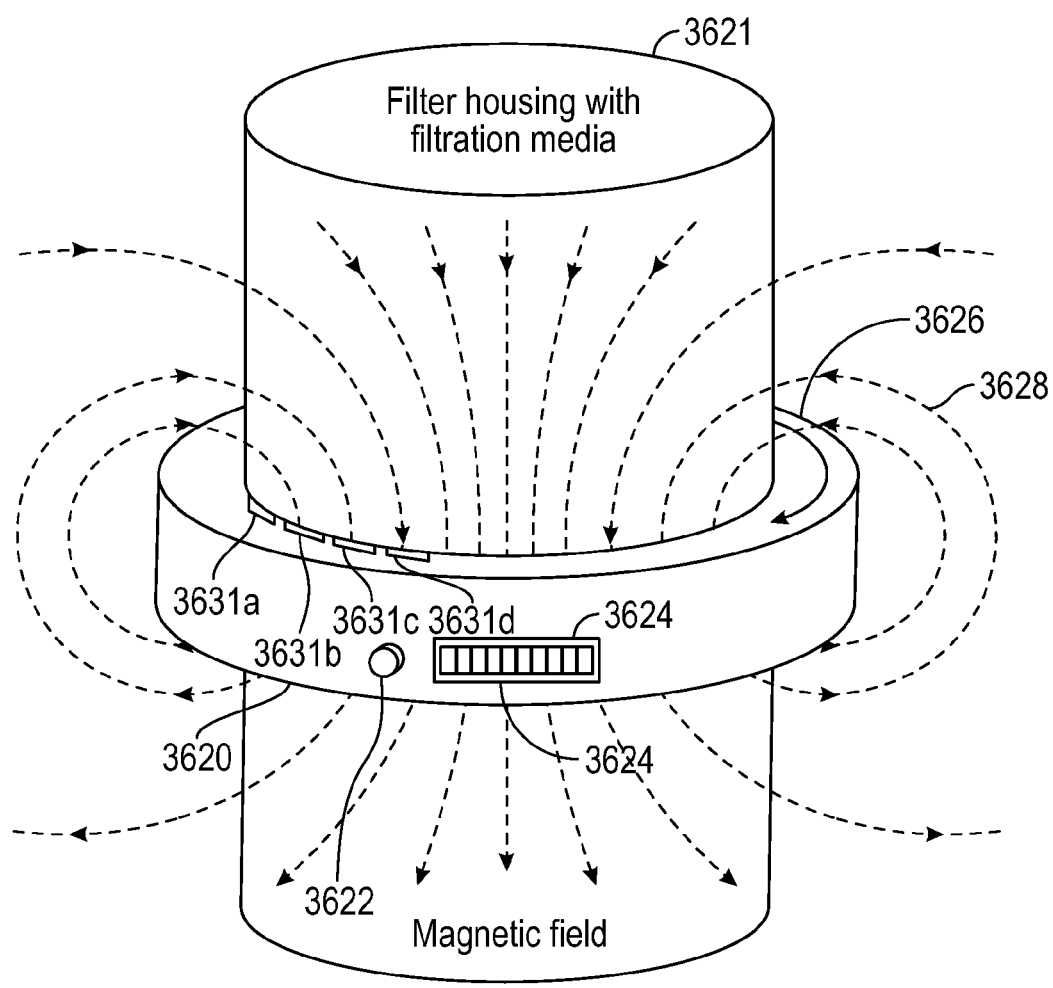
FIGS. 36A and 36B are a diagrams illustrating in further detail an example implementation of a reader/capacity sensor coupled to an example treatment housing in accordance with some embodiments.
Figure 36B:
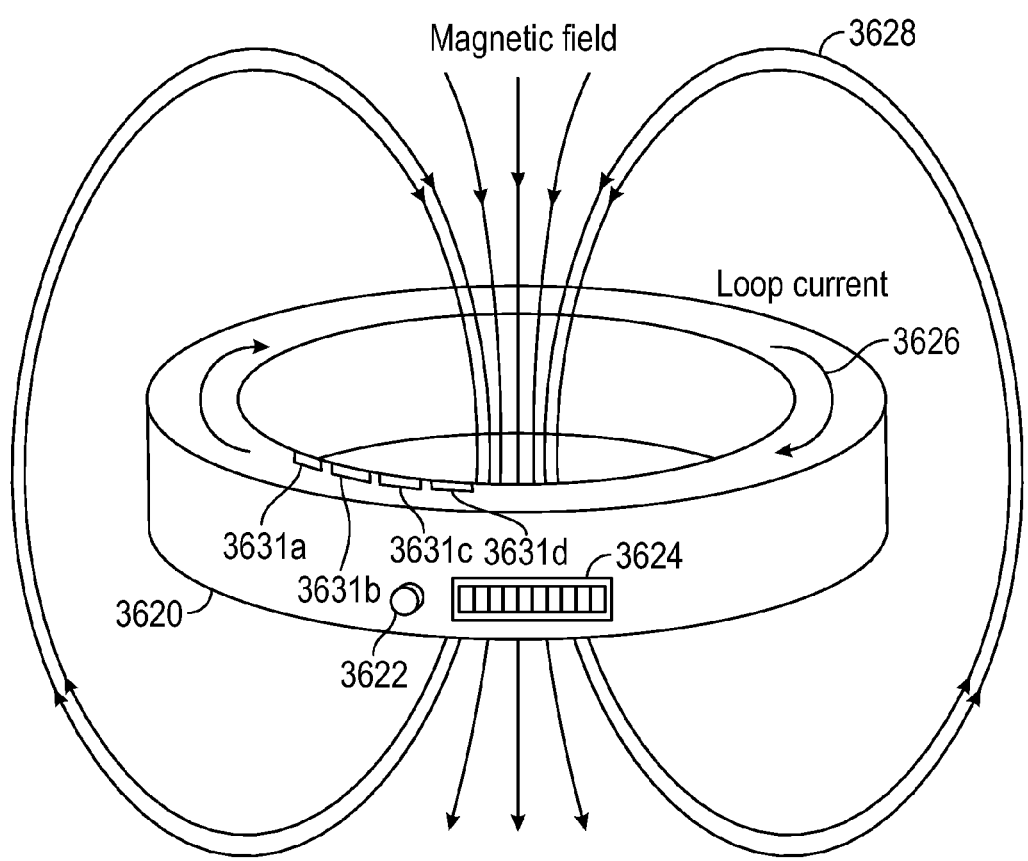
Figure 37A:
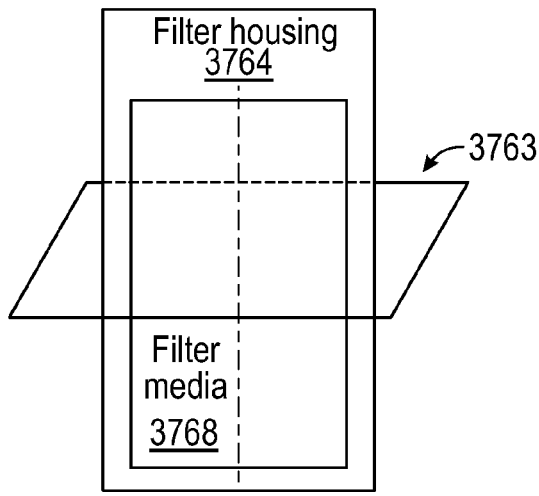
FIGS. 37A-37K are diagrams illustrating relative positions and orientations between a capacity sensing antenna and treatment media in accordance with various embodiments of a combined reader/capacity sensor in accordance with some embodiments.
Figure 37B:
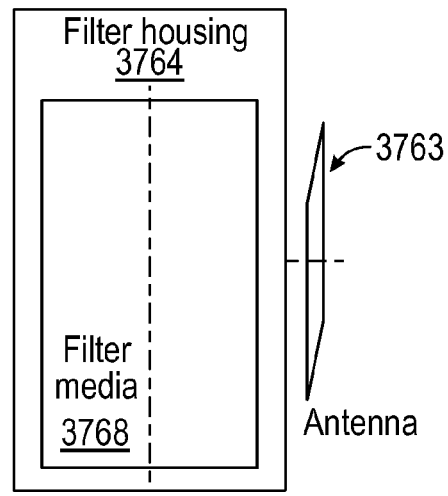
Figure 37C:
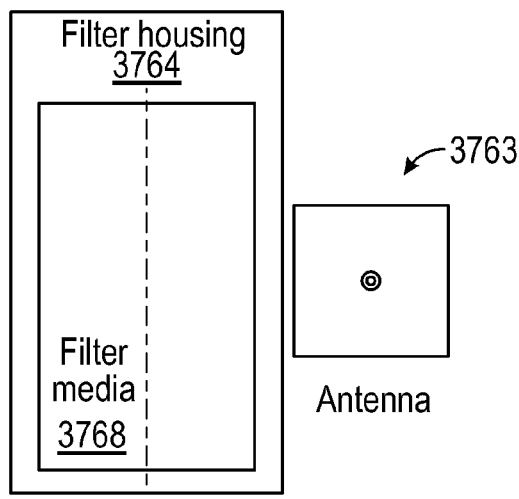
Figure 37D:
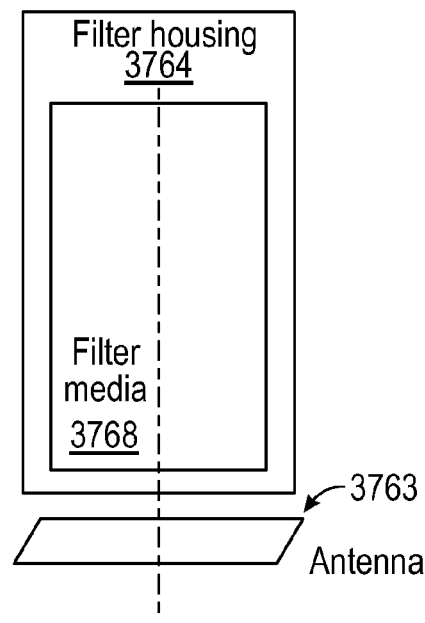
Figure 37E:
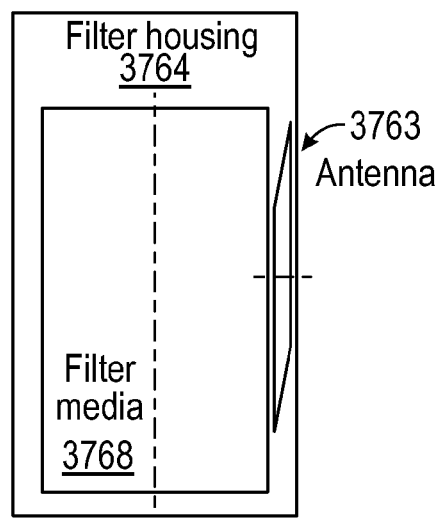
Figure 37F:
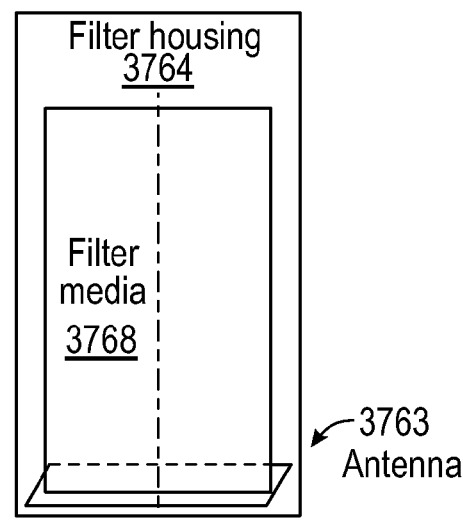
Figure 37G:
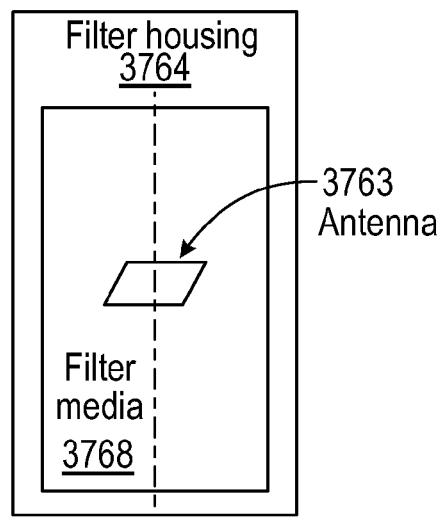
Figure 37H:
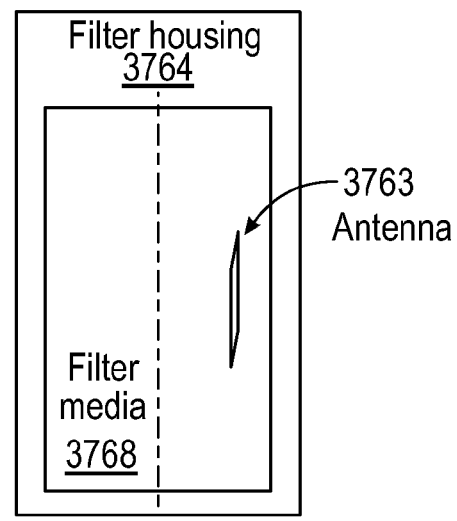
Figure 37I:
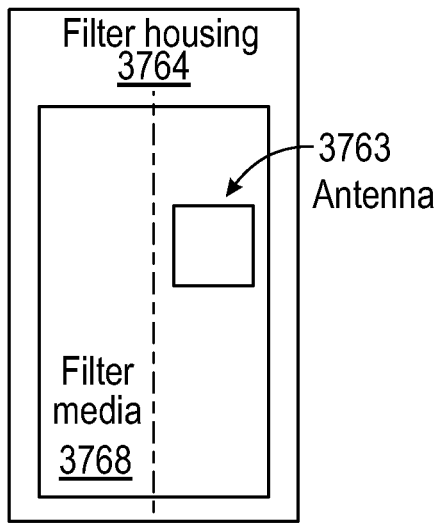
Figure 37J:
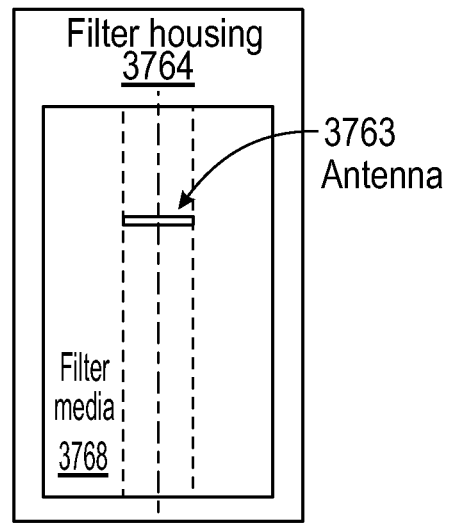
Figure 37K:
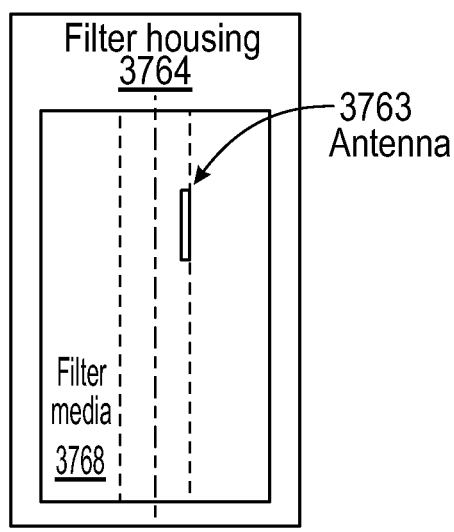

FIGS. 36A and 36B are a diagrams illustrating in further detail one example implementation of a reader/capacity sensor 3620 coupled to an example treatment housing 3621. In this embodiment the antenna of the capacity sensing portion of the reader/capacity sensor 3620 encircles the treatment housing 3621. The reader/capacity sensor 3620 includes one or more sensor elements 3631a, 3631b, 3631c, 3631d configured to read the code of a detection member (not shown) of the treatment housing 3621. In some embodiments, the reader/capacity sensor 3620 may include a field sensor for capacity sensing that is separate from the sensor elements 3631a, 3631b, 3631c, 3631d. In some embodiments, one or more of the sensor elements 3631a, 3631b, 3631c, 3631d used to read the code of the detection member also serve as a field sensor for capacity sensing. The circuitry for reading the code of the detection member and for capacity sensing may be shared or may be separate circuits as previously discussed.

In this example implementation, treatment housing 3621 is a non-conductive housing containing treatment media for the filtration of liquids or gases. The reader/capacity sensor 3620 is positioned adjacent and external to treatment housing 3621. For example, reader/capacity sensor 3620 may be configured to securely mount to the external surface of housing 3621. In other examples, reader/capacity sensor 3620 may be positioned external to the treatment housing 3621 and a gap may exist between an inner surface of the reader/capacity sensor 3620 and an outer surface of the treatment housing 3621. The reader/capacity sensor 3620 may be connected to the treatment housing 3621 by a mechanical connection by, for example, one or more fasteners, one or more clamps, one or more ridges or grooves in the surface of the treatment housing 3621 and reader/capacity sensor 3620, or the like. In the example of FIG. 36A, reader/capacity sensor 3620 is positioned in a center of a longitudinal axis of the treatment housing 3621. In other examples, the reader/capacity sensor 3620 may be positioned near an end of the treatment housing 3621. In other examples, the reader/capacity sensor 3620 may be varyingly positioned between the end and the center of the treatment housing 3621.

In general, reader/capacity sensor 3620 may incorporate user interface elements that provide visual and/or audible indications of the related to the code of the detection member read by the reader/capacity sensor 3620 and/or the current capacity of the treatment media. In the example of FIGS. 36A and 36B, a test/reset button 3622 is located on an outer surface of the reader/capacity sensor 3620. In some examples, the test/rest button 3622 may be accompanied by text indicating, for example, "test" and/or "reset." In some examples, the test/reset button 3622 may include an indicator light such as, for example, a light emitting diode, incandescent bulb, or the like. In some examples, the test/reset button 3622 may be raised from the surface of the reader/capacity sensor 3620. In other examples, the test/reset button 3622 may be recessed from the surface of the reader/capacity sensor 3620. In some examples, the test/reset button 3622 may be configured to turn-on or turn-off a user interface 3624. In some examples, the test/reset button 3622 may be configured to reset the reader/capacity sensor 3620 and user interface 3624.

In the example of FIGS. 36A and 36B, a user interface element 3624 includes, for example, a plurality of lights such as, for example, light emitting diodes, incandescent bulbs, or the like. In other examples, user interface 3624 may include, for example, a graphical interface, a touch screen, or the like. In some examples, the indicator lights correspond to the treatment media lifetime or capacity. For example, full treatment media lifetime or capacity (e.g., a new treatment media) may be indicated by illumination of all indicator lights, whereas fewer lights may be illuminated as the treatment media lifetime or capacity decreases. In some examples, the indicator lights may be one or more colors where designated colors and/or shading variations transition from full to empty capacity. In some examples, user interface 3624 may be accompanied by text indicating, for example, "lifetime" or a series of percentages corresponding to the remaining treatment media lifetime or capacity (e.g., 0%, 25%, 50%, 75%, and 100%). %). In some examples, the user interface 3624 as a graphical interface may be represented as a pie chart (e.g., circular gauge), bar chart, or the like. In other examples, the measured remaining treatment media lifetime or capacity may be displayed as a time interval (e.g., days) or a remaining volume of fluid that may be treated to a predetermined purity or quality (e.g., gallons).

Although not shown in FIGS. 36A and 36B, reader/capacity sensor 3620 includes an internal antenna (not shown) arranged to form conductive loops that encircle treatment housing 3621. An internal power source, such as a battery, and transceiver of reader/capacity sensor 3620 drive an alternating electrical current 3626 through the antenna so as to produce magnetic field 3628. In general, magnetic field 3628 propagates through at least a portion of the treatment media contained within treatment housing 3621.

As previously described above, the treatment media within housing 3621 interacts with magnetic field 3628 produced by reader/capacity sensor 3620. For example, magnetic field 3628 may interact with the treatment media to induce eddy currents within the treatment media. Creation of the field eddy currents in turn operate to reduce a strength of the magnetic field produced by the antenna of reader/capacity sensor 3620. A controller within reader/capacity sensor 3620 monitors characteristics of the antenna while producing magnetic field 3628 and, based on those characteristics, determines qualities (strength, amplitude, phase, etc.) of the resultant magnetic field being produced. By monitoring changes in certain qualities of the magnetic field 3628, the controller in turn detects changes in characteristics of the contained treatment media, such as changes in treatment media conductivity, dielectric constant, or magnetic permeability over time due to filtration of particulates.

In general, treatment media may be used in a broad range of applications involving filtration, separation, and purification of fluids (liquid and gas). Example media include, although not limited to, water treatment media, activated carbon, modified activated carbon, catalytic carbon, carbon, charcoal, titanium dioxide, non-wovens, electrets, air treatment media, water disinfectant removal media, particulate removal media, organic content removal, ion-exchange media, reverse osmosis media, iron removal media, semi-permeable membranes, molecular sieves, sand, magnets, screens, and barrier media. Example filtration techniques with which sensors described herein may be used include, as examples: absorption, chemisorption, physisorption, adsorption, precipitation, sublimation, ion-exchange, exclusion, extraction, electrophoresis, electrolysis, reverse osmosis, barrier membranes, sedimentation, distillation, and gas exchange. The following table illustrates example antenna characteristics that may be influenced by treatment media properties such that changes to those antenna characteristics can be detected by the controller in accordance with reader/capacity sensors described herein:

Water filtration systems are often deployed for subsequent dechlorination to remove the chlorine because the presence of excess chlorine in water produces an undesirable taste, odor, membrane degradation in reverse osmosis and nano-filtration systems, and the like. Flowing water through a highly porous activated carbon filter aids in dechlorination by reducing chlorine to chloride through, for example, oxidation of the activated carbon treatment media. Representative chemical equations are shown below:

$$C(s)+HOCl(aq) \rightleftharpoons CO^*(s)+H++Cl-$$

$$C(s)+OCl-(aq) \rightleftharpoons CO^*(s)+Cl-$$

where CO* represent an oxidative carbon site on the activated carbon treatment media. In this way, chlorine is reduced to chloride, which is safe for human consumption, reduces undesirable taste and order, and is safe for additional water conditioning methods.

As explained herein, responsive to the dechlorination process, the electrical conductivity of an activated carbon filter decreases over time. As explained herein, surface oxidation over time results in a significant decrease in the electrical conductivity of the activated carbon filter. Moreover, as explained herein, any change in conductivity of the treatment media in turn influences magnetic field 3628 generated by reader/capacity sensor 3620, which is detected by reader/capacity sensor 3620. By periodically producing and sensing the resultant magnetic field 3628, reader/capacity sensor 3620 is able to measure the conductivity decrease of the activated carbon filter during dechlorination and, therefore, determine the percentage of the oxidized surface sites and the remaining lifetime or capacity of the filter. The

| | Change in filter media property | | | | |
|---|---|---|---|---|---|
| Sensor Element | electrical conductivity | magnetic permeability | magnetic loss tangent | dielectric constant | dielectric loss tangent |
| Inductive Element L, RL, Antenna | Inductance, Reactance, Resistance, Q-Factor | Inductance, Reactance, Resistance, Q-Factor | Resistance, Q-Factor | | |
| Capacitance Element C, RC, Antenna | | | | Capacitance, Reactance, Resistance, Q-Factor | Resistance, Q-Factor |
| Resonant Circuit LC, LCR, Antenna, Resonant Antenna | Inductance, Reactance, Resistance, Q-Factor, Resonant Frequency | Inductance, Reactance, Resistance, Q-Factor, Resonant Frequency | Resistance, Q-Factor | Capacitance, Reactance, Resistance, Q-Factor, Resonant Frequency | Resistance, Q-Factor |

*An resoanat and non-resonant antenna may have both inductive and capacitance elements As one example, in activated carbon water filtration, reader/capacity sensor 3620 may be configured to detect changes to the conductivity of a treatment media over the lifetime of the treatment media. As an example, water treatment systems are often deployed for dechlorination to remove previously added chlorine. That is, water disinfection is typically accomplished by the addition of sodium hypochlorite solution (NaOCl), solid calcium hypochlorite (Ca(OCl)2), chlorine gas (Cl2), or monochloramine (NH2Cl). Chlorine dissociates in the presence of water for form hypochlorite (OCl—) and hypochlorous acid (HOCl), as shown by the following reactions:

$$Cl2(g)+H2O(1) \rightleftharpoons HOCl+H++Cl-$$

$$HOCl \rightleftharpoons H++OCl-$$

measured remaining lifetime is displayed on user interface 3636, which may represent a percentage of the total capacity, a time interval such as days, or a volume (measurement) of water. Alternatively, reader/capacity sensor 3620 may communicate the results to a central monitor for centralized reporting and alerting.

As such, in this example scenario, reader/capacity sensor 3620 may predict and alert an upcoming chlorine breakthrough for an activated carbon treatment media, which is characterized as when a filtrate chlorine concentration surpasses a threshold chlorine concentration. In this way, reader/capacity sensor 3620 may facilitate active determination and early notification of the chlorine breakthrough.

FIG. 36B is a schematic diagram illustrating in further detail an example electromagnetic field created by the example indirect contact reader/capacity sensor 3620. In the example of FIG. 36B, the internal antenna (not shown) of reader/capacity sensor 3620 forms a magnetic field 3628 that travels through at least a portion of the interior space defined by the annular shape of the reader/capacity sensor 3620. In some examples, a conductive material in the treatment media generates an eddy currents (not shown) in the presence of a first magnetic field 3628. The eddy currents in the treatment media results in the creation of a second magnetic field (not shown) that opposes the first magnetic field 3628. The second magnetic field in turn lowers the overall strength of the magnetic field 3628. In some examples, the magnitude of the eddy currents and the second magnetic field depend on the electrical conductivity of the treatment media. In this way, the finite electrical conductivity of the treatment media represents an energy loss mechanism detected by reader/capacity sensor 3620. In some examples, the energy loss mechanism may be used to determine the conductivity or conductivity change of the treatment media by monitoring the electronic characteristics of the antenna such as, for example, inductance, capacitance, resonant frequency, quality factor, equivalent series resistance, or equivalent parallel resistance. In other examples, the antenna may be configured to be a resonant circuit. In this way, the conductivity or conductivity change of the treatment media is determined by monitoring, for example, inductance, capacitance, resonant frequency, quality factor, equivalent series resistance, equivalent parallel resistance, or the like. For example, the resonant frequency ($f_o$) of the non-contact sensor can be determined from the inductance (L) and the capacitance (C):

$$f_o = \frac{1}{2\pi\sqrt{LC}}.$$

The quality factor (Q) of the resonant circuit is determined by the series reactance ($X_s$) and the series resistance ($R_s$) at resonance:

$$Q = \frac{X_s}{R_s}.$$

At resonance, the series capacitance reactance ($X_{c,s}$) and the series inductive reactance ($X_{L,s}$) are equal:

$$X_{c,s} = \frac{1}{2\pi f_o C}$$

$$X_{L,s} = 2\pi f_o L$$

A change in inductance or capacitance will change the $f_o$ of the sensor and change the parallel resistance ($R_p$) of the sensor. In the case where the resonant frequency change is caused by a change in capacitance, the corrected parallel resistance of the sensor is given in the equation:

$$R_p = R_{p,o}\left(\left(\frac{\Delta f + f_o}{f_o}\right)^2\right)$$

In the case where the resonant frequency change is caused by a change in inductance, the corrected parallel resistance of the sensor is given in the equation:

$$R_p = R_{p,o}\left(\left(\frac{f_o}{\Delta f + f_o}\right)^2\right).$$

In some examples, an impedance evaluation module (not shown) may be used to monitor, for example, inductance, capacitance, resonant frequency, quality factor, equivalent series resistance, equivalent parallel resistance, or the like to determine one or more parameters of the treatment media such as, for example, conductivity, dielectric strength, magnetic permeability, and the like. In this way, for example, monitoring the inductance, capacitance, resonant frequency, quality factor, equivalent series resistance, equivalent parallel resistance, or the like, may provide real-time indication of treatment media lifetime or capacity, which is advantageous over methods that estimate treatment media lifetime or capacity based on duration of operation or total fluid volume treated.

Reader/capacity sensor 3620 includes one or more capacity sensing elements such as, for example, an antenna, an inductor-capacitor (LC) circuit, an inductor-capacitor-resistor circuit (LCR), an inductor-resistor (LR) circuit, a capacitor-resistor (CR) circuit near-field coupled to treatment media. Reader/capacity sensor 3620 also includes sensor elements configured to read the code of a detection member of the treatment cartridge to detect a presence of the treatment cartridge and/or to authenticate, identify, and/or classify the cartridge. In some example implementations, reader/capacity sensor 3620 may include additional components designed to measure additional system parameters that are used to compensate for drift and environmental conditions that affect the properties of the capacity sensing antenna and/or field sensor. Example additional parameters that may be measured and used to adjust capacity sensing measurements include flow rate, inlet pressure, outlet pressure, pressure drop, fluid temperature, ambient temperature, sensor temperature, electronics temperature, contaminate type sensor, and time. For example, compensation of the temperature dependence of the parallel resistance of the antenna element is caused by the temperature dependence of resistivity of the conductor that comprises the antenna, as such the parallel resistance ($R_{p,T}$) of the antenna can be calculated by:

$$R_{p,T} = \frac{R_{p,o}}{(1 + \alpha(T_a - T_{a,o}))} = \frac{R_{p,o}}{(1 + \alpha(\Delta T_a))}$$

where $R_{p,o}$ is the parallel resistance of the antenna at $T=T_o$, $\alpha$ is the temperature coefficient of resistivity of the antenna, $T_a$ is the temperature of the antenna, $T_{a,o}$ is the reference temperature of the antenna, and $\Delta T_a$ is the change in temperature of the antenna. Whereas the treatment media, for example, has a temperature dependence resistivity ($R_{f,T}$) that can be calculated by:

$$R_{f,T} = \frac{R_{f,o}}{(1 + \beta(T_w - T_{w,o}))} = \frac{R_{f,o}}{(1 + \beta(\Delta T_w))}$$

where $R_{f,o}$ is the resistance of the treatment media at $T=T_{o,\beta}$ is the temperature coefficient of resistivity of the treatment media, $T_w$ is the temperature of the water, $T_{w,o}$ is the reference temperature of the water, $\Delta T_w$ is the change in temperature of the water.

As such, in various examples, treatment capacity can be determined through measuring conductivity of the treatment media during treatment. To determine treatment capacity, the treatment media is disposed in the near-field of a resonant antenna. The equivalent parallel resistance of the resonant antenna at resonance is measured during the filtration process. By measuring the equivalent parallel resistance of the resonant antenna at resonance, the coupled equivalent resistance of the treatment media can be monitored. Treatment capacity can be determined based on a predetermined correlation between coupled equivalent resistance of the treatment media and treatment capacity.

In another example, treatment media is disposed in the near-field of a non-resonant loop antenna. The equivalent series resistance of the non-resonant loop antenna is measured during the filtration process. By measuring the equivalent series resistance of the non-resonant antenna, the coupled equivalent resistance of the treatment media can be measured. The measured coupled equivalent resistance is used to determine the treatment capacity based on a predetermined correlation with the treatment capacity.

In another example, treatment media is disposed in the near-field of a capacitance element. The equivalent parallel resistance of the capacitance element is measured during the filtration process. By measuring the change in equivalent parallel resistance of a capacitance element, the coupled equivalent resistance of the treatment media can be measured. The measured equivalent resistance is used to determine the treatment capacity based on a predetermined correlation between the coupled equivalent resistances of the treatment media and treatment capacity.

The sensitivity of sensor may be defined as the sensor change caused by a unit change in the object to be sensed. For the examples described above, sensor sensitivity can be improved by increasing the parallel resistance of the antenna or capacitance element in the absence of the treatment media. Construction of an antenna with a high parallel resistance in the absence of the treatment media may require high cost materials, high cost component design/construction, and increased sensor size. Additionally, electronics suitable to read a sensor with a high parallel resistance may require high cost electronic components and advanced algorithms. In a practical system design, the system designer may have to consider the interdependency between sensor sensitivity and sensor cost. In one embodiment, the parallel resistance of the antenna is between 100Ω and 10 kΩ. In a second embodiment, parallel resistance of the antenna greater than the coupled resistance of the treatment media. In a third embodiment, the parallel resistance of the antenna is greater than 0.001 times the coupled resistance of the treatment.

Sensitivity may be improved by achieving a higher quality factor. For the same reasons described above, design of an antenna with a high quality factor may be impractical. In one embodiment, the quality-factor of the antenna is higher than 10 and lower than 1000. In a second embodiment, the quality factor of the antenna is between 50 and 200.

In addition, increasing the operational frequency of an antenna may lead to higher sensor sensitivity. As the operational frequency for a given antenna increases, the reactance typically has a larger increase compared to the resistance, which leads to a higher quality factor and parallel resistance of the antenna. In some applications, increasing the operational frequencies may be impractical as the required electronics may be of a higher cost, consume additional power, and exceed governmental emission limitations. In one embodiment, the operational frequency is between 1-30 MHz. In a second embodiment, the operational frequency resides within one or more industrial, scientific and medical (ISM) radio bands.

Sensor sensitivity can be improved by increasing the magnitude of the near-field coupling between the antenna and the treatment media. The magnitude of the near-field coupling coefficient can range from 1 (perfect coupling) to 0 (no coupling). In practical design, realizing high coupling is limited by system geometrical constraints, such as the separation of the antenna and treatment media caused by the presence of the treatment housing or the presence of a fluid. In one embodiment, the coupling coefficient is higher than 0.1.

In some applications, the capacity sensor may be required to only detect when the treatment media capacity falls below a threshold. In this application, a capacity sensor with low sensitivity may be acceptable. In some applications, the capacity sensor may be required to have a high resolution of the treatment media capacity during the entire lifetime of the treatment media. In this application, a capacity sensor with high sensitivity may be required.

In some implementations, treatment capacity is determined by measuring the magnetic permeability of the treatment media during treatment. To determine treatment capacity, the treatment media is disposed in the near-field of a resonant antenna. The resonant frequency of the resonant antenna is measured during the filtration process. By measuring the resonant frequency of the antenna, the magnetic permeability of the treatment media can be monitored. The measured magnetic permeability is used to determine the treatment capacity based on a predetermined correlation between magnetic permeability and treatment capacity.

In some embodiments, treatment media is disposed in the near-field of a non-resonant loop antenna. The inductance of the non-resonant loop antenna is measured during the filtration process. By measuring the inductance of the non-resonant antenna, the magnetic permeability of the treatment media can be measured. The measured permeability is used to determine the treatment capacity based on a predetermined correlation between treatment media permeability and treatment capacity.

In some embodiments, the treatment media is disposed in the near-field of a non-resonant loop antenna. The equivalent parallel resistance of the non-resonant loop antenna is measured during the filtration process. By measuring the change in equivalent parallel resistance of the non-resonant antenna, the magnetic loss tangent of the treatment media can be measured. The measured loss is used to determine the treatment capacity based on a predetermined correlation between magnetic loss tangent and treatment capacity.

In some embodiments, treatment capacity is determined by measuring the dielectric constant of the treatment media during treatment. To determine treatment capacity, the treatment media is disposed in the near-field of a capacitor element. The capacitance of the capacitor element is measured during the filtration process. By measuring the capacitance of the capacitor element, the dielectric constant of the treatment media can be measured. The measured dielectric constant is used to determine the treatment capacity based on a predetermined correlation between dielectric constant and treatment capacity.

In some embodiments, treatment media is disposed in the near-field of a capacitor element. The equivalent parallel resistance of the capacitor element is measured during the filtration process. By measuring the change in equivalent parallel resistance of the capacitor element, the dielectric loss tangent of the treatment media can be measured. The measured loss is used to determine the treatment capacity based on a predetermined correlation between dielectric loss tangent and treatment capacity.

In some embodiments, chlorine from a municipal water source is treated by a catalytic reduction process of an activated carbon filter block. During filtration, surface oxidation reduces the number of catalytic sites on the carbon block and decreases the capability of the carbon block to filter chlorine. Oxidation of the activated carbon block results in a decreased electrical conductivity of the filter block. Based on this mechanism, treatment capacity may be correlated to the conductivity of the filter block.

In some embodiments, a non-conductive filter membrane is designed to filter electrically conductive particles dispersed in a liquid. During filtration, conductive particles captured by the treatment media causes the effective resistance of the filter to decrease. As more conductive particles are captured by the filter, the capacity of the filter to capture additional particles decreases. Based on this mechanism, treatment capacity may be correlated to the conductivity of the filter membrane.

In some embodiments, a third example, iron contained within water derived from a residential well water source is filtered with a non-magnetic filter block. During filtration, iron particles captured by the treatment media cause the effective permeability of filter to increase. As more iron particles are captured by the filter, the capability of the filter decreases. Based on this mechanism, treatment capacity may be correlated to magnetic permeability of the filter.

In some embodiments, volatile organic content in filtered by granular carbon attached to a personal respirator device. During filtration, adsorption of the organic content of the carbon surface causes the dielectric constant of the carbon to increase. The dielectric constant increases because the organic content has a higher dielectric constant compared to the displaced air. As organic content adsorbs to the surface and prevents additional organic contact adsorption, the filter capability decreases. Based on this mechanism, the treatment capacity may be correlated to the dielectric constant of the filter.

In some embodiments, air particles are treated by a non-woven electret filter in a residential furnace. During filtration, particle loading of the filter causes the dielectric constant of the filter to increase. As more particles are captured by the filter, the treatment capability to capture additional particles decreases. Based on this mechanism, treatment capacity may be correlated to the dielectric constant of the filter.

FIGS. 37A-37K are block diagrams illustrating relative positions and orientations between a capacity sensing antenna 3763 and treatment media 3768 in accordance with various embodiments of a reader/capacity sensor. In general, reader/capacity sensors as described herein can include any orientation between the capacity sensing antenna 3763 and treatment media 3768 capable of causing at least a portion of a generated magnetic field of antenna 3763 to interact with the treatment media 3768. When at least a portion of the magnetic field of antenna 3763 is incident on the treatment media 3768, the treatment media 3768 and antenna 3763 are in near-field electromagnetic interaction, also referred to herein as near-field coupled, inductively coupled, magnetically coupled, and electromagnetically coupled. Several example embodiments are shown in FIGS. 37A-37K. In these embodiments, antenna 2563 is depicted as the plane where an antenna resides and the antenna is positioned in a variety of orientations relative to the treatment media. Moreover, as shown in the examples, antenna 3763 may be exterior to treatment housing 3764, interior to the treatment housing 3764 and proximal to the treatment media, or disposed within portions of the treatment media. Antenna 3763 can be a conductive loop with different parameters such as number of turns, diameter, and conductor thickness. Although not shown, antenna 3763 may not be limited to a planar antenna but can have a third dimension such as a coil inductor or antenna turns with different normal directions. As previously discussed, in some of these embodiments, the antenna 3763 may also serve as a sensor element to read the detection member code.

Embodiments disclosed herein include:

Embodiment 1

A fluid treatment cartridge comprising:
a housing comprising a fluid inlet and a fluid outlet;
a treatment media contained within the housing; and
a detection member comprising at least one closed electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code.

Embodiment 2

The fluid treatment cartridge of embodiment 1, wherein a first magnetic amplitude response of a first section of the at least two spatially separate sections of the closed electrically conductive loop is different from a second magnetic amplitude response of a second section of the at least two spatially separate sections of the closed electrically conductive loop.

Embodiment 3

The fluid treatment cartridge of any of embodiments 1 through 2, wherein a first magnetic phase response of a first section of the at least two spatially separate sections of the closed electrically conductive loop is different from a second magnetic phase response of a second section of the at least two spatially separate sections of the closed electrically conductive loop.

Embodiment 4

The fluid treatment cartridge of any of embodiments 1 through 3, further comprising a cross over disposed between first and second sections of the at least two spatially separate sections of the closed electrically conductive loop, the cross over changing an angular direction of current flow through the second section relative to a direction of current flow through the first section.

Embodiment 5

The fluid treatment cartridge of any of embodiments 1 through 4, wherein:
the at least two spatially separate sections of the closed electrically conductive loop comprise:
a first section having a first magnetic phase response;
a second section having a second magnetic phase response that is different from the first magnetic phase response; and a cross over between the first section and the second section, the cross over comprising:
a first loop portion;
a second loop portion that crosses over the first loop portion; and
an electrically insulating material between the crossed over first loop portion and second loop portion.

Embodiment 6

The fluid treatment cartridge of any of embodiments 1 through 5, wherein the at least two spatially separate sections of the closed conductive loop comprise:
a first section having a first non-electrically conductive area inside the closed electrically conductive loop and a first magnetic amplitude response; and
a second section having a second non-electrically conductive area inside the closed electrically conductive loop that is greater than the first non-electrically conductive area and a second magnetic amplitude response that is different from the first magnetic amplitude response.

Embodiment 7

The fluid treatment cartridge of embodiment 6, wherein the first section comprises a notch in the closed electrically conductive loop, the notch extending across at least about 10% of the first section.

Embodiment 8

The fluid treatment cartridge of any of embodiments 1 through 7, wherein the at least two spatially separate sections comprise:
a notched section containing at least one notch; and
an un-notched section, wherein a largest circle that will fit within inner edges of the shortest conductive path of the closed electrically conductive loop in the un-notched section has diameter d1 and a largest circle that will fit within the inner edges of the shortest conductive path of the closed electrically conductive loop in the notched section has diameter d2 and d1>d2.

Embodiment 9

The notched section of embodiment 8, wherein a largest circle that will fit within the inner edges of the closed electrically conductive loop in the notched section has diameter d2<3 cm.

Embodiment 10

The fluid treatment cartridge of any of embodiments 1 through 9, wherein the at least two spatially separate sections of the closed conductive loop comprise a branched section having two or more electrically conductive branches that are electrically connected in parallel.

Embodiment 11

The fluid treatment cartridge of any of embodiments 1 through 10, wherein at least one section of the at least two spatially separate sections of the closed electrically conductive loop includes an electrically conductive area that supports eddy currents disposed within a shortest conductive path of the closed electrically conductive loop.

Embodiment 12

The fluid treatment cartridge of embodiment 11, wherein the electrically conductive area is at least about 10% of a non-conductive area encompassed within the at least one section.

Embodiment 13

The fluid treatment cartridge of any of embodiments 1 through 12, wherein the at least two spatially separate sections of the closed electrically conductive loop comprise a first section having a first number of inductive turns and a second section having a second number of inductive turns where the first number is greater than the second number.

Embodiment 14

The fluid treatment cartridge of any of embodiments 1 through 13, wherein a length of the shortest electrical path of the closed electrically conductive loop is less than about 24 cm.

Embodiment 15

The fluid treatment cartridge of any of embodiments 1 through 14, wherein a non-conductive area encompassed within a shortest electrical path of the closed electrically conductive loop is less than about 25 cm$^2$.

Embodiment 16

The fluid treatment cartridge of any of embodiments 1 through 15, wherein the closed electrically conductive loop has an inductance less than about 150 nH.

Embodiment 17

The fluid treatment cartridge of any of embodiments 1, wherein the closed electrically conductive loop is a single inductive turn loop.

Embodiment 18

The fluid treatment cartridge of any of embodiments 1 through 17, wherein the at least one closed electrically conductive loop comprises at least three spatially separate sections, each of the three spatially separate sections generating a predetermined magnetic response when at least one section of the three spatially separate sections is electromagnetically excited, the magnetic responses of at least two other sections of the three spatially separate sections corresponding to at least a two digit code.

19. The fluid treatment cartridge of any of embodiments 1 through 18, wherein the at least one closed electrically conductive loop comprises two closed electrically conductive loops that are inductively coupled.

Embodiment 20

A system comprising:
a fluid treatment cartridge comprising:
a housing comprising a fluid inlet and a fluid outlet;
a treatment media contained within the housing; and a detection member comprising at least one closed electrically conductive loop comprising at least two spatially separate sections, each of the sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code; and a reader comprising:
at least one transmit element configured to transmit an electromagnetic signal that electromagnetically excites the at least one section of the closed electrically conductive loop; and
at least one receive element, the predetermined magnetic response of the at least one other section of the closed conductive loop generating a signal on the at least one receive element that represents the code.

Embodiment 21

The system of embodiment 20, wherein the reader includes multiple spatially separated receive elements, each receive element corresponding respectively to a section of the closed conductive loop, and signals generated on the multiple receive elements represent a multi-digit code.

Embodiment 22

The system of any of embodiments 20 through 21, further comprising reader circuitry configured to process the signal and to identify the code.

Embodiment 23

The system of embodiment 22, wherein:
the reader circuitry is configured to detect at least one of:
a phase difference between a phase of the signal of the receive element and a phase of the electromagnetic signal transmitted by the transmit element; and
an amplitude difference between an amplitude of a first signal of a first receive element and an amplitude of a second signal of a second receive element or an amplitude difference between the amplitude of the first signal and a baseline amplitude.

Embodiment 24

The system of any of embodiments 20 through 23, wherein the reader circuitry is configured to detect one or both of a presence of the fluidic treatment cartridge and a characteristic of the fluid treatment cartridge based on the code.

Embodiment 25

A method, comprising:
electromagnetically exciting at least one section of a closed electrically conductive loop of a fluidic treatment cartridge that includes a housing having a fluidic inlet, a fluidic outlet, and a treatment media disposed within the housing;
generating a predetermined magnetic response in at least another section of the closed electrically conductive loop in response to electromagnetic excitement of the at least one section of the closed conductive loop, the predetermined magnetic response comprising at least one of a magnetic phase response and a magnetic amplitude response and corresponding to at least a one digit code.

Embodiment 26

The method of embodiment 25, wherein generating the predetermined magnetic response comprises at least one of:
reversing an angular direction of current flow in the closed electrically conductive loop;
inducing a current flow through a notched section of the closed electrically conductive loop;
dividing current flow into at least two branches of a branched section of the closed electrically conductive loop;
inducing a current flow through a multiple inductive turn section of the closed electrically conductive loop; and
generating eddy currents in an electrically conductive area of a section of the closed electrically conductive loop.

Embodiment 27

The method of an of embodiments 25 through 26, further comprising:
fluidically coupling the fluidic inlet and fluidic outlet of the fluidic treatment cartridge to a host device;
transmitting an electromagnetic signal from a reader of a host device that electromagnetically excites the at least one section of the closed electrically conductive loop;
and sensing the predetermined magnetic response in the reader of the host device; and
generating an electrical signal that represents the code in response to the predetermined magnetic response.

Embodiment 28

The method of embodiment 27, further comprising at least one of:
detecting a proximity of the fluidic cartridge to the host device based on the code, the code being a one bit binary code;
detecting a characteristic of the fluidic cartridge based on the code, the code being a multi-bit binary code; and
controlling an operation of the host device based on the code.

Embodiment 29

A device comprising:
a housing comprising a fluid inlet and a fluid outlet;
a treatment media contained within the housing; and
a detection member comprising at least one closed electrically conductive loop comprising multiple spatially separate loop sections including at least one excitation section and one or more response loop sections disposed respectively in multiple spatially separate sections of a detection area, each of the response loop sections generating a predetermined magnetic response when the excitation loop section is electromagnetically excited, the magnetic response comprising at least one of a predetermined magnetic phase response and a predetermined magnetic amplitude response, a spatial arrangement of the predetermined magnetic responses of the one or more response sections within the multiple detection area sections corresponding to a multi-digit code.

Embodiment 30

The device of embodiment 29, wherein at least a first response loop section has a different predetermined magnetic response when compared to a predetermined magnetic response of another loop section.

Embodiment 31

A component, comprising:

a detection member comprising at least one closed electrically conductive loop having at least two spatially separate sections; and one or more engagement features configured to reversibly engage with a host device, the engagement features configured to position the closed conductive loop relative to a reader of the host device such that at least one section of the closed conductive loop is electromagnetically excited by a signal emitted by the reader and the reader senses a predetermined magnetic response of at least one other section of the closed electrically conductive loop, the predetermined magnetic response of the at least one other section of the at least two spatially separate sections corresponding to at least a one digit code.

Embodiment 32

The component of embodiment 31, wherein the predetermined magnetic response comprises at least one of an amplitude response and a phase response.

Embodiment 33

The component of any of embodiments 31 through 32, wherein the at least a one digit code comprises a multiple digit code.

Embodiment 34

The component of any of embodiments 31 through 33, wherein the closed conductive loop is arranged in a single layer.

Embodiment 35

The component of any of embodiments 31 through 33, wherein the closed conductive loop is arranged in multiple layers.

Embodiment 36

The component of any of embodiments 31 through 35, wherein the closed conductive loop has a single inductive turn.

Embodiment 37

The component of any of embodiments 31 through 35, wherein the closed conductive loop comprises multiple inductive turns.

Embodiment 38

The component of any of embodiments 31 through 37, wherein:

the at least a one digit code comprises a multiple digit code; and the at least one other section comprises at least two other sections, a first magnetic response of a first section of the at least two other sections representing a first value of the multiple digit code and a different, second magnetic response of a second section of the at least two other sections representing a different, second value of the multiple digit code.

Embodiment 39

The component of any of embodiments 31 through 38, wherein the code is a binary code.

Embodiment 40

The component of any of embodiments 31 through 38, wherein the code is a non-binary code.

Embodiment 41

A component comprising a detection member that includes at least one closed electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code.

Embodiment 42

The component of embodiment 41, wherein the component includes features configured to reversibly engage with a host device.

Embodiment 43

The component of any of embodiments 41 through 42, wherein a first magnetic amplitude response of a first section of the at least two spatially separate sections of the closed electrically conductive loop is different from a second magnetic amplitude response of a second section of the at least two spatially separate sections of the closed electrically conductive loop.

Embodiment 44

The component of any of embodiments 41 through 43, wherein a first magnetic phase response of a first section of the at least two spatially separate sections of the closed electrically conductive loop is different from a second magnetic phase response of a second section of the at least two spatially separate sections of the closed electrically conductive loop.

Embodiment 45

The component of any of embodiments 41 through 44, further comprising a cross over disposed between first and second sections of the at least two spatially separate sections of the closed electrically conductive loop, the cross over reversing an angular direction of current flow through the second section relative to a direction of current flow through the first section.

Embodiment 46

The component of any of embodiments 41 through 45, wherein the at least two spatially separate sections of the closed conductive loop comprise:
- a first section having a first non-electrically conductive area inside the closed electrically conductive loop and a first magnetic amplitude response; and
- a second section having a second non-electrically conductive area inside the closed electrically conductive loop that is greater than the first non-electrically conductive area and a second magnetic amplitude response that is different from the first magnetic amplitude response.

Embodiment 47

The component of any of embodiments 41 through 46, wherein the at least two spatially separate sections comprise:
- a notched section containing at least one notch; and
- an un-notched section, wherein a largest circle that will fit within inner edges of the shortest conductive path of the closed electrically conductive loop in the un-notched section has diameter d1 and a largest circle that will fit within the inner edges of the shortest conductive path of the closed electrically conductive loop in the notched section has diameter d2 and d1>d2.

Embodiment 48

The component of any of embodiments 41 through 47, wherein the at least two spatially separate sections of the closed conductive loop comprise a branched section having two or more electrically conductive branches that are electrically connected in parallel.

Embodiment 49

The component of any of embodiments 41 through 48, wherein at least one section of the at least two spatially separate sections of the closed electrically conductive loop includes an electrically conductive area that supports eddy currents disposed within a shortest conductive path of the closed electrically conductive loop.

Embodiment 50

The component of any of embodiments 41 through 49, wherein the at least two spatially separate sections of the closed electrically conductive loop comprise a first section having a first number of inductive turns and a second section having a second number of inductive turns where the first number is greater than the second number.

Embodiment 51

The component of any of embodiments 41 through 50, wherein the closed electrically conductive loop is a single inductive turn loop.

Embodiment 52

The component of any of embodiments 41 through 51, wherein the closed electrically conductive loop comprises at least three spatially separate sections, each of the three spatially separate sections generating a predetermined magnetic response when at least one section of the three spatially separate sections is electromagnetically excited, the magnetic responses of at least two other sections of the three spatially separate sections corresponding to at least a two digit code.

Embodiment 53

The component of any of embodiments 41 through 52, wherein the at least one closed electrically conductive loop comprises two closed electrically conductive loops that are inductively coupled.

Embodiment 54

A system comprising:
a component comprising a detection member that includes at least one closed electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code; and
a host device comprising a reader that includes an array of spaced apart sensor elements including at least one sensor element configured to electromagnetically excite the at least one section and at least one other sensor element configured to sense the magnetic response of the at least one other section.

Embodiment 55

The system of embodiment 54, wherein the reader is configured to determine a baseline signal for the at least one other sensor element and to compare the baseline signal to a measured signal of the at least one other sensor element, the measured signal corresponding to the predetermined magnetic response of the at least one other loop section.

Embodiment 56

The system of any of embodiments 54 through 55, wherein the reader is configured to determine the code based on comparison of the measured signal to the baseline signal.

Embodiment 57

The system of any of embodiments 54 through 56, wherein the at least one sensor element configured to electromagnetically excite the at least one section comprises multiple sensor elements configured to electromagnetically activate multiple sections of the closed conductive loop.

Embodiment 58

The system of embodiment 57, wherein the multiple sensor elements comprise two sensor elements that emit out of phase electromagnetic signals that electromagnetically excite the at least one other section.

Embodiment 59

The system of embodiment 57, wherein the multiple sensor elements comprise two sensor elements that emit in phase electromagnetic signals that electromagnetically excite the at least one other section.

Embodiment 60

The system of embodiment 57, wherein the component is a fluid treatment assembly configured to contain a filter media.

Embodiment 61

The system of embodiment 60, wherein the reader is further configured to detect capacity of the filter media.

Embodiment 62

The system of embodiment 61, wherein the reader includes one or both of an antenna and an additional sensor used to detect the capacity.

Embodiment 63

The system of embodiment 61, wherein the reader is configured such that one or more of the sensor elements are used to detect the capacity.

Embodiment 64

A method, comprising:
electromagnetically exciting at least one section of a closed electrically conductive loop disposed on or in a component;
generating a predetermined magnetic response in at least another section of the closed electrically conductive loop in response to electromagnetic excitement of the at least one section of the closed conductive loop, the predetermined magnetic response comprising at least one of a magnetic phase response and a magnetic amplitude response and corresponding to at least a one digit code.

Embodiment 65

The method of embodiment 64, wherein generating the predetermined magnetic response comprises at least one of:
reversing an angular direction of current flow in the closed electrically conductive loop;
inducing a current flow through a notched section of the closed electrically conductive loop;
dividing current flow into at least two branches of a branched section of the closed electrically conductive loop;
inducing a current flow through a multiple inductive turn section of the closed electrically conductive loop; and
generating eddy currents in an electrically conductive area of a section of the closed electrically conductive loop.

Embodiment 66

The method of embodiment 64, further comprising:
transmitting an electromagnetic signal from a reader of a host device that electromagnetically excites the at least one section of the closed electrically conductive loop;
and sensing the predetermined magnetic response in the reader of the host device; and
generating an electrical signal that represents the code in response to the predetermined magnetic response.

Embodiment 67

The method of embodiment 66, further comprising at least one of:
detecting a proximity of the component to the host device based on the code;
detecting a characteristic of the fluidic cartridge based on the code; and
controlling an operation of the host device based on the code.

Embodiment 68

An assembly comprising:
a detection member disposed within a detection area of the component wherein:
the detection area includes at least two detection area sections; and
the detection member includes at least one closed electrically conductive loop comprising at least two spatially separate sections, each spatially separate section disposed respectively in one of the detection area sections, each of the at least two spatially separate sections of the closed conductive loop generating a magnetic response predetermined by a physical shape of the section when at least one section of the at least two spatially separate sections is electromagnetically excited, the magnetic response comprising at least one of a predetermined magnetic phase response and a predetermined magnetic amplitude response, an arrangement of the at least two spatially separate sections within the at least two detection area sections corresponding to at least a one digit code.

Embodiment 69

The assembly of embodiment 68, wherein a number of the at least two detection area sections is greater than a number of the at least two sections of the closed conductive loop.

Embodiment 70

The assembly of any of embodiments 67 through 68, further comprising a reader that includes an array of spaced apart sensor elements, each sensor element corresponding to one of the detection area sections, the array of sensor elements including at least one sensor element configured to electromagnetically excite the at least one section of the closed conductive loop and at least one other sensor element configured to sense the magnetic response from the at least two detection area sections.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of these embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A fluid treatment cartridge comprising:
a housing comprising a fluid inlet and a fluid outlet;
a treatment media contained within the housing; and
a detection member comprising at least one closed electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code,
wherein the at least two spatially separate sections of the closed electrically conductive loop comprise one or more of:
a first configuration that includes:
a first section having a first magnetic phase response;
a second section having a second magnetic phase response that is different from the first magnetic phase response; and
a cross over between the first section and the second section, the cross over comprising a first loop portion, a second loop portion that crosses over the first loop portion, and an electrically insulating material between the crossed over first loop portion and second loop portion;
a second configuration that includes:
a first section having a first non-electrically conductive area inside the closed electrically conductive loop and a first magnetic amplitude response; and
a second section having a second non-electrically conductive area inside the closed electrically conductive loop that is greater than the first non-electrically conductive area and a second magnetic amplitude response that is different from the first magnetic amplitude response;
a third configuration that includes:
a notched section containing at least one notch; and
an un-notched section, wherein a largest circle that will fit within inner edges of the shortest conductive path of the closed electrically conductive loop in the un-notched section has diameter d1 and a largest circle that will fit within the inner edges of the shortest conductive path of the closed electrically conductive loop in the notched section has diameter d2 and d1>d2;
a fourth configuration that includes at least one section having an electrically conductive area that supports eddy currents disposed within a shortest conductive path of the closed electrically conductive loop; and
a fifth configuration that includes a first section having a first number of inductive turns and a second section having a second number of inductive turns where the first number is greater than the second number.

2. The fluid treatment cartridge of claim 1, wherein a first magnetic amplitude response of a first section of the at least two spatially separate sections of the closed electrically conductive loop is different from a second magnetic amplitude response of a second section of the at least two spatially separate sections of the closed electrically conductive loop.

3. The fluid treatment cartridge of claim 1, wherein a first magnetic phase response of a first section of the at least two spatially separate sections of the closed electrically conductive loop is different from a second magnetic phase response of a second section of the at least two spatially separate sections of the closed electrically conductive loop.

4. The fluid treatment cartridge of claim 1, further comprising a cross over disposed between first and second sections of the at least two spatially separate sections of the closed electrically conductive loop, the cross over changing an angular direction of current flow through the second section relative to a direction of current flow through the first section.

5. The fluid treatment cartridge of claim 1, wherein the at least two spatially separate sections of the closed conductive loop comprise a branched section having two or more electrically conductive branches that are electrically connected in parallel.

6. The fluid treatment cartridge of claim 1, wherein a length of the shortest electrical path of the closed electrically conductive loop is less than about 24 cm.

7. The fluid treatment cartridge of claim 1, wherein a non-conductive area encompassed within a shortest electrical path of the closed electrically conductive loop is less than about 25 $cm^2$.

8. The fluid treatment cartridge of claim 1, wherein the closed electrically conductive loop has an inductance less than about 150 nH.

9. The fluid treatment cartridge of claim 1, wherein the closed electrically conductive loop is a single turn inductive loop.

10. The fluid treatment cartridge of claim 1, wherein the closed electrically conductive loop comprises at least three spatially separate sections, each of the three spatially separate sections generating a predetermined magnetic response when at least one section of the three spatially separate sections is electromagnetically excited, the magnetic responses of at least two other sections of the three spatially separate sections corresponding to at least a two digit code.

11. The fluid treatment cartridge of claim 1, wherein the at least one closed electrically conductive loop comprises two closed electrically conductive loops that are inductively coupled.

12. The system of claim 1, wherein:
the at least one other section comprises multiple sections; and
the code is a multi-digit code.

13. A fluid treatment cartridge comprising:
a housing comprising a fluid inlet and a fluid outlet;
a treatment media contained within the housing; and
a detection member comprising at least one closed electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code, wherein:
the at least two spatially separate sections of the closed electrically conductive loop comprise:
a first section having a first magnetic phase response;
a second section having a second magnetic phase response that is different from the first magnetic phase response; and
a cross over between the first section and the second section, the cross over comprising:
a first loop portion;
a second loop portion that crosses over the first loop portion; and
an electrically insulating material between the crossed over first loop portion and second loop portion.

14. A fluid treatment cartridge comprising:
a housing comprising a fluid inlet and a fluid outlet;
a treatment media contained within the housing; and
a detection member comprising at least one closed electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code, wherein the at least two spatially separate sections of the closed conductive loop comprise:
a first section having a first non-electrically conductive area inside the closed electrically conductive loop and a first magnetic amplitude response; and
a second section having a second non-electrically conductive area inside the closed electrically conductive loop that is greater than the first non-electrically conductive area and a second magnetic amplitude response that is different from the first magnetic amplitude response.

15. The fluid treatment cartridge of claim 14, wherein the first section comprises a notch in the closed electrically conductive loop, the notch extending across at least about 10% of the first section.

16. A fluid treatment cartridge comprising:
a housing comprising a fluid inlet and a fluid outlet;
a treatment media contained within the housing; and
a detection member comprising at least one closed continuously electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code, wherein the at least two spatially separate sections comprise:
a notched section containing at least one notch; and
an un-notched section, wherein a largest circle that will fit within inner edges of the shortest conductive path of the closed electrically conductive loop in the un-notched section has diameter d1 and a largest circle that will fit within the inner edges of the shortest conductive path of the closed electrically conductive loop in the notched section has diameter d2 and d1>d2.

17. The notched section of claim 16, wherein a largest circle that will fit within the inner edges of the closed electrically conductive loop in the notched section has diameter d2<3 cm.

18. A fluid treatment cartridge comprising:
a housing comprising a fluid inlet and a fluid outlet;
a treatment media contained within the housing; and
a detection member comprising at least one closed continuously electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code, wherein at least one section of the at least two spatially separate sections of the closed electrically conductive loop includes an electrically conductive area that supports eddy currents disposed within a shortest conductive path of the closed electrically conductive loop.

19. The fluid treatment cartridge of claim 18, wherein the electrically conductive area is at least about 10% of a non-conductive area encompassed within the at least one section.

20. A fluid treatment cartridge comprising:
a housing comprising a fluid inlet and a fluid outlet;
a treatment media contained within the housing; and
a detection member comprising at least one closed continuously electrically conductive loop comprising at least two spatially separate sections, each of the at least two spatially separate sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code, wherein the at least two spatially separate sections of the closed electrically conductive loop comprise a first section having a first number of inductive turns and a second section having a second number of inductive turns where the first number is greater than the second number.

21. A system comprising:
a fluid treatment cartridge comprising:
a housing comprising a fluid inlet and a fluid outlet configured to couple to a host device;
a treatment media contained within the housing; and
a detection member comprising at least one closed electrically conductive loop comprising at least two spatially separate sections, each of the sections generating a magnetic response predetermined by the physical shape of the at least two spatially separate sections when at least one section of the at least two spatially separate sections is electromagnetically excited, the magnetic response comprising at least one of a predetermined magnetic phase response and a predetermined magnetic amplitude response, the predetermined magnetic response of at least one other section of the at least two spatially separate sections corresponding to at least a one digit code; and the host device includes a reader comprising:
at least one transmit element configured to transmit an electromagnetic signal that electromagnetically excites the at least one section of the closed electrically conductive loop, electromagnetic excitation of the at least one section of the closed electrically conductive loop generating the predetermined magnetic response of the at least one other section of the closed conductive loop; and at least one receive element, configured to sense the predetermined magnetic response of the at least one other section of the closed conductive loop and to generate a signal on the at least one receive element that represents the code, wherein the reader includes reader circuitry configured to perform at least one of:
detecting a proximity of the fluid treatment cartridge to the host device based on the code, the code being a one bit binary code;
detecting a characteristic of the fluid treatment cartridge based on the code, the code being a multi-digit code; and
controlling an operation of the host device based on the code.

22. The system of claim 21, wherein the reader includes multiple spatially separated receive elements, each receive element corresponding respectively to a section of the closed conductive loop, and signals generated on the multiple receive elements represent the multi-digit code.

23. The system of claim 21, wherein the reader circuitry is configured to process the signal and to identify the code.

24. The system of claim 23, wherein:
the reader circuitry is configured to detect at least one of:
a phase difference between a phase of the signal of the receive element and a phase of the electromagnetic signal transmitted by the transmit element; and
an amplitude difference between an amplitude of a first signal of a first receive element and an amplitude of a second signal of a second receive element or an amplitude difference between the amplitude of the first signal and a baseline amplitude.

25. The system of claim 21, wherein the reader is configured to detect one or both of a presence of the fluidic treatment cartridge and the characteristic of the fluid treatment cartridge based on the code.

26. The system of claim 21, wherein the at least one transmit element comprises multiple transmit elements configured to electromagnetically excite multiple sections of the closed electrically conductive loop.

27. The system of claim 26, wherein the multiple transmit elements transmit electromagnetic signals that are out of phase with each other.

28. A method, comprising:
fluidically coupling a fluidic inlet and a fluidic outlet of a fluidic treatment cartridge to a host device, the fluidic treatment cartridge having a housing that includes the fluidic inlet, the fluidic outlet, and a treatment media disposed within the housing;

transmitting an electromagnetic signal from a reader of a host device, the electromagnetic signal electromagnetically exciting at least one section of a closed electrically conductive loop of a fluidic treatment cartridge;

generating a predetermined magnetic response in at least another section of the closed electrically conductive loop in response to electromagnetic excitement of the at least one section of the closed conductive loop, the predetermined magnetic response comprising at least one of a magnetic phase response and a magnetic amplitude response and corresponding to at least a one digit code;

sensing the predetermined magnetic response in the reader of the host device;

generating an electrical signal that represents the code based on the predetermined magnetic response;

the method further comprising at least one of:
detecting a proximity of the fluidic cartridge to the host device based on the code, the code being a one bit binary code;
detecting a characteristic of the fluidic cartridge based on the code, the code being a multi-bit binary code; and
controlling an operation of the host device based on the code.

29. The method of claim 28, wherein generating the predetermined magnetic response comprises at least one of:
reversing an angular direction of current flow in the closed electrically conductive loop;
inducing a current flow through a notched section of the closed electrically conductive loop;
dividing current flow into at least two branches of a branched section of the closed electrically conductive loop;
inducing a current flow through a multiple inductive turn section of the closed electrically conductive loop; and
generating eddy currents in an electrically conductive area of a section of the closed electrically conductive loop.

30. The method of claim 28, wherein generating the electrical signal that represents the code comprises at least one of:
determining a phase difference between a phase of a signal generated by a receive element of the reader in response to the predetermined magnetic response and a phase of the electromagnetic signal transmitted by the reader;
determining an amplitude difference between an amplitude of a first signal of a first receive element of the reader and an amplitude of a second signal of a second receive element of the reader, the first signal generated in response to a first predetermined magnetic response of a first section of the closed conductive loop and the second signal generated in response to a second predetermined magnetic response of a second section of the closed conductive loop; and
determining an amplitude difference between an amplitude of a signal generated by a receive element of the reader in response to the predetermined magnetic response and a baseline amplitude.

* * * * *

UNITED STATES PATENT AND TRADEMARK OFFICE
CERTIFICATE OF CORRECTION

PATENT NO. : 9,707,502 B1
APPLICATION NO. : 15/276164
DATED : July 18, 2017
INVENTOR(S) : Andrew Bonifas It is certified that error appears in the above-identified patent and that said Letters Patent is hereby corrected as shown below:

In the Specification

Column 16
Lines 52-62, delete "FIG. 7A loop 700 has a notch 710 that extends for some distance along the x-axis across loop section 700c. For example, the notch 710 may extend along the x-axis across the loop by at least about 10%, 25%, 50%, or 75% of loop section 700c. The notch 710 may extend along the x-axis across substantially all, e.g., more than about 95%, of the loop section 700c as shown in FIG. 7 A The depth, h2, of the notch 710 along they-axis may be more than about 10%, 25%, 50%, or 75% but less than 100% of the maximum height, h1, of the loop 700." and insert the same on Column 16, Line 53, as a new paragraph.

Column 24
Line 56, after "The" delete "a".

Column 34
Line 38, delete "gavantically" and insert -- galvanically --, therefor.

Column 35
Line 27, delete "gavantically" and insert -- galvanically --, therefor.

Column 38
Line 9, delete "galvantically" and insert -- galvanically --, therefor.

Column 49
Line 67, after "value" insert -- . --.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,707,502 B1

Column 50
Line 13, delete "62/205,481," and insert -- 62/205,481 (Attorney Docket No. 76814US002), --, therefor.
Line 14, delete "62/205,502," and insert -- 62/205,502 (Attorney Docket No. 76831 US002), --, therefor.
Lines 14-15, delete "62/205,517," and insert -- 62/205,517, (Attorney Docket No. 76832US002), --, therefor.
Line 19, delete "62/263,431," and insert -- 62/263,431 (Attorney Docket No. 76814US003), --, therefor.
Line 20, delete "62/263,439," and insert -- 62/263,439 (Attorney Docket No. 76831US003), --, therefor.
Line 21, delete "62/263,441," and insert -- 62/263,441, (Attorney Docket No. 76832US003), --, therefor.

Column 56
Line 14, delete "test/rest" and insert -- test/reset --, therefor.
Line 44, after "100%)." delete "%).".

Column 57
Line 18, After the (Table), delete "resoanat" and insert -- resonant --, therefor.